(12) United States Patent
Tokumasu et al.

(10) Patent No.: US 9,130,428 B2
(45) Date of Patent: Sep. 8, 2015

(54) ARMATURE WINDING OF ROTATING ELECTRICAL MACHINE

(71) Applicant: Kabushiki Kaisha Toshiba, Tokyo (JP)

(72) Inventors: Tadashi Tokumasu, Tokyo (JP); Masafumi Fujita, Yokohama (JP); Takashi Ueda, Yokohama (JP); Mikio Kakiuchi, Yokohama (JP)

(73) Assignee: Kabushiki Kaisha Toshiba (JP)

( * ) Notice: Subject to any disclaimer, the term of this patent is extended or adjusted under 35 U.S.C. 154(b) by 0 days.

(21) Appl. No.: 14/623,260

(22) Filed: Feb. 16, 2015

(65) Prior Publication Data
US 2015/0162795 A1 Jun. 11, 2015

Related U.S. Application Data

(60) Division of application No. 14/286,339, filed on May 23, 2014, which is a division of application No. 13/973,552, filed on Aug. 22, 2013, now Pat. No. 8,803,397, which is a division of application No. 13/270,650, filed on Oct. 11, 2011, now Pat. No. 8,536,755, which is a continuation of application No. PCT/JP2010/056558, filed on Apr. 13, 2010.

(30) Foreign Application Priority Data

Apr. 13, 2009 (JP) .................................. 2009-096634

(51) Int. Cl.
| | |
|---|---|
| *H02K 3/00* | (2006.01) |
| *H02K 3/04* | (2006.01) |
| *H02K 17/00* | (2006.01) |
| *H02K 3/28* | (2006.01) |
| *H02K 3/12* | (2006.01) |

(52) U.S. Cl.
CPC ... *H02K 3/28* (2013.01); *H02K 3/12* (2013.01)

(58) Field of Classification Search
CPC .................................. H02K 3/00; H02K 17/00
USPC .................. 310/195, 198, 202, 203, 206, 207
See application file for complete search history.

(56) References Cited

U.S. PATENT DOCUMENTS

| | | | | |
|---|---|---|---|---|
| 2,778,962 A | * | 1/1957 | Taylor | 310/202 |
| 2,778,963 A | | 1/1957 | Habermann, Jr. | |
| 3,660,705 A | * | 5/1972 | Willyoung | 310/198 |
| 2009/0096312 A1 | | 4/2009 | Tokumasu et al. | |

FOREIGN PATENT DOCUMENTS

| | | |
|---|---|---|
| JP | 09-205750 | 8/1997 |
| JP | 2000-350396 A | 12/2000 |
| JP | 2004-040910 A | 2/2004 |

OTHER PUBLICATIONS

English Translation of International Preliminary Report on Patentability for PCT/JP2010-056558 (Nov. 24, 2011).

* cited by examiner

*Primary Examiner* — Joshua Benitez-Rosario
*Assistant Examiner* — Jose Gonzalez Quinone
(74) *Attorney, Agent, or Firm* — Harness, Dickey & Pierce, P.L.C.

(57) ABSTRACT

According to one embodiment, there is provided a 3-phase 2-pole 2-layer armature winding, housed in 72 slots provided in a laminated iron core, a winding of each phase including six parallel circuits separated into two phase belts. Upper coil pieces of first and fourth parallel circuits are placed at 3rd, 4th, 7th, and 12th positions, and lower coil pieces of the first and fourth parallel circuits are placed at 1st, 6th, 9th, and 10th positions, upper and lower coil pieces of second and fifth parallel circuits are placed at 2nd, 5th, 8th, and 11th positions, and upper coil pieces of third and six parallel circuits are placed at 1st, 6th, 9th, and 10th positions, and lower coil pieces of the third and six parallel circuits are placed at 3rd, 4th, 7th, and 12th positions, from the center of a pole.

2 Claims, 30 Drawing Sheets

ARMATURE WINDING OF ROTATING ELECTRICAL MACHINE

CROSS REFERENCE TO RELATED APPLICATIONS

This application is a Divisional Application of U.S. application Ser. No. 14/286,339 filed May 23, 2014, which is a Divisional Application of Ser. No. 13/973,552 filed Aug. 22, 2013, now U.S. Pat. No. 8,803,397 issued Aug. 12, 2014, which is a Divisional Application of U.S. application Ser. No. 13/270,650 filed Oct. 11, 2011, now U.S. Pat. No. 8,536,755 issued Sep. 17, 2013, which is a Continuation Application of PCT Application No. PCT/JP2010/056558, filed Apr. 13, 2010 and based upon and claiming the benefit of priority from prior Japanese Patent Application No. 2009-096634, filed Apr. 13, 2009, all of which are incorporated herein by reference in their entireties.

FIELD

Embodiments described herein relate generally to an armature winding having six parallel circuits applied to a 3-phase 2-pole 72-slot rotating electrical machine.

BACKGROUND

In a large-capacity rotating electrical machine, an armature winding is provided with upper and lower coil pieces arranged in two layers in slots provided in a laminated iron core, and the parallel circuits are connected in series, thereby increasing generated voltage and machine capacity. However, as a voltage of an armature winding is increased, the thickness of the main insulation of an armature winding is increased to withstand such higher voltage. As a result, a cross-sectional area of a conducting portion is decreased, a current density is increased, and a loss is increased.

Particularly, in a machine using an indirect cooling system, as the thickness of a main insulating layer increases, a thermal resistance increases, and a temperature increases in an armature winding. Therefore, an armature winding is divided into multiple parallel circuits, thereby decreasing the armature winding voltage and main insulation thickness, reducing the loss, and increasing the cooling capacity, while maintaining the machine capacity. Further, in an indirect-cooling large-capacity machine, it is common to increase the number of slots in an armature core to increase a cooling cycle of an armature winding. Therefore, an armature winding having three or more parallel circuits is required.

If an armature winding having three or more parallel circuits is applied to a 2-pole machine, the voltages generated by the parallel circuits are not completely equated, a circulation current is generated between the parallel circuits, and an armature winding loss is increased.

To decrease the loss by the circulation current, it is necessary to minimize the imbalance of the voltages generated by the parallel circuits. For this purpose, special consideration is required to placement of coils belonging to each parallel circuit in each phase belt.

An example of improvement in placement of coils is explained with reference to a developed perspective view showing one phase of an armature winding shown in FIG. 30.

FIG. 30 shows an example of an armature winding having four parallel circuits applicable to a 3-phase 2-pole 72-slot rotating electrical machine, based on the U.S. Pat. No. 2,778,962 (hereinafter, US patent of Hamilton D. Taylor).

FIG. 30 shows only one phase. For the other two phases, it is obvious that the configuration of the shown phase of an armature winding is shifted by 120° and 240°.

In this patent, when parallel circuits are indicated by numbers 1 to 4, parallel circuits of twelve upper coil piece 15a and lower coil piece 16a of a first phase belt 17 are numbered 1, 2, 2, 1, 2, 1, 1, 2, 1, 2, 2, 1 sequentially from the center of a pole. Similarly, parallel circuits of upper coil piece 15b and lower coil piece 16b of a second phase belt 18 are numbered 3, 4, 4, 3, 4, 3, 3, 4, 3, 4, 4, 3 sequentially from the center of a pole. This decreases a deviation of voltage (an absolute value of a deviation from an average phase voltage) and a deviation of phase (a deviation of phase angle from an average phase voltage) of each parallel circuit.

To realize the above connection, in FIG. 30, fourteen jumper wires 20a per phase are provided at the connection side coil end 19a.

As for the voltage and phase angle deviations of each parallel circuit, the U.S. Pat. No. 2,778,963 (hereinafter, US patent of Rudolph Habermann Jr.) is known.

In this patent, a voltage deviation of each parallel circuit is rated at 0.4% or lower, and a phase angle deviation is rated at 0.15° or lower. Compared with the voltage deviation of 0.12% and phase angle deviation of 0° in the US patent of Hamilton D. Taylor, the values are highly balanced, and sufficiently efficient to decrease a circulation current.

The connection method in the US patent of Hamilton D. Taylor provides an armature winding having four parallel circuits applicable to a 3-phase 2-pole 72-slot rotating electrical machine. In an indirect-cooling large-capacity electrical machine, an armature winding having more parallel circuits is required.

The invention has been made considering the above circumstances. The invention may provide an armature winding having six parallel circuits applied to a large-capacity 3-phase 2-pole 72-slot rotating electrical machine.

DETAILED DESCRIPTION

Figure 1:
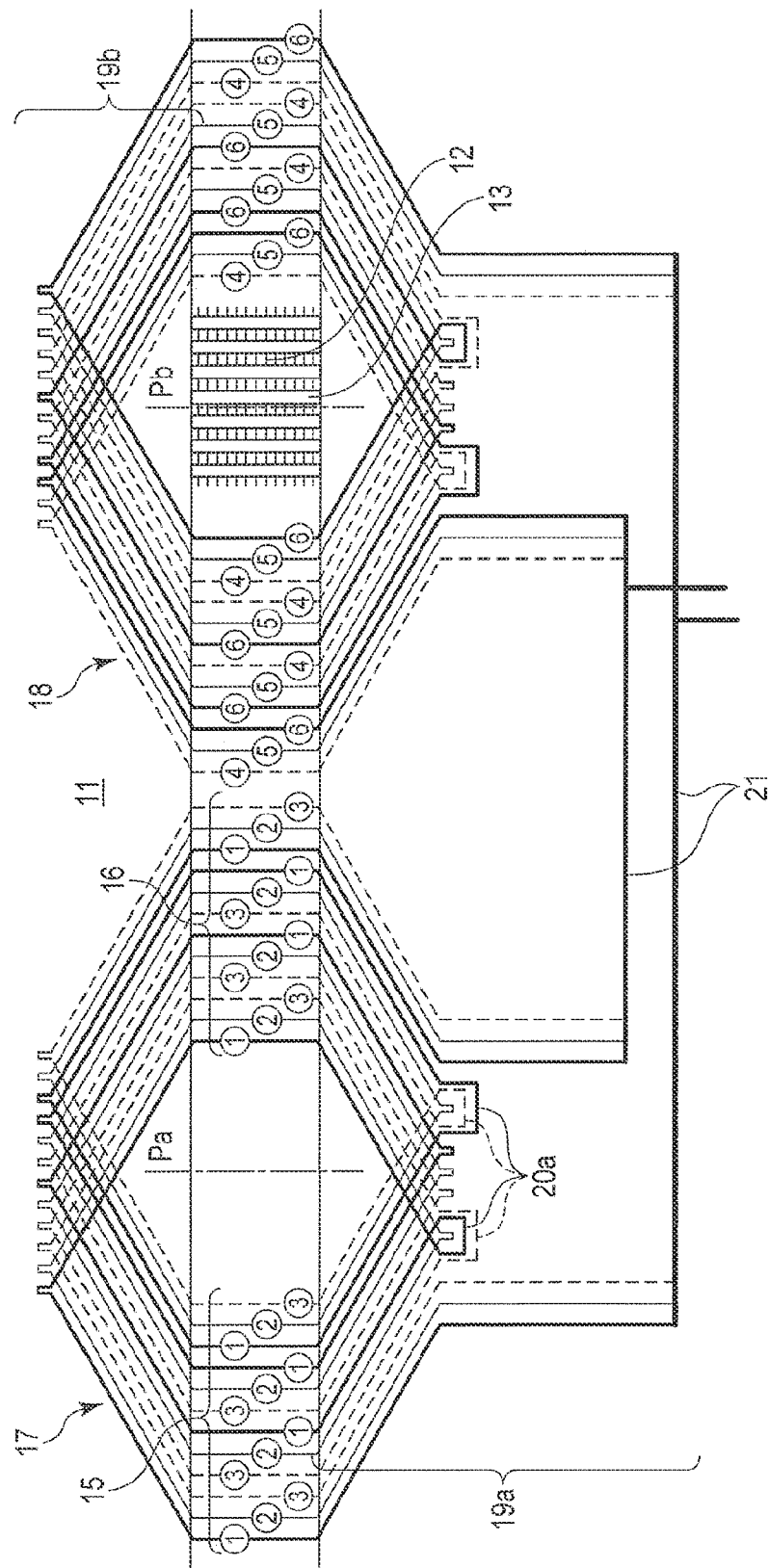
FIG. 1 is a developed perspective view showing one phase of an armature winding of a rotating electrical machine in a first embodiment of the present invention.

Embodiments of the present invention will be described below with reference to the drawings. In general, according to the embodiments, an armature winding of a rotating electrical machine may be provided using means as described below.

(1) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece, connected in series with each other at a connection side coil end and at a non-connection side coil end; and the parallel circuits being connected such that upper coil pieces of first and fourth parallel circuits are placed at 3rd, 4th, 7th, and 12th positions from the center of a pole, and lower coil pieces of the first and fourth parallel circuits are placed at 1st, 6th, 9th, and 10th positions from the center of a pole; upper and lower coil pieces of second and fifth parallel circuits are placed at 2nd, 5th, 8th, and 11th positions from the center of a pole; and upper coil pieces of third and six parallel circuits are placed at 1st, 6th, 9th, and 10th positions from the center of a pole, and lower coil pieces of the third and six parallel circuits are placed at 3rd, 4th, 7th, and 12th positions from the center of a pole, when relative positions of the upper and lower coil pieces in one phase belt are indicated by positions counted sequentially from the center of a pole.

(2) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece connected in series with each other at a connection side coil end and at a non-connection side coil end; and the parallel circuits being connected such that upper and lower coil pieces of first and fourth parallel circuits are placed at 2nd, 5th, 8th, and 12th positions from the center of a pole; upper and lower coil pieces of second and fifth parallel circuits are placed at 3rd, 4th, 7th, and 11th positions from the center of a pole; and upper and lower coil pieces of third and six parallel circuits are placed at 1st, 6th, 9th, and 10th positions from the center of a pole, when relative positions of the upper and lower coil pieces in one phase belt are indicated by positions counted sequentially from the center of a pole.

(3) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece connected in series with each other at a connection side coil end and at a non-connection side coil end; and the parallel circuits being connected such that upper and lower coil pieces of first and fourth parallel circuits are placed at 2nd, 5th, 11th, and 12th positions from the center of a pole; upper and lower coil pieces of second and fifth parallel circuits are placed at 1st, 6th, 9th, and 10th positions from the center of a pole; and upper and lower coil pieces of third and six parallel circuits are placed at 3rd, 4th, 7th, and 8th positions from the center of a pole, when relative positions of the upper and lower coil pieces in one phase belt are indicated by positions counted sequentially from the center of a pole.

(4) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece connected in series with each other at a connection side coil end and at a non-connection side coil end; and the parallel circuits being connected such that upper and lower coil pieces of first and fourth parallel circuits are placed at 3rd, 4th, 11th, and 12th positions from the center of a pole; upper and lower coil pieces of second and fifth parallel circuits are placed at 1st, 6th, 9th, and 10th positions from the center of a pole; and upper and lower coil pieces of third and six parallel circuits are placed at 2nd, 5th, 7th, and 8th positions from the center of a pole, when relative positions of the upper and lower coil pieces in one phase belt are indicated by positions counted sequentially from the center of a pole.

(5) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece connected in series with each other at a connection side coil end and at a non-connection side coil end; and the parallel circuits being connected such that upper and lower coil pieces of first and fourth parallel circuits are placed at 3rd, 4th, 8th, and 12th positions from the center of a pole; upper and lower coil pieces of second and fifth parallel circuits are placed at 2nd, 5th, 7th, and 11th positions from the center of a pole; and upper and lower coil pieces of third and six parallel circuits are placed at 1st, 6th, 9th, and 10th positions from the center of a pole, when relative positions of the upper and lower coil pieces in one phase belt are indicated by positions counted sequentially from the center of a pole.

(6) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece connected in series with each other at a connection side coil end and at a non-connection side coil end; and the parallel circuits being connected such that upper and lower coil pieces of first and fourth parallel circuits are placed at 1st, 8th, 11th, and 12th positions from the center of a pole; upper and lower coil pieces of second and fifth parallel circuits are placed at 3rd, 4th, 6th, and 10th positions from the center of a pole; and upper and lower coil pieces of third and six parallel circuits are placed at 2nd, 5th, 7th, and 9th positions from the center of a pole, when relative positions of the upper and lower coil pieces in one phase belt are indicated by positions counted sequentially from the center of a pole.

(7) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece connected in series with each other at a connection side coil end and at a non-connection side coil end; and the parallel circuits being connected such that upper and lower coil pieces of first and fourth parallel circuits are placed at 1st, 8th, 11th, and 12th positions from the center of a pole; upper and lower coil pieces of second and fifth parallel circuits are placed at 2nd, 5th, 7th, and 10th positions from the center of a pole; and upper and lower coil pieces of third and six parallel circuits are placed at 3rd, 4th, 6th, and 9th positions from the center of a pole, when relative positions of the upper and lower coil pieces in one phase belt are indicated by positions counted sequentially from the center of a pole.

(8) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece connected in series with each other at a connection side coil end and at a non-connection side coil end; and the parallel circuits being connected such that upper and lower coil pieces of first and fourth parallel circuits are placed at 2nd, 5th, 9th, and 12th positions from the center of a pole; upper and lower coil pieces of second and fifth parallel circuits are placed at 1st, 7th, 8th, and 11th positions from the center of a pole; and upper and lower coil pieces of third and six parallel circuits are placed at 3rd, 4th, 6th, and 10th positions from the center of a pole, when relative positions of the upper and lower coil pieces in one phase belt are indicated by positions counted sequentially from the center of a pole.

(9) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece connected in series with each other at a connection side coil end and at a non-connection side coil end; and the parallel circuits being connected such that upper and lower coil pieces of first and fourth parallel circuits are placed at 2nd, 5th, 10th, and 12th positions from the center of a pole; upper and lower coil pieces of second and fifth parallel circuits are placed at 1st, 7th, 8th, and 11th positions from the center of a pole; and upper and lower coil pieces of third and six parallel circuits are placed at 3rd, 4th, 6th, and 9th positions from the center of a pole, when relative positions of the upper and lower coil pieces in one phase belt are indicated by positions counted sequentially from the center of a pole.

(10) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece connected in series with each other at a connection side coil end and at a non-connection side coil end; and the parallel circuits being connected such that upper and lower coil pieces of first and fourth parallel circuits are placed at 2nd, 5th, 10th, and 12th positions from the center of a pole; upper and lower coil pieces of second and fifth parallel circuits are placed at 3rd, 4th, 7th, and 11th positions from the center of a pole; and upper and lower coil pieces of third and six parallel circuits are placed at 1st, 6th, 8th, and 9th positions from the center of a pole, when relative positions of the upper and lower coil pieces in one phase belt are indicated by positions counted sequentially from the center of a pole.

(11) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece connected in series with each other at a connection side coil end and at a non-connection side coil end; and the parallel circuits being connected such that upper and lower coil pieces of first and fourth parallel circuits are placed at 2nd, 5th, 9th, and 12th positions from the center of a pole; upper and lower coil pieces of second and fifth parallel circuits are placed at 3rd, 4th, 7th, and 11th positions from the center of a pole; and upper and lower coil pieces of third and six parallel circuits are placed at 1st, 6th, 8th, and 10th positions from the center of a pole, when relative positions of the upper and lower coil pieces in one phase belt are indicated by positions counted sequentially from the center of a pole.

(12) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece connected in series with each other at a connection side coil end and at a non-connection side coil end; and the parallel circuits being connected such that upper and lower coil pieces of first and fourth parallel circuits are placed at 2nd, 5th, 10th, and 12th positions from the center of a pole; upper and lower coil pieces of second and fifth parallel circuits are placed at 1st, 6th, 9th, and 11th positions from the center of a pole; and upper and lower coil pieces of third and six parallel circuits are placed at 3rd, 4th, 7th, and 8th positions from the center of a pole, when relative positions of the upper and lower coil pieces in one phase belt are indicated by positions counted sequentially from the center of a pole.

(13) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece connected in series with each other at a connection side coil end and at a non-connection side coil end; and the parallel circuits being connected such that upper and lower coil pieces of first and fourth parallel circuits are placed at 3rd, 4th, 11th and 12th positions from the center of a pole; upper and lower coil pieces of second and fifth parallel circuits are placed at 2nd, 5th, 7th, and 10th positions from the center of a pole; and upper and lower coil pieces of third and six parallel circuits are placed at 1st, 6th, 8th, and 9th positions from the center of a pole, when relative positions of the upper and lower coil pieces in one phase belt are indicated by positions counted sequentially from the center of a pole.

(14) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece connected in series with each other at a connection side coil end and at a non-connection side coil end; and the parallel circuits being connected such that upper and lower coil pieces of first and fourth parallel circuits are placed at 2nd, 5th, 9th, and 12th positions from the center of a pole; upper and lower coil pieces of second and fifth parallel circuits are placed at 1st, 6th, 10th, and 11th positions from the center of a pole; and upper and lower coil pieces of third and six parallel circuits are placed at 3rd, 4th, 7th, and 8th positions from the center of a pole, when relative positions of the upper and lower coil pieces in one phase belt are indicated by positions counted sequentially from the center of a pole.

(15) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece connected in series with each other at a connection side coil end and at a non-connection side coil end; and the parallel circuits being connected such that upper and lower coil pieces of first and fourth parallel circuits are placed at 3rd, 8th, 8th, and 12th positions from the center of a pole; upper and lower coil pieces of second and fifth parallel circuits are placed at 1st, 6th, 9th, and 11th positions from the center of a pole; and upper and lower coil pieces of third and six parallel circuits are placed at 2nd, 5th, 7th, and 10th positions from the center of a pole, when relative positions of the upper and lower coil pieces in one phase belt are indicated by positions counted sequentially from the center of a pole.

(16) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece connected in series with each other at a connection side coil end and at a non-connection side coil end; and the parallel circuits being connected such that upper and lower coil pieces of first and fourth parallel circuits are placed at 3rd, 4th, 11th, and 12th positions from the center of a pole; upper and lower coil pieces of second and fifth parallel circuits are placed at 1st, 6th, 8th, and 10th positions from the center of a pole; and upper and lower coil pieces of third and six parallel circuits are placed at 2nd, 5th, 7th, and 9th positions from the center of a pole, when relative positions of the upper and lower coil pieces in one phase belt are indicated by positions counted sequentially from the center of a pole.

(17) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece connected in series with each other at a connection side coil end and at a non-connection side coil end; and the parallel circuits being connected such that upper and lower coil pieces of first and fourth parallel circuits are placed at 3rd, 4th, 8th, and 12th positions from the center of a pole; upper and lower coil pieces of second and fifth parallel circuits are placed at 1st, 6th, 10th, and 11th positions from the center of a pole; and upper and lower coil pieces of third and six parallel circuits are placed at 2nd, 5th, 7th, and 9th positions from the center of a pole, when relative positions of the upper and lower coil pieces in one phase belt are indicated by positions counted sequentially from the center of a pole.

(18) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece connected in series with each other at a connection side coil end and at a non-connection side coil end; and the parallel circuits being connected such that upper and lower coil pieces of first and fourth parallel circuits are placed at 3rd, 4th, 7th, and 12th positions from the center of a pole; upper and lower coil pieces of second and fifth parallel circuits are placed at 2nd, 5th, 8th, and 11th positions from the center of a pole; and upper and lower coil pieces of third and six parallel circuits are placed at 1st, 6th, 9th, and 10th positions from the center of a pole, when relative positions of the upper and lower coil pieces in one phase belt are indicated by positions counted sequentially from the center of a pole.

(19) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece connected in series with each other at a connection side coil end and at a non-connection side coil end; and the parallel circuits being connected such that upper and lower coil pieces of first and fourth parallel circuits are placed at 1st, 7th, 9th, and 12th positions from the center of a pole; upper and lower coil pieces of second and fifth parallel circuits are placed at 2nd, 5th, 8th, and 11th positions from the center of a pole; and upper and lower coil pieces of third and six parallel circuits are placed at 3rd, 4th, 6th, and 10th positions from the center of a pole, when relative positions of the upper and lower coil pieces in one phase belt are indicated by positions counted sequentially from the center of a pole.

(20) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece connected in series with each other at a connection side coil end and at a non-connection side coil end, and the parallel circuits being connected such that upper and lower coil pieces of first and fourth parallel circuits are placed at 1st, 7th, 10th, and 12th positions from the center of a pole; upper and lower coil pieces of second and fifth parallel circuits are placed at 2nd, 5th, 8th, and 11th positions from the center of a pole; and upper and lower coil pieces of third and six parallel circuits are placed at 3rd, 4th, 6th, and 9th positions from the center of a pole, when relative positions of the upper and lower coil pieces in one phase belt are indicated by positions counted sequentially from the center of a pole.

(21) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece connected in series with each other at a connection side coil end and at a non-connection side coil end; and the parallel circuits being connected such that upper and lower coil pieces of first and fourth parallel circuits are placed at 1st, 8th, 9th, and 12th positions from the center of a pole; upper and lower coil pieces of second and fifth parallel circuits are placed at 2nd, 5th, 7th, and 11th positions from the center of a pole; and upper and lower coil pieces of third and six parallel circuits are placed at 3rd, 4th, 6th, and 10th positions from the center of a pole, when relative positions of the upper and lower coil pieces in one phase belt are indicated by positions counted sequentially from the center of a pole.

(22) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece connected in series with each other at a connection side coil end and at a non-connection side coil end; and the parallel circuits being connected such that upper and lower coil pieces of first and fourth parallel circuits are placed at 1st, 8th, 10th, and 12th positions from the center of a pole; upper and lower coil pieces of second and fifth parallel circuits are placed at 2nd, 5th, 7th, and 11th positions from the center of a pole; and upper and lower coil pieces of third and six parallel circuits are placed at 3rd, 4th, 6th, and 9th positions from the center of a pole, when relative positions of the upper and lower coil pieces in one phase belt are indicated by positions counted sequentially from the center of a pole.

(23) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece connected in series with each other at a connection side coil end and at a non-connection side coil end; and the parallel circuits being connected such that upper and lower coil pieces of first and fourth parallel circuits are placed at 1st, 9th, 11th, and 12th positions from the center of a pole; upper and lower coil pieces of second and fifth parallel circuits are placed at 3rd, 4th, 6th, and 10th positions from the center of a pole; and upper and lower coil pieces of third and six parallel circuits are placed at 2nd, 5th, 7th, and 8th positions from the center of a pole, when relative positions of the upper and lower coil pieces in one phase belt are indicated by positions counted sequentially from the center of a pole.

(24) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece connected in series with each other at a connection side coil end and at a non-connection side coil end; and the parallel circuits being connected such that upper and lower coil pieces of first and fourth parallel circuits are placed at 1st, 7th, 8th, and 9th positions from the center of a pole; upper and lower coil pieces of second and fifth parallel circuits are placed at 3rd, 4th, 6th, and 10th positions from the center of a pole; and upper and lower coil pieces of third and six parallel circuits are placed at 2nd, 5th, 11th, and 12th positions from the center of a pole, when relative positions of the upper and lower coil pieces in one phase belt are indicated by positions counted sequentially from the center of a pole.

(25) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece connected in series with each other at a connection side coil end and at a non-connection side coil end; and the parallel circuits being connected such that upper and lower coil pieces of first and fourth parallel circuits are placed at 1st, 10th, 11th, and 12th positions from the center of a pole; upper and lower coil pieces of second and fifth parallel circuits are placed at 3rd, 4th, 6th, and 9th positions from the center of a pole; and upper and lower coil pieces of third and six parallel circuits are placed at 2nd, 5th, 7th, and 8th positions from the center of a pole, when relative positions of the upper and lower coil pieces in one phase belt are indicated by positions counted sequentially from the center of a pole.

(26) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece connected in series with each other at a connection side coil end and at a non-connection side coil end; and the parallel circuits being connected such that upper and lower coil pieces of first and fourth parallel circuits are placed at 2nd, 5th, 8th, and 12th positions from the center of a pole; upper and lower coil pieces of second and fifth parallel circuits are placed at 1st, 7th, 9th, and 11th positions from the center of a pole; and upper and lower coil pieces of third and six parallel circuits are placed at 3rd, 4th, 6th, and 10th positions from the center of a pole, when relative positions of the upper and lower coil pieces in one phase belt are indicated by positions counted sequentially from the center of a pole.

(27) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece connected in series with each other at a connection side coil end and at a non-connection side coil end; and the parallel circuits being connected such that upper and lower coil pieces of first and fourth parallel circuits are placed at 2nd, 5th, 11th, and 12th positions from the center of a pole; upper and lower coil pieces of second and fifth parallel circuits are placed at 1st, 7th, 8th, and 10th positions from the center of a pole; and upper and lower coil pieces of third and six parallel circuits are placed at 3rd, 4th, 6th, and 9th positions from the center of a pole, when relative positions of the upper and lower coil pieces in one phase belt are indicated by positions counted sequentially from the center of a pole.

(28) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece connected in series with each other at a connection side coil end and at a non-connection side coil end; and the parallel circuits being connected such that upper and lower coil pieces of first and fourth parallel circuits are placed at 2nd, 5th, 8th, and 12th positions from the center of a pole; upper and lower coil pieces of second and fifth parallel circuits are placed at 1st, 7th, 10th, and 11th positions from the center of a pole; and upper and lower coil pieces of third and six parallel circuits are placed at 3rd, 4th, 6th, and 9th positions from the center of a pole, when relative positions of the upper and lower coil pieces in one phase belt are indicated by positions counted sequentially from the center of a pole.

(29) There is provided a 3-phase 2-pole 2-layer armature winding of a rotating electrical machine, housed in 72 slots provided in a laminated iron core, the winding for each phase comprising: six parallel circuits separated into two phase belts comprising first and second phase belts, each parallel circuit comprising two coil pieces, an upper coil piece and a lower coil piece connected in series with each other at a connection side coil end and at a non-connection side coil end; and the parallel circuits being connected such that upper coil pieces of first and fourth parallel circuits are placed at 2nd, 5th, 7th, and 12th positions from the center of a pole, and lower coil pieces of the first and fourth parallel circuits are placed at 1st, 6th, 9th, and 10th positions; upper coil pieces of second and fifth parallel circuits are placed at 3rd, 4th, 8th, and 11th positions from the center of a pole, and lower coil pieces of the second and fifth parallel circuits are placed at 3rd, 4th, 7th, and 12th positions from the center of a pole; and upper coil pieces of third and six parallel circuits are placed at 1st, 6th, 9th, and 10th positions from the center of a pole, and lower coil pieces of the third and six parallel circuits are placed at 2nd, 5th, 8th, and 11th positions, when relative positions of the upper and lower coil pieces in one phase belt are indicated by positions counted sequentially from the center of a pole.

Embodiment 1

FIG. 1 is a developed perspective view showing a phase of an armature winding in a first embodiment the invention.

As shown in FIG. 1, an armature 11 of a rotating electrical machine is provided with seventy-two slots 13 in an armature core 12 comprising a laminated iron core, and a 2-pole 3-phase 6-parallel-circuit armature winding is housed in the slots 13 in two layers.

An armature winding of each phase has an upper coil piece 15 housed in the upper part of the slot, and a lower coil piece 16 housed in the lower part of the slot. The ends of the upper and lower coil pieces 15 and 16 are connected in series at a connection side coil end 19a connected to a lead-out portion of the winding, and at a non-connection side coil end 19b located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are housed in the twelve slots 13.

The first and second phase belts mentioned here means winding portions, which are obtained by dividing each of three phases into two and assigned, and form the same phase by housing the upper and lower coils in two layers in the seventy-two slots provided in the laminated core (armature core), and sequentially connecting them in series.

The armature winding of each phase has six parallel circuits. The parallel circuits are given numbers ①, ②, ③, ④, ⑤ and ⑥ for identification in the drawing. The circuit numbers are assigned to identify the parallel circuits for convenience of explanation, and may be indicated by any symbol in any order.

In each phase belt 17 and 18, the upper coil piece 15 is connected to the corresponding lower coil piece 16 apart by a fixed pitch, at the connection side coil end 19a and non-connection side coil end 19b, thereby forming six parallel circuits. The parallel circuits are connected in parallel through the lead-out connection conductor 21 provided at the connection side coil end 19a, thereby forming the armature winding.

FIG. 1 shows an example in which a coil pitch is a small value of ⅔. This is for the purpose of making the drawing easy to comprehend. The pitch is not limited to this value.

As shown in FIG. 1, eight jumper wires 20a per phase are provided at the connection side coil end 19a of each phase 17 and 18. The circuits of the upper coil piece 15 of the first phase belt 17 are numbered 3, 2, 1, 1, 2, 3, 1, 2, 3, 3, 2, 1 sequentially from the pole center Pa side, and the circuits of the lower coil piece 16 are numbered 1, 2, 3, 3, 2, 1, 3, 2, 1, 1, 2, 3 sequentially from the pole center Pa side. The circuits of the upper coil piece 15 of the second phase belt 18 are numbered 6, 5, 4, 4, 5, 6, 4, 5, 6, 6, 5, 4 sequentially from the pole center Pb side, and the circuits of the lower coil piece 16 are numbered 4, 5, 6, 6, 5, 4, 6, 5, 4, 4, 5, 6 sequentially from the pole center Pb side.

Therefore, when the relative positions of the upper and lower coil pieces 15 and 16 in each phase belt are indicated by positions from the center of a pole, the upper and lower coil pieces of each parallel circuit are placed as shown in Table 1.

TABLE 1

| Relative positions from the center of pole | | 1 | 2 | 3 | 4 | 5 | 6 |
|---|---|---|---|---|---|---|---|
| Parallel circuits 1 and 4 | Upper coil piece | | | 1 | 1 | | 1 |
| | Lower coil piece | 1 | | | | | 1 |
| Parallel circuits 2 and 5 | Upper coil piece | | 1 | | | 1 | |
| | Lower coil piece | | 1 | | | 1 | |

TABLE 1-continued

| | | | | | | | |
|---|---|---|---|---|---|---|---|
| Parallel circuits 3 and 6 | Upper coil piece | 1 | | | | | 1 |
| | Lower coil piece | | | 1 | 1 | | |
| Relative positions from the center of pole | | 7 | 8 | 9 | 10 | 11 | 12 |
| Parallel circuits 1 and 4 | Upper coil piece | 1 | | | | | 1 |
| | Lower coil piece | | | 1 | 1 | | |
| Parallel circuits 2 and 5 | Upper coil piece | | 1 | | | 1 | |
| | Lower coil piece | | 1 | | | 1 | |
| Parallel circuits 3 and 6 | Upper coil piece | | | 1 | 1 | | |
| | Lower coil piece | 1 | | | | | 1 |

As shown in Table 1, four upper coil pieces 15 of the first and fourth parallel circuits are placed at 3rd, 4th, 7th and 12th positions from the pole center, and four lower coil pieces 16 of the first and fourth parallel circuits are placed at 1st, 6th, 9th and 10th positions from the pole center. Four upper and lower coil pieces 15 and 16 of the second and fifth parallel circuits are placed at 2nd, 5th, 8th, and 11th positions from the pole center. Four upper coil pieces 15 of the third and sixth parallel circuits are placed at 1st, 6th, 9th, and 10th positions from the pole center, and four lower coil pieces 16 of the third and sixth parallel circuits are placed at 3rd, 4th, 6th, 7th, and 12th positions from the pole center.

Next, the imbalance of the voltages generated in one phase is explained. Here, the following definition is generally adopted as a means for numerically evaluating the imbalance. The voltage expressed by p.u. of only one circuit of multiple parallel circuits in one phase is a ratio of the open voltage of that parallel circuit to an average voltage (phase voltage) as a whole phase, and indicates the degree of imbalance of the voltages of that parallel circuit and whole phase. Similarly, a phase angle deviation of an open voltage generated in one parallel circuit from a phase voltage indicates the degree of imbalance of the phase angles of the voltages of that parallel circuit and whole phase.

Table 2 shows the balance of the voltage generated in an armature winding in the first embodiment. In the first embodiment, this balance does not vary with a coil pitch. As shown in Table 2, in the armature winding in the first embodiment, a voltage deviation (a deviation of a p.u. voltage from 1.0) is 0.25% maximum, and a phase angle deviation is 0.17°. Compared with the standard in the US patent of Rudolph Habermann Jr., 0.4% in voltage deviation and 0.15° in phase angle, the phase angle deviation is a little higher, but the voltage deviation is small, and the balance is high as a whole.

TABLE 2

| Parallel circuit | 1 | 2 | 3 | 4 | 5 | 6 |
|---|---|---|---|---|---|---|
| Voltage (p. u.) | 0.9987 | 1.0025 | 0.9987 | 0.9987 | 1.0025 | 0.9987 |
| Voltage phase (degree) | 0.177 | 0.000 | −0.177 | 0.177 | 0.000 | −0.177 |

As described above, in the first embodiment, the balance equivalent to the standard in the US patent of Rudolph Habermann Jr. is realized for the voltages of parallel circuits, and a circulation current can be decreased.

Figure 30:
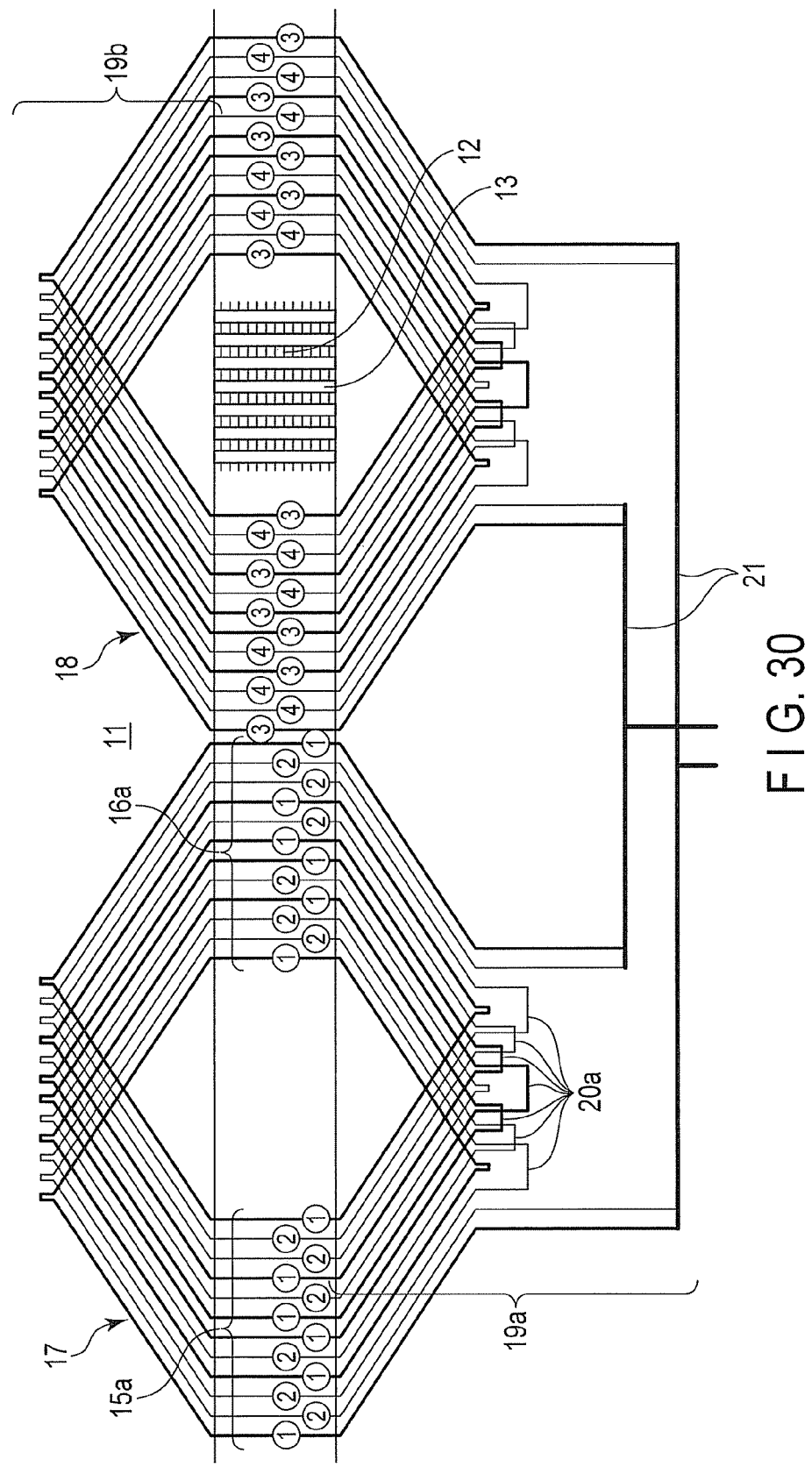
FIG. 30 is a developed perspective view showing one phase of an armature winding of a conventional rotating electrical machine.

In the first embodiment, the total number of jumper wires 20*a* is 80 per a phase, which is decreased from 14 per phase in one phase of the armature winding shown in FIG. 30. Therefore, the distance between the jumper wires 20*a* is increased, and the workability for connecting jumper wires 20*a* is improved, the insulation quality and fixing strength at each connecting point are ensured, and the reliability of the armature winding is increased.

The embodiment is not limited to the illustrated configuration. The lead-out positions may be different. For example, the coil pieces located at electrically equivalent positions in the parallel circuits 1 and 4 may be replaced.

Embodiment 2

Figure 2:
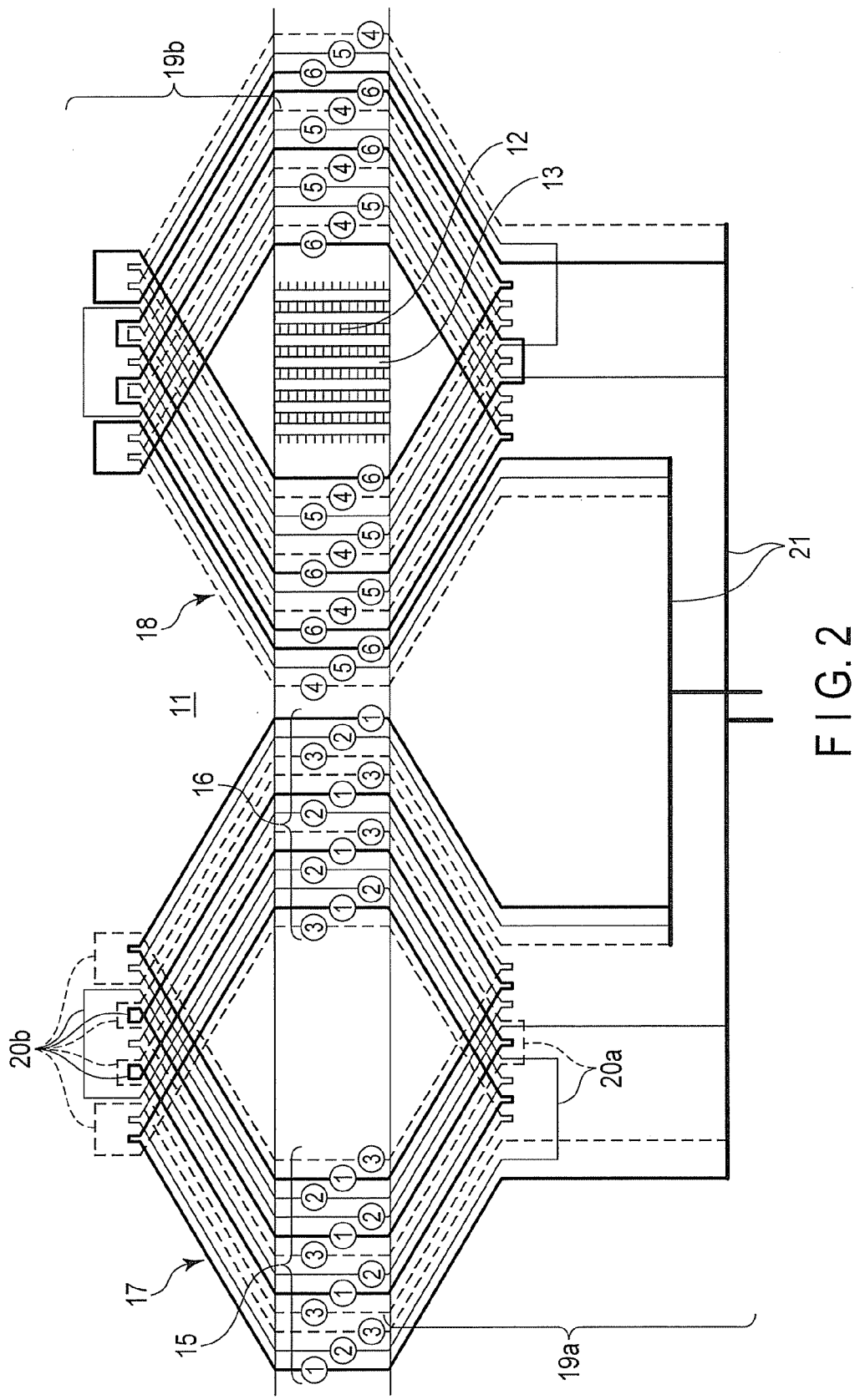
FIG. 2 is a developed perspective view showing one phase of an armature winding of a rotating electrical machine in a second embodiment of the present invention.

FIG. 2 is a developed perspective view showing one phase of an armature winding of a rotating electrical machine in a second embodiment of the present invention.

As shown in FIG. 2, an armature 11 of a rotating electrical machine is provided with seventy-two slots 13 in an armature core 12 comprising a laminated iron core. In the slots 13, a 2-pole 3-phase 6-parallel-circuit armature winding is housed in two layers.

An armature winding of each phase has an upper coil piece 15 housed in the upper part of the slot, and a lower coil piece 16 housed in the lower part of the slot. The ends of the upper and lower coil pieces 15 and 16 are connected in series at a connection side coil end 19*a* connected to a lead-out portion of the winding, and at a non-connection side coil end 19*b* located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are housed in the twelve slots 13.

The armature winding of each phase has six parallel circuits. The parallel circuits are given numbers ①, ②, ③, ④, ⑤ and ⑥ for identification in the drawing.

In each phase belt 17 and 18, the upper coil piece 15 is connected to the corresponding lower coil piece 16 apart by a fixed pitch, at the connection side coil end 19*a* and non-connection side coil end 19*b*, thereby forming six parallel circuits. The parallel circuits are connected in parallel through the lead-out connection conductor 21 provided at the connection side coil end 19*a*, thereby forming the armature winding.

As shown in FIG. 2, four jumper wires 20*a* per a phase are provided at the connection side coil end 19*a* of each phase 17 and 18, and fourteen jumper wires 20*b* per phase belt are provided at the non-connection side coil end 19*b*. When the relative positions of the upper and lower coil pieces 15 and 16 in each phase belt are indicated by positions from the pole center, the upper and lower coil pieces 15 and 16 of each parallel circuit are placed as shown in Table 3.

TABLE 3

| Relative positions from the center of pole | | 1 | 2 | 3 | 4 | 5 | 6 |
|---|---|---|---|---|---|---|---|
| Parallel circuits 1 and 4 | Upper coil piece | | | 1 | | 1 | |
| | Lower coil piece | | | 1 | | 1 | |
| Parallel circuits 2 and 5 | Upper coil piece | | | | 1 | 1 | |
| | Lower coil piece | | | | 1 | 1 | |
| Parallel circuits 3 and 6 | Upper coil piece | 1 | | | | | 1 |
| | Lower coil piece | 1 | | | | | 1 |
| Relative positions from the center of pole | | 7 | 8 | 9 | 10 | 11 | 12 |
| Parallel circuits 1 and 4 | Upper coil piece | 1 | | | | | 1 |
| | Lower coil piece | 1 | | | | | 1 |
| Parallel circuits 2 and 5 | Upper coil piece | 1 | | | 1 | | |
| | Lower coil piece | 1 | | | 1 | | |

TABLE 3-continued

| | | | |
|---|---|---|---|
| Parallel circuits 3 and 6 | Upper coil piece | 1 | 1 |
| | Lower coil piece | 1 | 1 |

As shown in Table 3, four upper and lower coil pieces 15 and 16 of the first and fourth parallel circuits are placed at 2nd, 5th, 8th, and 12th positions from the pole center. Four upper and lower coil pieces 15 and 16 of the second and fifth parallel circuits are placed at 3rd, 4th, 7th, and 11th positions from the pole center. Four upper and lower coil pieces 15 and 16 of the third and sixth parallel circuits are placed at 1st, 6th, 9th, and 10th positions from the pole center.

Therefore, the circuits of the upper and lower coil pieces 15 and 16 in the first phase belt 17 are numbered 3, 1, 2, 2, 1, 3, 2, 1, 3, 3, 2, 1 sequentially from the pole center side. The circuits of the upper and lower coil pieces 15 and 16 in the second phase belt 18 are numbered 6, 4, 5, 5, 4, 6, 5, 4, 6, 6, 5, 4 sequentially from the pole center side.

Table 4 shows the balance of the voltage generated in an armature winding in the second embodiment. In the second embodiment, the balance varies with a coil pitch. Table 4 shows a case where a winding pitch is 30/36 (83.33%).

TABLE 4

| Parallel circuit | 1 | 2 | 3 | 4 | 5 | 6 |
|---|---|---|---|---|---|---|
| Voltage (p. u.) | 0.9984 | 1.0020 | 0.9996 | 0.9984 | 1.0020 | 0.9996 |
| Voltage phase (degree) | 0.000 | 0.000 | 0.000 | 0.000 | 0.000 | 0.000 |

As shown in Table 4, in the armature winding in the second embodiment, a voltage deviation (a deviation of a p.u. voltage from 1.0) is 0.20% maximum, and a phase angle deviation is 0.00°. These values meet the standard in the US patent of Rudolph Habermann Jr., 0.4% in voltage deviation and 0.15° in phase angle, and the voltage balance higher than that in the first embodiment is realized.

Table 5 shows a change in maximum voltage deviation and phase angle deviation with a winding pitch in the second embodiment. In a practical winding pitch range of 31/36 or less, the balance meets the standard in the US patent of Rudolph Habermann Jr., 0.4% in voltage deviation and 0.15° in phase angle.

TABLE 5

| Coil pitch | 27/36 | 28/36 | 29/36 | 30/36 | 31/36 | 32/36 |
|---|---|---|---|---|---|---|
| Voltage deviation | 0.15% | 0.04% | 0.09% | 0.20% | 0.31% | 0.42% |
| Phase angle deviation | 0.00° | 0.00° | 0.00° | 0.00° | 0.00° | 0.00° |

As described above, in the second embodiment, in the practical winding pitch range of 31/36 or less, the balance meeting the standard in the US patent of Rudolph Habermann Jr. is realized with respect to the voltages of parallel circuits, and a circulation current can be decreased.

The embodiment is not limited to the illustrated configuration. The lead-out positions may be different. For example, the coil pieces located at electrically equivalent positions in the parallel circuits 1 and 4 may be replaced.

Embodiment 3

Figure 3:
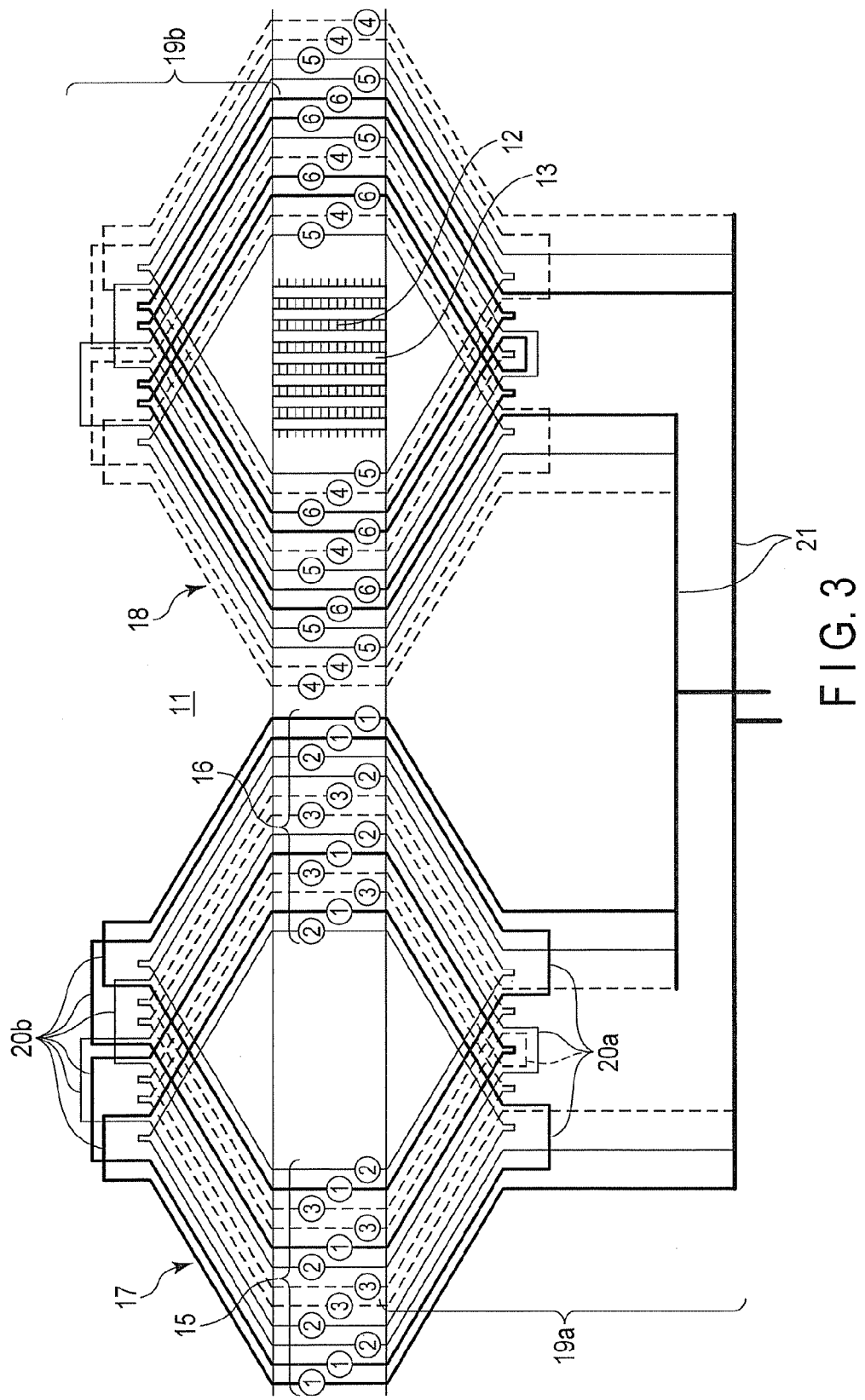
FIG. 3 is a developed perspective view showing one phase of an armature winding of a rotating electrical machine in a third embodiment of the present invention.

FIG. 3 is a developed perspective view showing one phase of an armature winding of a rotating electrical machine in a third embodiment of the present invention.

As shown in FIG. 3, an armature 11 of a rotating electrical machine is provided with seventy-two slots 13 in an armature core 12 comprising a laminated iron core. In the slots 13, a 2-pole 3-phase 6-parallel-circuit armature winding is housed in two layers.

An armature winding of each phase has an upper coil piece 15 housed in the upper part of the slot, and a lower coil piece 16 housed in the lower part of the slot. The ends of the upper and lower coil pieces 15 and 16 are connected in series at a connection side coil end 19a connected to a lead-out portion of the winding, and at a non-connection side coil end 19b located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are housed in the twelve slots 13.

The armature winding 14 of each phase has six parallel circuits. The parallel circuits are given numbers ①, ②, ③, ④, ⑤ and ⑥ for identification in the drawing.

In each phase belt 17 and 18, the upper coil piece 15 is connected to the corresponding lower coil piece 16 apart by a fixed pitch, at the connection side coil end 19a and non-connection side coil end 19b, thereby forming six parallel circuits. The parallel circuits are connected in parallel through the lead-out connection conductor 21 provided at the connection side coil end 19a, thereby forming the armature winding.

In FIG. 3, eight jumper wires 20a per phase are provided at the connection side coil end 19a of each phase 17 and 18, and twelve jumper wires 20b per phase belt are provided at the non-connection side coil end 19b. When the relative positions of the upper and lower coil pieces 15 and 16 in each phase belt are indicated by positions from the pole center, the upper and lower coil pieces 15 and 16 of each parallel circuit are placed as shown in Table 6.

TABLE 6

| Relative positions from the center of pole | | 1 | 2 | 3 | 4 | 5 | 6 |
|---|---|---|---|---|---|---|---|
| Parallel circuits 1 and 4 | Upper coil piece | | 1 | | | 1 | |
| | Lower coil piece | | 1 | | | 1 | |
| Parallel circuits 2 and 5 | Upper coil piece | 1 | | | | | 1 |
| | Lower coil piece | 1 | | | | | 1 |
| Parallel circuits 3 and 6 | Upper coil piece | | | 1 | 1 | | |
| | Lower coil piece | | | 1 | 1 | | |
| Relative positions from the center of pole | | 7 | 8 | 9 | 10 | 11 | 12 |
| Parallel circuits 1 and 4 | Upper coil piece | | | | | 1 | 1 |
| | Lower coil piece | | | | | 1 | 1 |
| Parallel circuits 2 and 5 | Upper coil piece | | | 1 | 1 | | |
| | Lower coil piece | | | 1 | 1 | | |
| Parallel circuits 3 and 6 | Upper coil piece | 1 | 1 | | | | |
| | Lower coil piece | 1 | 1 | | | | |

As shown in Table 6, four upper and lower coil pieces 15 and 16 of the first and fourth parallel circuits are placed at 2nd, 5th, 11th, and 12th positions from the pole center. Four upper and lower coil pieces 15 and 16 of the second and fifth parallel circuits are placed at 1st, 6th, 9th, and 10th positions from the pole center. Four upper and lower coil pieces 15 and 16 of the third and sixth parallel circuits are placed at 3rd, 4th, 7th, and 8th positions from the pole center.

Therefore, the circuits of the upper and lower coil pieces 15 and 16 in the first phase belt 17 are numbered 2, 1, 3, 3, 1, 2, 3, 3, 2, 2, 1, 1 sequentially from the pole center side. The circuits of the upper and lower coil pieces 15 and 16 in the second phase belt 18 are numbered 5, 4, 6, 6, 4, 5, 6, 6, 5, 5, 4, 4 sequentially from the pole center side.

Table 7 shows the balance of the voltage generated in an armature winding in the third embodiment. In the embodiment, the balance varies with a coil pitch. Table 7 shows a case where a winding pitch is 30/36 (83.33%).

TABLE 7

| Parallel circuit | 1 | 2 | 3 | 4 | 5 | 6 |
|---|---|---|---|---|---|---|
| Voltage (p. u.) | 0.9984 | 0.9996 | 1.0020 | 0.9984 | 0.9996 | 1.0020 |
| Voltage phase (degree) | 0.000 | 0.000 | 0.000 | 0.000 | 0.000 | 0.000 |

As shown in Table 7, in the armature winding in the third embodiment, a voltage deviation (a deviation of a p.u. voltage from 1.0) is 0.20% maximum, and a phase angle deviation is 0.00°. These values meet the standard in the US patent of Rudolph Habermann Jr., 0.4% in voltage deviation and 0.15° in phase angle, and the voltage balance higher than that in the first embodiment is realized.

Table 8 shows a change in maximum voltage deviation and phase angle deviation with a winding pitch in the third embodiment. When a winding pitch is 30/36 or 31/36, the balance meets the standard in the US patent of Rudolph Habermann Jr., 0.4% in voltage deviation and 0.15° in phase angle.

TABLE 8

| Coil pitch | 28/36 | 29/36 | 30/36 | 31/36 |
|---|---|---|---|---|
| Voltage deviation | 0.68% | 0.25% | 0.20% | 0.62% |
| Phase angle deviation | 0.00° | 0.00° | 0.00° | 0.00° |

As described above, in the third embodiment, when a winding pitch is 30/36 or 31/36, the balance meeting the standard in the US patent of Rudolph Habermann Jr. is realized with respect to the voltages of parallel circuits, and a circulation current can be decreased.

The embodiment is not limited to the illustrated configuration. The lead-out positions may be different. For example, the coil pieces located at electrically equivalent positions in the parallel circuits 1 and 4 may be replaced.

Embodiment 4

Figure 4:
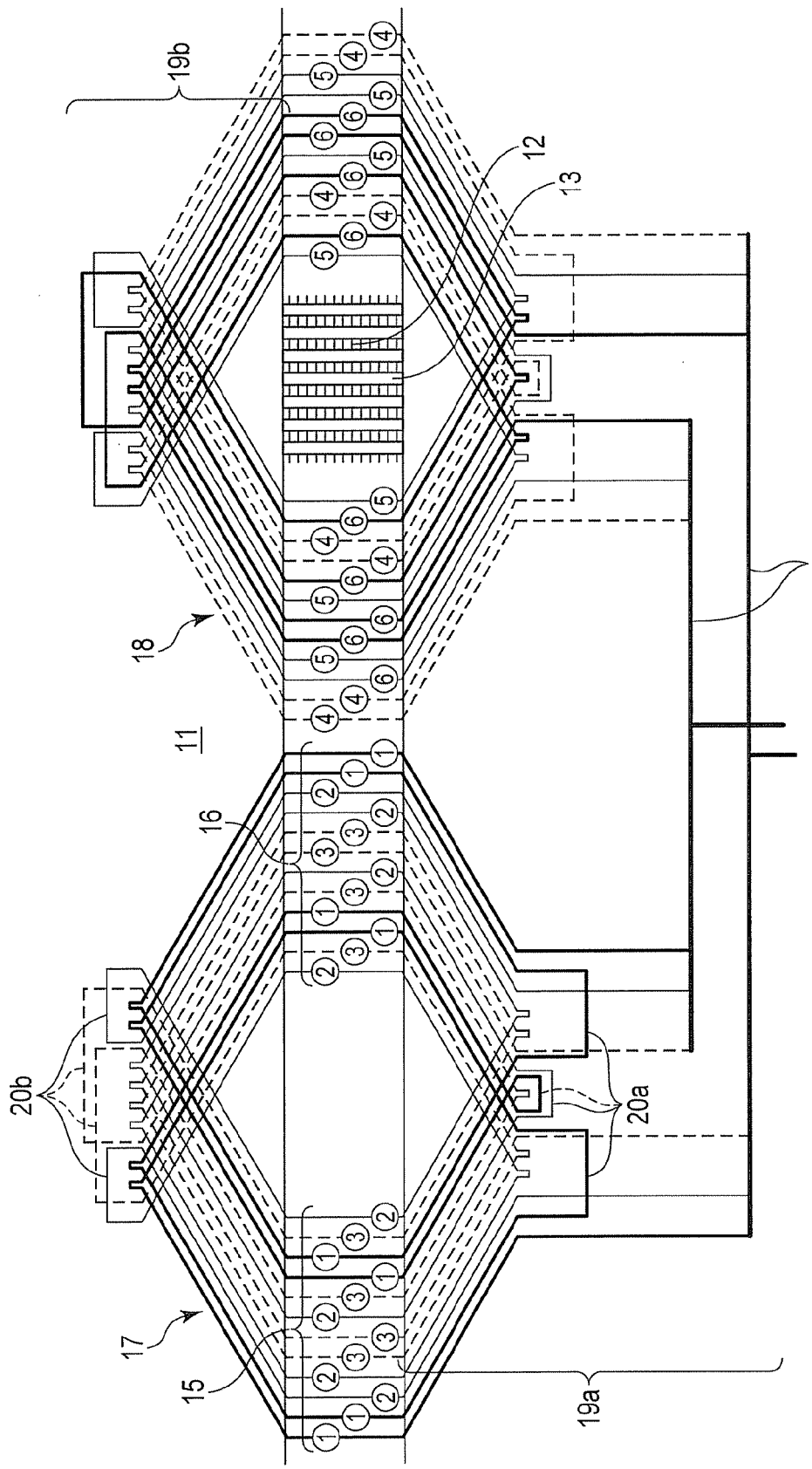
FIG. 4 is a developed perspective view showing one phase of an armature winding of a rotating electrical machine in a fourth embodiment of the present invention.

FIG. 4 is a developed perspective view showing one phase of an armature winding of a rotating electrical machine in a fourth embodiment of the present invention.

As shown in FIG. 4, an armature 11 of a rotating electrical machine is provided with seventy-two slots 13 in an armature core 12 comprising a laminated iron core. In the slots 13, a 2-pole 3-phase 6-parallel-circuit armature winding is housed in two layers.

An armature winding of each phase has an upper coil piece 15 housed in the upper part of the slot, and a lower coil piece 16 housed in the lower part of the slot. The ends of the upper and lower coil pieces 15 and 16 are connected in series at a connection side coil end 19a connected to a lead-out portion of the winding, and at a non-connection side coil end 19b located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are housed in the twelve slots 13.

The armature winding of each phase has six parallel circuits. The parallel circuits are given numbers ①, ②, ③, ④, ⑤ and ⑥ for identification in the drawing.

In each phase belt 17 and 18, the upper coil piece 15 is connected to the corresponding lower coil piece 16 apart by a fixed pitch, at the connection side coil end 19a and non-connection side coil end 19b, thereby forming six parallel circuits. The parallel circuits are connected in parallel through the lead-out connection conductor 21 provided at the connection side coil end 19a, thereby forming the armature winding.

In FIG. 4, eight jumper wires 20a per phase are provided at the connection side coil end 19a of each phase 17 and 18, and eight jumper wires 20b per phase belt are provided at the non-connection side coil end 19b. When the relative positions of the upper and lower coil pieces 15 and 16 in each phase belt are indicated by positions from the pole center, the upper and lower coil pieces 15 and 16 of each parallel circuit are placed as shown in Table 9.

TABLE 9

| Relative positions from the center of pole | | 1 | 2 | 3 | 4 | 5 | 6 |
|---|---|---|---|---|---|---|---|
| Parallel circuits 1 and 4 | Upper coil piece | | | 1 | 1 | | |
| | Lower coil piece | | | 1 | 1 | | |
| Parallel circuits 2 and 5 | Upper coil piece | 1 | | | | | 1 |
| | Lower coil piece | 1 | | | | | 1 |
| Parallel circuits 3 and 6 | Upper coil piece | | 1 | | | 1 | |
| | Lower coil piece | | 1 | | | 1 | |

| Relative positions from the center of pole | | 7 | 8 | 9 | 10 | 11 | 12 |
|---|---|---|---|---|---|---|---|
| Parallel circuits 1 and 4 | Upper coil piece | | | | | 1 | 1 |
| | Lower coil piece | | | | | 1 | 1 |
| Parallel circuits 2 and 5 | Upper coil piece | | | 1 | 1 | | |
| | Lower coil piece | | | 1 | 1 | | |
| Parallel circuits 3 and 6 | Upper coil piece | 1 | 1 | | | | |
| | Lower coil piece | 1 | 1 | | | | |

As shown in Table 9, four upper and lower coil pieces 15 and 16 of the first and fourth parallel circuits are placed at 3rd, 4th, 11th, and 12th positions from the pole center. Four upper and lower coil pieces 15 and 16 of the second and fifth parallel circuits are placed at 1st, 6th, 9th, and 10th positions from the pole center. Four upper and lower coil pieces 15 and 16 of the third and sixth parallel circuits are placed at 2nd, 5th, 7th, and 8th positions from the pole center.

Therefore, the circuits of the upper and lower coil pieces 15 and 16 in the first phase belt 17 are numbered 2, 3, 1, 1, 3, 2, 3, 3, 2, 2, 1, 1 sequentially from the pole center side. The circuits of the upper and lower coil pieces 15 and 16 in the second phase belt 18 are numbered 5, 6, 4, 4, 6, 5, 6, 6, 5, 5, 4, 4 sequentially from the pole center side.

Table 10 shows the balance of the voltage generated in an armature winding in the fourth embodiment. In the embodiment, the balance varies with a coil pitch. Table 10 shows a case where a winding pitch is 30/36 (83.33%).

TABLE 10

| Parallel circuit | 1 | 2 | 3 | 4 | 5 | 6 |
|---|---|---|---|---|---|---|
| Voltage (p. u.) | 1.0020 | 0.9996 | 0.9984 | 1.0020 | 0.9996 | 0.9984 |
| Voltage phase (degree) | 0.000 | 0.000 | 0.000 | 0.000 | 0.000 | 0.000 |

As shown in Table 10, in the armature winding in the fourth embodiment, a voltage deviation (a deviation of a p.u. voltage from 1.0) is 0.20% maximum, and a phase angle deviation is 0.00°. These values meet the standard in the US patent of Rudolph Habermann Jr., 0.4% in voltage deviation and 0.15° in phase angle, and the voltage balance higher than that in the first embodiment is realized.

Table 11 shows a change in maximum voltage deviation and phase angle deviation with a winding pitch in the fourth embodiment. When a winding pitch is 29/36 or 30/36, the balance meets the standard in the US patent of Rudolph Habermann Jr., 0.4% in voltage deviation and 0.15° in the phase angle.

TABLE 11

| Coil pitch | 27/36 | 28/36 | 29/36 | 30/36 | 31/36 | 32/36 |
|---|---|---|---|---|---|---|
| Voltage deviation | | | 0.61% | 0.20% | 0.25% | 0.66% |
| Phase angle deviation | | | 0.00° | 0.00° | 0.00° | 0.00° |

As described above, in the fourth embodiment, when a winding pitch is 29/36 or 30/36, the balance meeting the standard in the US patent of Rudolph Habermann Jr. is realized with respect to the voltages of parallel circuits, and a circulation current can be decreased.

The embodiment is not limited to the illustrated configuration. The lead-out positions may be different. For example, the coil pieces located at electrically equivalent positions in the parallel circuits 1 and 4 may be replaced.

Embodiment 5

Figure 5:
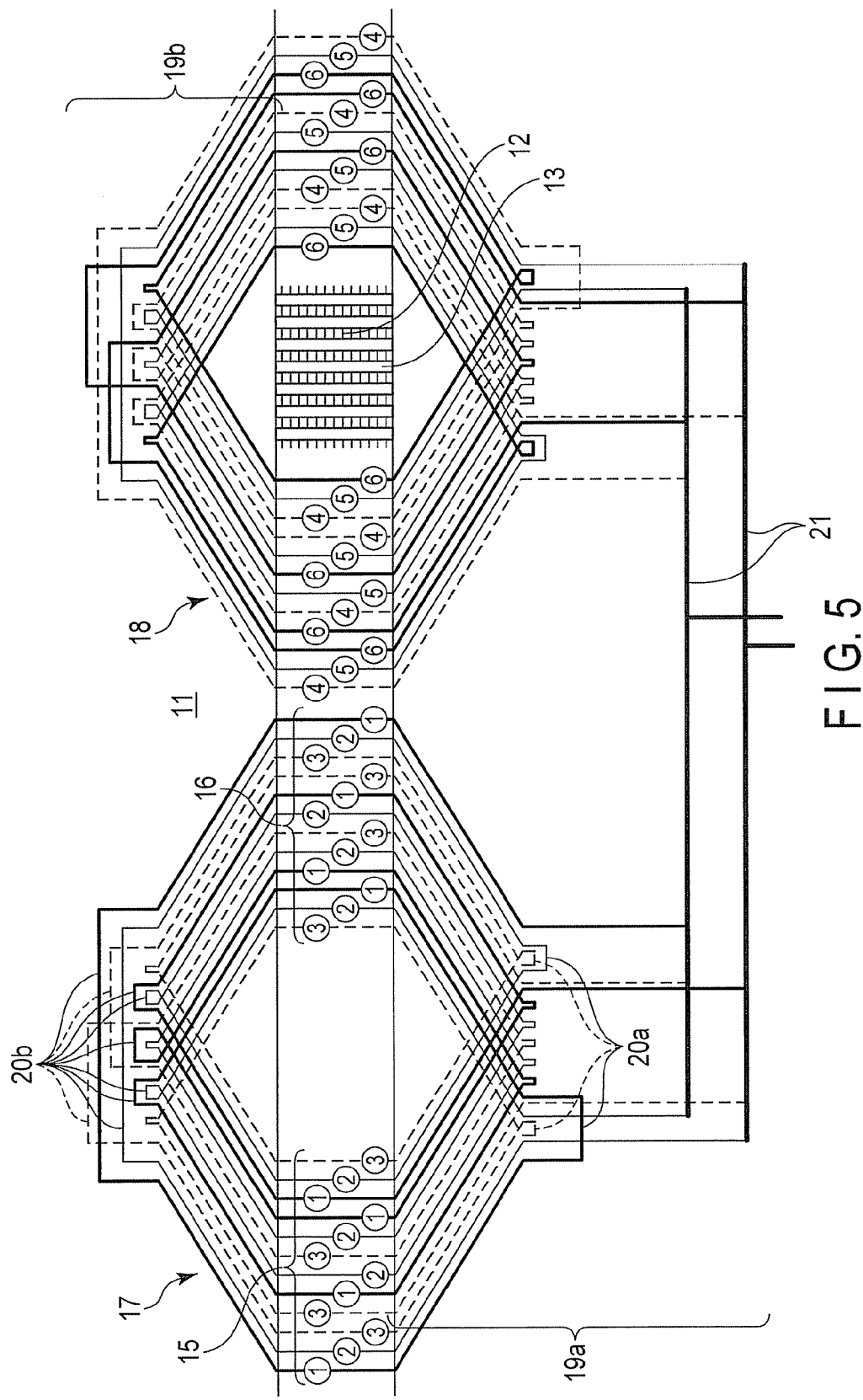
FIG. 5 is a developed perspective view showing one phase of an armature winding of a rotating electrical machine in a fifth embodiment of the present invention.

FIG. 5 is a developed perspective view showing one phase of an armature winding of a rotating electrical machine in a fifth embodiment of the present invention.

As shown in FIG. 5, an armature 11 of a rotating electrical machine is provided with seventy-two slots 13 in an armature core 12 comprising a laminated iron core. In the slots 13, a 2-pole 3-phase 6-parallel-circuit armature winding is housed in two layers.

An armature winding of each phase has an upper coil piece 15 housed in the upper part of the slot, and a lower coil piece 16 housed in the lower part of the slot. The ends of the upper and lower coil pieces 15 and 16 are connected in series at a connection side coil end 19a connected to a lead-out portion of the winding, and at a non-connection side coil end 19b located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are housed in the twelve slots 13.

The armature winding of each phase has six parallel circuits. The parallel circuits are given numbers ①, ②, ③, ④, ⑤ and ⑥ for identification in the drawing.

In each phase belt 17 and 18, the upper coil piece 15 is connected to the corresponding lower coil piece 16 apart by a fixed pitch, at the connection side coil end 19a and non-connection side coil end 19b, thereby forming six parallel circuits. The parallel circuits are connected in parallel through the lead-out connection conductor 21 provided at the connection side coil end 19a, thereby forming the armature winding.

In FIG. 5, eight jumper wires 20a per phase are provided at the connection side coil end 19a of each phase 17 and 18, and eighteen jumper wires 20b per phase belt are provided at the non-connection side coil end 19b. When the relative positions of the upper and lower coil pieces 15 and 16 in each phase belt are indicated by positions from the pole center, the upper and lower coil pieces 15 and 16 of each parallel circuit are placed as shown in Table 12.

TABLE 12

| | | Relative positions from the center of pole | | | | | |
|---|---|---|---|---|---|---|---|
| | | 1 | 2 | 3 | 4 | 5 | 6 |
| Parallel circuits 1 and 4 | Upper coil piece | | | 1 | 1 | | |
| | Lower coil piece | | | 1 | 1 | | |
| Parallel circuits 2 and 5 | Upper coil piece | | 1 | | | 1 | |
| | Lower coil piece | | 1 | | | 1 | |
| Parallel circuits 3 and 6 | Upper coil piece | 1 | | | | | 1 |
| | Lower coil piece | 1 | | | | | 1 |

| | | Relative positions from the center of pole | | | | | |
|---|---|---|---|---|---|---|---|
| | | 7 | 8 | 9 | 10 | 11 | 12 |
| Parallel circuits 1 and 4 | Upper coil piece | 1 | | | | | 1 |
| | Lower coil piece | 1 | | | | | 1 |
| Parallel circuits 2 and 5 | Upper coil piece | | 1 | | | 1 | |
| | Lower coil piece | | 1 | | | 1 | |
| Parallel circuits 3 and 6 | Upper coil piece | | | 1 | 1 | | |
| | Lower coil piece | | | 1 | 1 | | |

As shown in Table 12, four upper and lower coil pieces 15 and 16 of the first and fourth parallel circuits are placed at 3rd, 4th, 8th, and 12th positions from the pole center. Four upper and lower coil pieces 15 and 16 of the second and fifth parallel circuits are placed at 2nd, 5th, 7th, and 11th positions from the pole center. Four upper and lower coil pieces 15 and 16 of the third and sixth parallel circuits are placed at 1st, 6th, 9th, and 10th positions from the pole center.

Therefore, the circuits of the upper and lower coil pieces 15 and 16 in the first phase belt 17 are numbered 3, 2, 1, 1, 2, 3, 2, 1, 3, 3, 2, 1 sequentially from the pole center side. The circuits of the upper and lower coil pieces 15 and 16 in the second phase belt 18 are numbered 6, 5, 4, 4, 5, 6, 5, 4, 6, 6, 5, 4 sequentially from the pole center side.

Table 13 shows the balance of the voltage generated in an armature winding in the fifth embodiment. In the embodiment, the balance varies with a coil pitch. Table 13 shows a case where a winding pitch is 30/36 (83.33%).

TABLE 13

| Parallel circuit | 1 | 2 | 3 | 4 | 5 | 6 |
|---|---|---|---|---|---|---|
| Voltage (p.u.) | 1.0020 | 0.9984 | 0.9996 | 1.0020 | 0.9984 | 0.9996 |
| Voltage phase (degree) | 0.000 | 0.000 | 0.000 | 0.000 | 0.000 | 0.000 |

As shown in Table 13, in the armature winding in the fifth embodiment, a voltage deviation (a deviation of a p.u. voltage from 1.0) is 0.20% maximum, and a phase angle deviation is 0.00°. These values meet the standard in the US patent of Rudolph Habermann Jr., 0.4% in voltage deviation and 0.15° in phase angle, and the voltage balance higher than that in the first embodiment is realized.

Table 14 shows a change in maximum voltage deviation and phase angle deviation with a winding pitch in the fifth embodiment. In a winding pitch range of 28/36 to 35/36 including the ones not shown in the table, the balance meets the standard in the US patent of Rudolph Habermann Jr., 0.4% in voltage deviation and 0.15° in phase angle.

TABLE 14

| Coil pitch | 27/36 | 28/36 | 29/36 | 30/36 | 33/36 | 35/36 |
|---|---|---|---|---|---|---|
| Voltage deviation | 0.49% | 0.39% | 0.29% | 0.20% | 0.15% | 0.35% |
| Phase angle deviation | 0.00° | 0.00° | 0.00° | 0.00° | 0.00° | 0.00° |

As described above, in the fifth embodiment, when a winding pitch is 28/36 to 35/36, the balance meeting the standard in the US patent of Rudolph Habermann Jr. is realized with respect to the voltages of parallel circuits, and a circulation current can be decreased.

The embodiment is not limited to the illustrated configuration. The lead-out positions may be different. For example, the coil pieces located at electrically equivalent positions in the parallel circuits 1 and 4 may be replaced.

Embodiment 6

Figure 6:
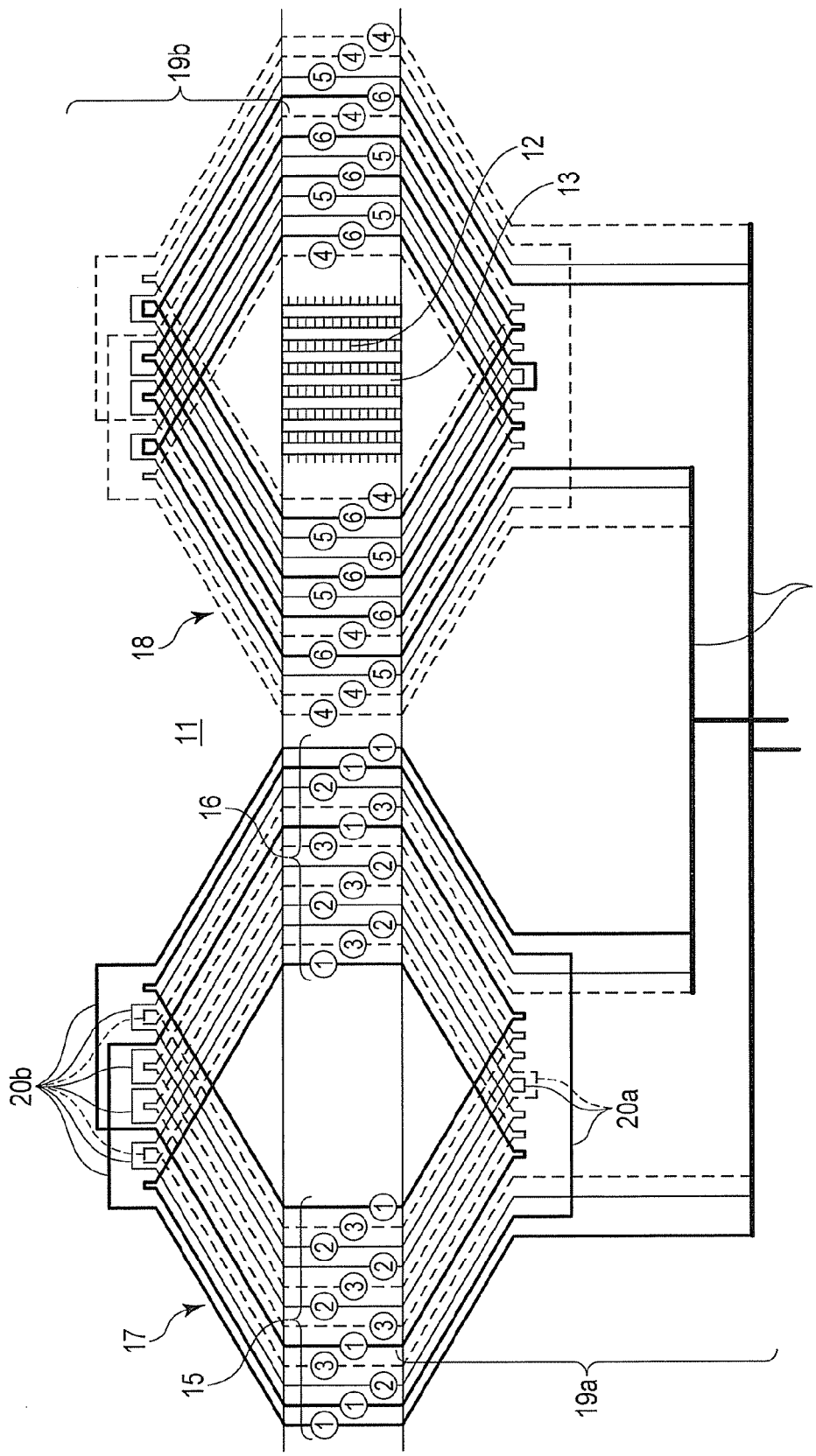
FIG. 6 is a developed perspective view showing one phase of an armature winding of a rotating electrical machine in a sixth embodiment of the present invention.

FIG. 6 is a developed perspective view showing one phase of an armature winding of a rotating electrical machine in a sixth embodiment of the present invention.

As shown in FIG. 6, an armature 11 of a rotating electrical machine is provided with seventy-two slots 13 in an armature core 12 comprising a laminated iron core. In the slots 13, a 2-pole 3-phase 6-parallel-circuit armature winding is housed in two layers.

An armature winding of each phase has an upper coil piece 15 housed in the upper part of the slot, and a lower coil piece 16 housed in the lower part of the slot. The ends of the upper and lower coil pieces 15 and 16 are connected in series at a connection side coil end 19a connected to a lead-out portion of the winding, and at a non-connection side coil end 19b located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are housed in the twelve slots 13.

The armature winding of each phase has six parallel circuits. The parallel circuits are given numbers ①, ②, ③, ④, ⑤ and ⑥ for identification in the drawing.

In each phase belt 17 and 18, the upper coil piece 15 is connected to the corresponding lower coil piece 16 apart by a fixed pitch, at the connection side coil end 19a and non-connection side coil end 19b, thereby forming six parallel circuits. The parallel circuits are connected in parallel through the lead-out connection conductor 21 provided at the connection side coil end 19a, thereby forming the armature winding.

In FIG. 6, six jumper wires 20a per phase are provided at the connection side coil end 19a of each phase 17 and 18, and sixteen jumper wires 20b per phase belt are provided at the non-connection side coil end 19b. When the relative positions of the upper and lower coil pieces 15 and 16 in each phase belt are indicated by positions from the pole center, the upper and lower coil pieces 15 and 16 of each parallel circuit are placed as shown in Table 15.

TABLE 15

| | | Relative positions from the center of pole | | | | | |
|---|---|---|---|---|---|---|---|
| | | 1 | 2 | 3 | 4 | 5 | 6 |
| Parallel circuits 1 and 4 | Upper coil piece | 1 | | | | | |
| | Lower coil piece | 1 | | | | | |
| Parallel circuits 2 and 5 | Upper coil piece | | | 1 | 1 | | 1 |
| | Lower coil piece | | | 1 | 1 | | 1 |
| Parallel circuits 3 and 6 | Upper coil piece | | 1 | | | 1 | |
| | Lower coil piece | | 1 | | | 1 | |

| | | Relative positions from the center of pole | | | | | |
|---|---|---|---|---|---|---|---|
| | | 7 | 8 | 9 | 10 | 11 | 12 |
| Parallel circuits 1 and 4 | Upper coil piece | | 1 | | | 1 | 1 |
| | Lower coil piece | | 1 | | | 1 | 1 |
| Parallel circuits 2 and 5 | Upper coil piece | | | | 1 | | |
| | Lower coil piece | | | | 1 | | |
| Parallel circuits 3 and 6 | Upper coil piece | 1 | | 1 | | | |
| | Lower coil piece | 1 | | 1 | | | |

As shown in Table 15, four upper and lower coil pieces 15 and 16 of the first and fourth parallel circuits are placed at 1st, 8th, 11th, and 12th positions from the pole center. Four upper and lower coil pieces 15 and 16 of the second and fifth parallel circuits are placed at 3rd, 4th, 6th, and 10th positions from the pole center. Four upper and lower coil pieces 15 and 16 of the third and sixth parallel circuits are placed at 2nd, 5th, 7th, and 9th positions from the pole center.

Therefore, the circuits of the upper and lower coil pieces 15 and 16 in the first phase belt 17 are numbered 1, 3, 2, 2, 3, 2, 3, 1, 3, 2, 1, 1 sequentially from the pole center side. The circuits of the upper and lower coil pieces 15 and 16 in the second phase belt 18 are numbered 4, 6, 5, 5, 6, 5, 6, 4, 6, 5, 4, 4 sequentially from the pole center side.

Table 16 shows the balance of the voltage generated in an armature winding in the sixth embodiment. In the embodiment, the balance varies with a coil pitch. Table 16 shows a case where a winding pitch is 30/36 (83.33%).

TABLE 16

| Parallel circuit | 1 | 2 | 3 | 4 | 5 | 6 |
|---|---|---|---|---|---|---|
| Voltage (p.u.) | 1.0015 | 0.9979 | 1.0005 | 1.0015 | 0.9979 | 1.0005 |
| Voltage phase (degree) | 0.000 | 0.000 | 0.000 | 0.000 | 0.000 | 0.000 |

As shown in Table 16, in the armature winding in the sixth embodiment, a voltage deviation (a deviation of a p.u. voltage from 1.0) is 0.21% maximum, and a phase angle deviation is 0.00°. These values meet the standard in the US patent of Rudolph Habermann Jr., 0.4% in voltage deviation and 0.15° in phase angle, and the voltage balance higher than that in the first embodiment is realized.

Table 17 shows a change in maximum voltage deviation and phase angle deviation with a winding pitch in the sixth embodiment. Only when a winding pitch is 30/36 does the balance meet the standard in the US patent of Rudolph Habermann Jr., 0.4% in voltage deviation and 0.15° in phase angle.

TABLE 17

| Coil pitch | 27/36 | 28/36 | 29/36 | 30/36 | 31/36 | 32/36 |
|---|---|---|---|---|---|---|
| Voltage deviation | | | 0.79% | 0.21% | 0.47% | |
| Phase angle deviation | | | 0.00° | 0.00° | 0.00° | |

As described above, in the sixth embodiment, when a winding pitch is 30/36, the balance meeting the standard in the US patent of Rudolph Habermann Jr. is realized with respect to the voltages of parallel circuits, and a circulation current can be decreased.

The embodiment is not limited to the illustrated configuration. The lead-out positions may be different. For example, the coil pieces located at electrically equivalent positions in the parallel circuits 1 and 4 may be replaced.

Embodiment 7

Figure 7:
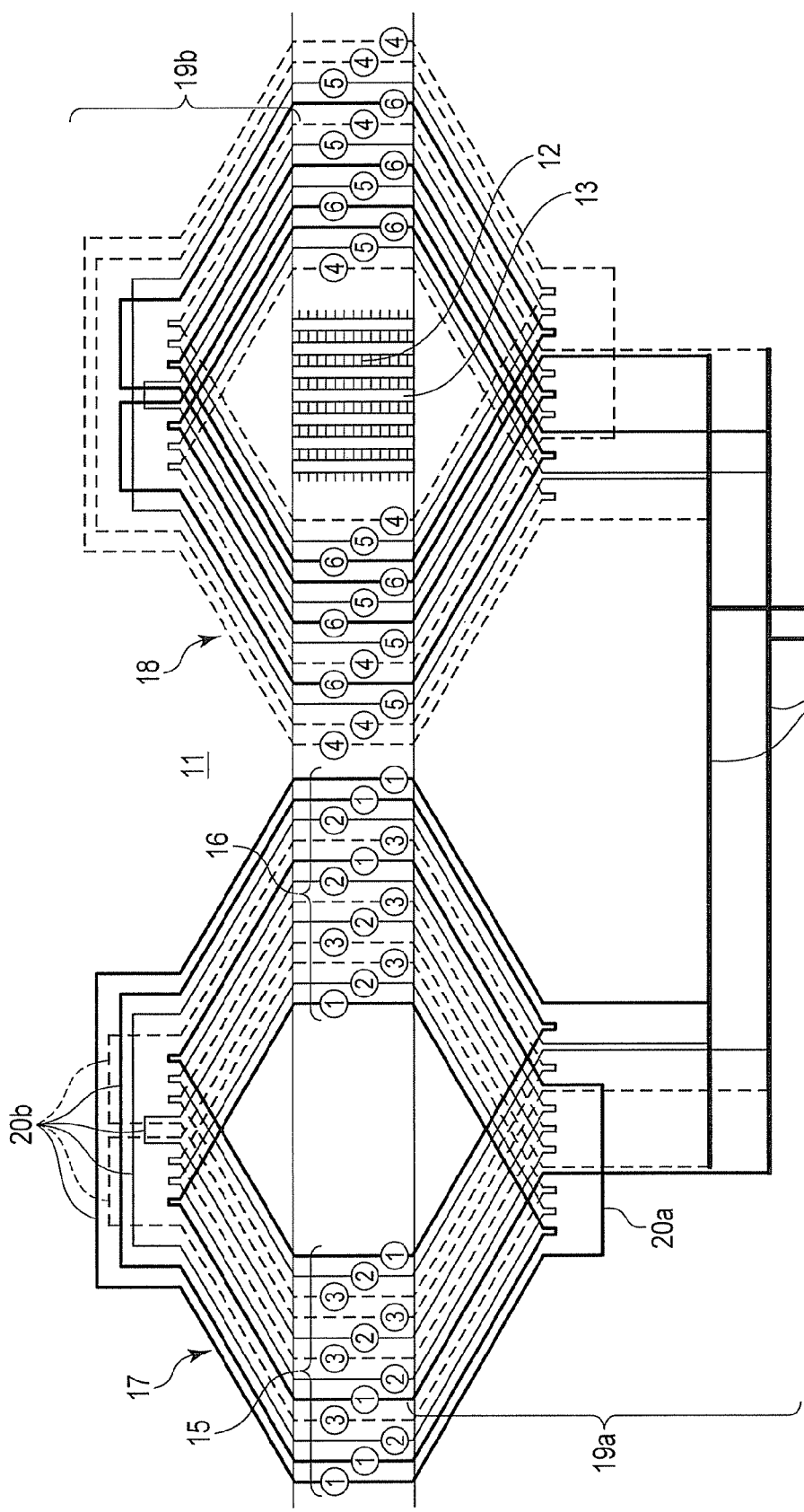
FIG. 7 is a developed perspective view showing one phase of an armature winding of a rotating electrical machine in a seventh embodiment of the present invention.

FIG. 7 is a developed perspective view showing one phase of an armature winding of a rotating electrical machine in a seventh embodiment of the present invention.

As shown in FIG. 7, an armature 11 of a rotating electrical machine is provided with seventy-two slots 13 in an armature core 12 comprising a laminated iron core. In the slots 13, a 2-pole 3-phase 6-parallel-circuit armature winding is housed in two layers.

An armature winding of each phase has an upper coil piece 15 housed in the upper part of the slot, and a lower coil piece 16 housed in the lower part of the slot. The ends of the upper and lower coil pieces 15 and 16 are connected in series at a connection side coil end 19a connected to a lead-out portion of the winding, and at a non-connection side coil end 19b located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are housed in the twelve slots 13.

The armature winding of each phase has six parallel circuits. The parallel circuits are given numbers ①, ②, ③, ④, ⑤ and ⑥ for identification in the drawing.

In each phase belt 17 and 18, the upper coil piece 15 is connected to the corresponding lower coil piece 16 apart by a fixed pitch, at the connection side coil end 19a and non-connection side coil end 19b, thereby forming six parallel circuits. The parallel circuits are connected in parallel through the lead-out connection conductor 21 provided at the connection side coil end 19a, thereby forming the armature winding.

In FIG. 7, two jumper wires 20a per phase are provided at the connection side coil end 19a of each phase 17 and 18, and twelve jumper wires 20b per phase belt are provided at the non-connection side coil end 19b. When the relative positions of the upper and lower coil pieces 15 and 16 in each phase belt are indicated by positions from the pole center, the upper and lower coil pieces 15 and 16 of each parallel circuit are placed as shown in Table 18.

TABLE 18

| | | Relative positions from the center of pole | | | | | |
|---|---|---|---|---|---|---|---|
| | | 1 | 2 | 3 | 4 | 5 | 6 |
| Parallel circuits 1 and 4 | Upper coil piece | 1 | | | | | |
| | Lower coil piece | 1 | | | | | |
| Parallel circuits 2 and 5 | Upper coil piece | | 1 | | | 1 | |
| | Lower coil piece | | 1 | | | 1 | |
| Parallel circuits 3 and 6 | Upper coil piece | | | 1 | 1 | | 1 |
| | Lower coil piece | | | 1 | 1 | | 1 |

| | | Relative positions from the center of pole | | | | | |
|---|---|---|---|---|---|---|---|
| | | 7 | 8 | 9 | 10 | 11 | 12 |
| Parallel circuits 1 and 4 | Upper coil piece | | 1 | | | 1 | 1 |
| | Lower coil piece | | 1 | | | 1 | 1 |
| Parallel circuits 2 and 5 | Upper coil piece | 1 | | | 1 | | |
| | Lower coil piece | 1 | | | 1 | | |
| Parallel circuits 3 and 6 | Upper coil piece | | | 1 | | | |
| | Lower coil piece | | | 1 | | | |

As shown in Table 18, four upper and lower coil pieces 15 and 16 of the first and fourth parallel circuits are placed at 1st, 8th, 11th, and 12th positions from the pole center. Four upper and lower coil pieces 15 and 16 of the second and fifth parallel circuits are placed at 2nd, 5th, 7th, and 10th positions from the pole center. Four upper and lower coil pieces 15 and 16 of the third and sixth parallel circuits are placed at 3rd, 4th, 6th, and 9th positions from the pole center.

Therefore, the circuits of the upper and lower coil pieces 15 and 16 in the first phase belt 17 are numbered 1, 2, 3, 3, 2, 3, 2, 1, 3, 2, 1, 1 sequentially from the pole center side. The circuits of the upper and lower coil pieces 15 and 16 in the second phase belt 18 are numbered 4, 5, 6, 6, 5, 6, 5, 4, 6, 5, 4, 4 sequentially from the pole center side.

Table 19 shows the balance of the voltage generated in an armature winding in the seventh embodiment. In the embodiment, the balance varies with a coil pitch. Table 19 shows a case where a winding pitch is 30/36 (83.33%).

TABLE 19

| Parallel circuit | 1 | 2 | 3 | 4 | 5 | 6 |
|---|---|---|---|---|---|---|
| Voltage (p.u.) | 1.0015 | 1.0005 | 0.9979 | 1.0015 | 1.0005 | 0.9979 |
| Voltage phase (degree) | 0.000 | 0.000 | 0.000 | 0.000 | 0.000 | 0.000 |

As shown in Table 19, in the armature winding in the seventh embodiment, a voltage deviation (a deviation of a p.u. voltage from 1.0) is 0.21% maximum, and a phase angle deviation is 0.00°. These values meet the standard in the US patent of Rudolph Habermann Jr., 0.4% in voltage deviation and 0.15° in phase angle, and the voltage balance higher than that in the first embodiment is realized.

Table 20 shows a change in maximum voltage deviation and phase angle deviation with a winding pitch in the seventh embodiment. Only when a winding pitch is 30/36 does the balance meet the standard in the US patent of Rudolph Habermann Jr., 0.4% in voltage deviation and 0.15° in phase angle.

TABLE 20

| Coil pitch | 27/36 | 28/36 | 29/36 | 30/36 | 31/36 | 32/36 |
|---|---|---|---|---|---|---|
| Voltage deviation | | | 0.79% | 0.21% | 0.47% | |
| Phase angle deviation | | | 0.00° | 0.00° | 0.00° | |

As described above, in the seventh embodiment, when a winding pitch is 30/36, the balance meeting the standard in the US patent of Rudolph Habermann Jr. is realized with respect to the voltages of parallel circuits, and a circulation current can be decreased.

The embodiment is not limited to the illustrated configuration. The lead-out positions may be different. For example, the coil pieces located at electrically equivalent positions in the parallel circuits 1 and 4 may be replaced.

Embodiment 8

Figure 8:
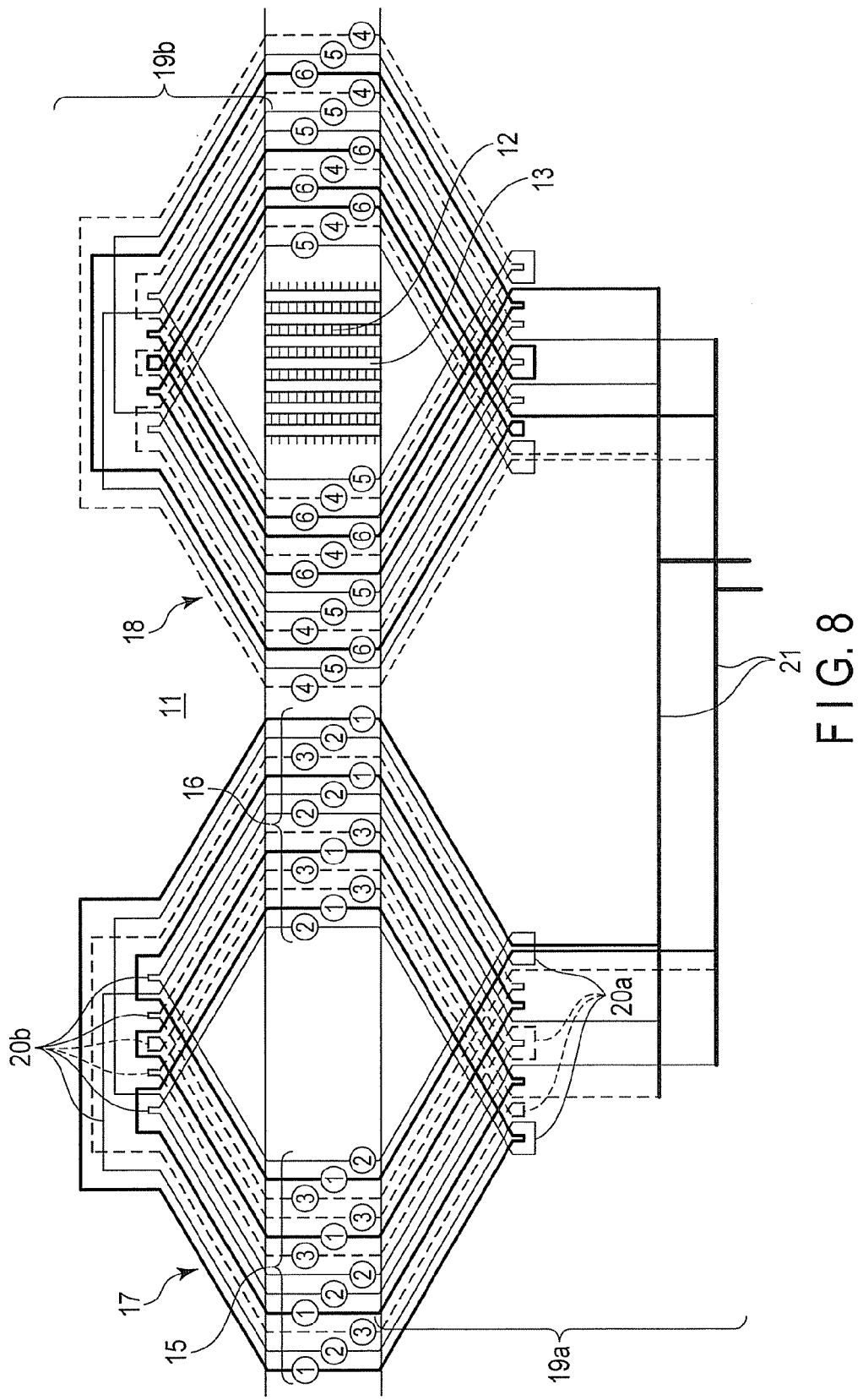
FIG. 8 is a developed perspective view showing one phase of an armature winding of a rotating electrical machine in an eighth embodiment of the present invention.

FIG. 8 is a developed perspective view showing one phase of an armature winding of a rotating electrical machine in an eighth embodiment of the present invention.

As shown in FIG. 8, an armature 11 of a rotating electrical machine is provided with seventy-two slots 13 in an armature core 12 comprising a laminated iron core. In the slots 13, a 2-pole 3-phase 6-parallel-circuit armature winding is housed in two layers.

An armature winding of each phase has an upper coil piece 15 housed in the upper part of the slot, and a lower coil piece 16 housed in the lower part of the slot. The ends of the upper and lower coil pieces 15 and 16 are connected in series at a connection side coil end 19a connected to a lead-out portion of the winding, and at a non-connection side coil end 19b located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are housed in the twelve slots 13.

The armature winding of each phase has six parallel circuits. The parallel circuits are given numbers ①, ②, ③, ④, ⑤ and ⑥ for identification in the drawing.

In each phase belt 17 and 18, the upper coil piece 15 is connected to the corresponding lower coil piece 16 apart by a fixed pitch, at the connection side coil end 19a and non-connection side coil end 19b, thereby forming six parallel circuits. The parallel circuits are connected in parallel through the lead-out connection conductor 21 provided at the connection side coil end 19a, thereby forming the armature winding.

In FIG. 8, eight jumper wires 20a per phase are provided at the connection side coil end 19a of each phase 17 and 18, and sixteen jumper wires 20b per phase belt are provided at the non-connection side coil end 19b. When the relative positions of the upper and lower coil pieces 15 and 16 in each phase belt are indicated by positions from the pole center, the upper and lower coil pieces 15 and 16 of each parallel circuit are placed as shown in Table 21.

TABLE 21

| | | Relative positions from the center of pole | | | | | |
|---|---|---|---|---|---|---|---|
| | | 1 | 2 | 3 | 4 | 5 | 6 |
| Parallel circuits 1 and 4 | Upper coil piece | | 1 | | | 1 | |
| | Lower coil piece | | 1 | | | 1 | |
| Parallel circuits 2 and 5 | Upper coil piece | 1 | | | | | |
| | Lower coil piece | 1 | | | | | |
| Parallel circuits 3 and 6 | Upper coil piece | | | | 1 | 1 | 1 |
| | Lower coil piece | | | | 1 | 1 | 1 |

| | | Relative positions from the center of pole | | | | | |
|---|---|---|---|---|---|---|---|
| | | 7 | 8 | 9 | 10 | 11 | 12 |
| Parallel circuits 1 and 4 | Upper coil piece | | | 1 | | | 1 |
| | Lower coil piece | | | 1 | | | 1 |
| Parallel circuits 2 and 5 | Upper coil piece | 1 | 1 | | | 1 | |
| | Lower coil piece | 1 | 1 | | | 1 | |
| Parallel circuits 3 and 6 | Upper coil piece | | | | 1 | | |
| | Lower coil piece | | | | 1 | | |

As shown in Table 21, four upper and lower coil pieces 15 and 16 of the first and fourth parallel circuits are placed at 2nd, 5th, 9th, and 12th positions from the pole center. Four upper and lower coil pieces 15 and 16 of the second and fifth parallel circuits are placed at 1st, 7th, 8th, and 11th positions from the pole center. Four upper and lower coil pieces 15 and 16 of the third and sixth parallel circuits are placed at 3rd, 4th, 6th, and 10th positions from the pole center.

Therefore, the circuits of the upper and lower coil pieces 15 and 16 in the first phase belt 17 are numbered 2, 1, 3, 3, 1, 3, 2, 2, 1, 3, 2, 1 sequentially from the pole center side. The circuits of the upper and lower coil pieces 15 and 16 in the second phase belt 18 are numbered 5, 4, 6, 6, 4, 6, 5, 5, 4, 6, 5, 4 sequentially from the pole center side.

Table 22 shows the balance of the voltage generated in an armature winding in the eight embodiment. In the embodiment, the balance varies with a coil pitch. Table 22 shows a case where a winding pitch is 30/36 (83.33%).

TABLE 22

| Parallel circuit | 1 | 2 | 3 | 4 | 5 | 6 |
|---|---|---|---|---|---|---|
| Voltage (p.u.) | 1.0005 | 1.0015 | 0.9979 | 1.0005 | 1.0015 | 0.9979 |
| Voltage phase (degree) | 0.000 | 0.000 | 0.000 | 0.000 | 0.000 | 0.000 |

As shown in Table 22, in the armature winding in the eighth embodiment, a voltage deviation (a deviation of a p.u. voltage from 1.0) is 0.21% maximum, and a phase angle deviation is 0.00°. These values meet the standard in the US patent of Rudolph Habermann Jr., 0.4% in voltage deviation and 0.15° in phase angle, and the voltage balance higher than that in the first embodiment is realized.

Table 23 shows a change in maximum voltage deviation and phase angle deviation with a winding pitch in the eighth embodiment. When a winding pitch is 30/36 or 31/36, the balance meets the standard in the US patent of Rudolph Habermann Jr., 0.4% in voltage deviation and 0.15° in phase angle.

TABLE 23

| Coil pitch | 27/36 | 28/36 | 29/36 | 30/36 | 31/36 | 32/36 |
|---|---|---|---|---|---|---|
| Voltage deviation | | | 0.53% | 0.21% | 0.15% | 0.42% |
| Phase angle deviation | | | 0.00° | 0.00° | 0.00° | 0.00° |

As described above, in the eighth embodiment, when a winding pitch is 30/36 or 31/36, the balance meeting the standard in the US patent of Rudolph Habermann Jr. is realized with respect to the voltages of parallel circuits, and a circulation current can be decreased.

The embodiment is not limited to the illustrated configuration. The lead-out positions may be different. For example, the coil pieces located at electrically equivalent positions in the parallel circuits 1 and 4 may be replaced.

Embodiment 9

Figure 9:
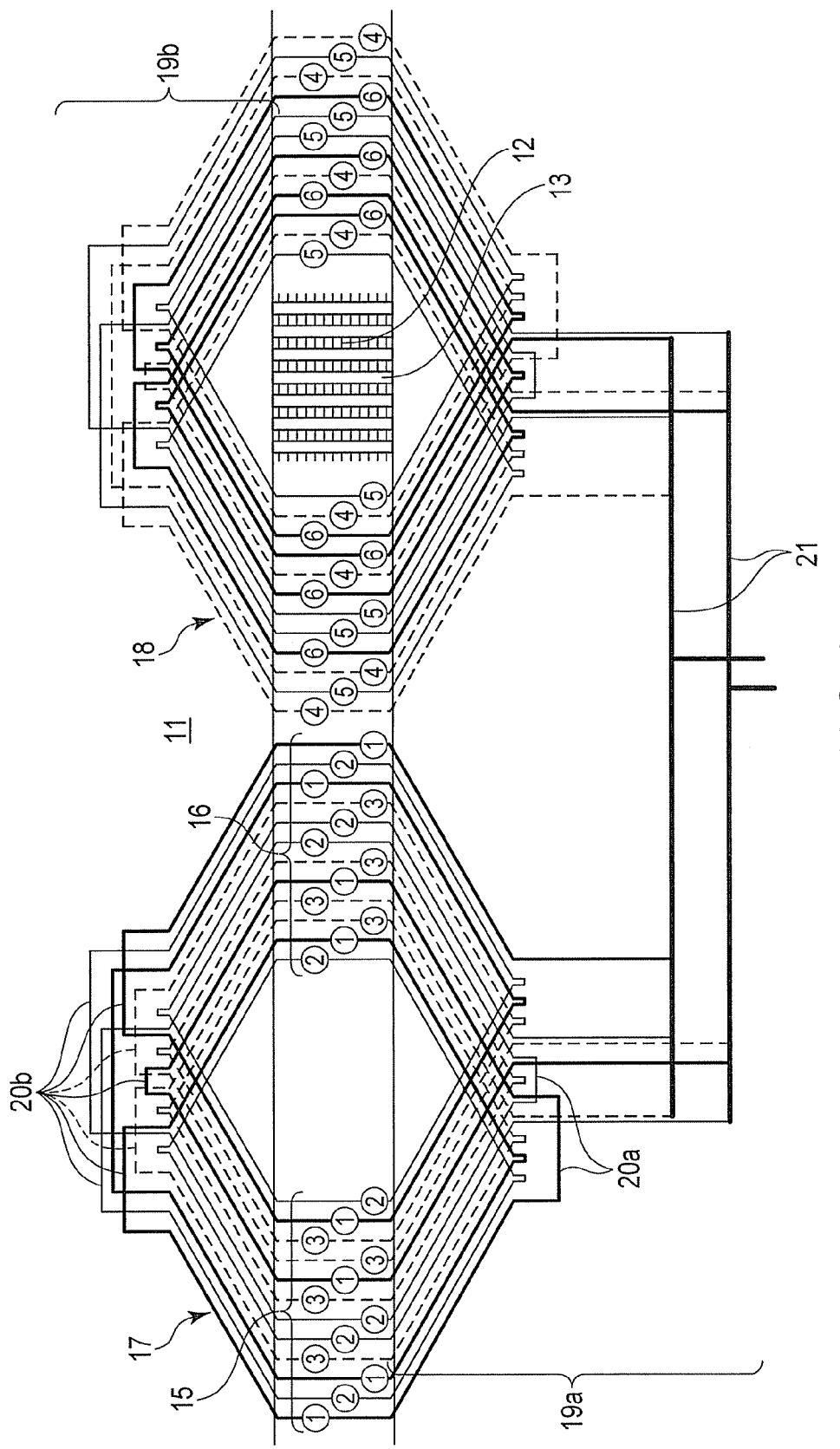
FIG. 9 is a developed perspective view showing one phase of an armature winding of a rotating electrical machine in a ninth embodiment of the present invention.

FIG. 9 is a developed perspective view showing one phase of an armature winding of a rotating electrical machine in a ninth embodiment of the present invention.

As shown in FIG. 9, an armature 11 of a rotating electrical machine is provided with seventy-two slots 13 in an armature core 12 comprising a laminated iron core. In the slots 13, a 2-pole 3-phase 6-parallel-circuit armature winding is housed in two layers.

An armature winding of each phase has an upper coil piece 15 housed in the upper part of the slot, and a lower coil piece 16 housed in the lower part of the slot. The ends of the upper and lower coil pieces 15 and 16 are connected in series at a connection side coil end 19a connected to a lead-out portion of the winding, and at a non-connection side coil end 19b located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are housed in the twelve slots 13.

The armature winding of each phase has six parallel circuits. The parallel circuits are given numbers ①, ②, ③, ④, ⑤ and ⑥ identification in the drawing.

In each phase belt 17 and 18, the upper coil piece 15 is connected to the corresponding lower coil piece 16 apart by a fixed pitch, at the connection side coil end 19a and non-connection side coil end 19b, thereby forming six parallel circuits. The parallel circuits are connected in parallel through the lead-out connection conductor 21 provided at the connection side coil end 19a, thereby forming the armature winding.

In FIG. 9, four jumper wires 20a per phase are provided at the connection side coil end 19a of each phase 17 and 18, and sixteen jumper wires 20b per phase belt are provided at the non-connection side coil end 19b. When the relative positions of the upper and lower coil pieces 15 and 16 in each phase belt are indicated by positions from the pole center, the upper and lower coil pieces 15 and 16 of each parallel circuit are placed as shown in Table 24.

TABLE 24

| | | Relative positions from the center of pole | | | | | |
|---|---|---|---|---|---|---|---|
| | | 1 | 2 | 3 | 4 | 5 | 6 |
| Parallel circuits 1 and 4 | Upper coil piece | | 1 | | | 1 | |
| | Lower coil piece | | 1 | | | 1 | |
| Parallel circuits 2 and 5 | Upper coil piece | 1 | | | | | |
| | Lower coil piece | 1 | | | | | |
| Parallel circuits 3 and 6 | Upper coil piece | | | | 1 | 1 | 1 |
| | Lower coil piece | | | | 1 | 1 | 1 |

| | | Relative positions from the center of pole | | | | | |
|---|---|---|---|---|---|---|---|
| | | 7 | 8 | 9 | 10 | 11 | 12 |
| Parallel circuits 1 and 4 | Upper coil piece | | | | 1 | | 1 |
| | Lower coil piece | | | | 1 | | 1 |
| Parallel circuits 2 and 5 | Upper coil piece | 1 | 1 | | | 1 | |
| | Lower coil piece | 1 | 1 | | | 1 | |
| Parallel circuits 3 and 6 | Upper coil piece | | | 1 | | | |
| | Lower coil piece | | | 1 | | | |

As shown in Table 24, four upper and lower coil pieces 15 and 16 of the first and fourth parallel circuits are placed at 2nd, 5th, 10th, and 12th positions from the pole center. Four upper and lower coil pieces 15 and 16 of the second and fifth parallel circuits are placed at 1st, 7th, 8th, and 11th positions from the pole center. Four upper and lower coil pieces 15 and 16 of the third and sixth parallel circuits are placed at 3rd, 4th, 6th, and 9th positions from the pole center.

Therefore, the circuits of the upper and lower coil pieces 15 and 16 in the first phase belt 17 are numbered 2, 1, 3, 3, 1, 3, 2, 2, 3, 1, 2, 1 sequentially from the pole center side. The circuits of the upper and lower coil pieces 15 and 16 in the second phase belt 18 are numbered 5, 4, 6, 6, 4, 6, 5, 5, 6, 4, 5, 4 sequentially from the pole center side.

Table 25 shows the balance of the voltage generated in an armature winding in the ninth embodiment. In the embodiment, the balance varies with a coil pitch. Table 25 shows a case where a winding pitch is 30/36 (83.33%).

TABLE 25

| Parallel circuit | 1 | 2 | 3 | 4 | 5 | 6 |
|---|---|---|---|---|---|---|
| Voltage (p.u.) | 1.0005 | 1.0015 | 0.9979 | 1.0005 | 1.0015 | 0.9979 |
| Voltage phase (degree) | 0.000 | 0.000 | 0.000 | 0.000 | 0.000 | 0.000 |

As shown in Table 25, in the armature winding in the ninth embodiment, a voltage deviation (a deviation of a p.u. voltage from 1.0) is 0.21% maximum, and a phase angle deviation is 0.00°. These values meet the standard in the US patent of Rudolph Habermann Jr., 0.4% in voltage deviation and 0.15° in phase angle, and the voltage balance higher than that in the first embodiment is realized.

Table 26 shows a change in maximum voltage deviation and phase angle deviation with a winding pitch in the ninth embodiment. When a winding pitch is 30/36 or 31/36, the balance meets the standard in the US patent of Rudolph Habermann Jr., 0.4% in voltage deviation and 0.15° in phase angle.

TABLE 26

| Coil pitch | 27/36 | 28/36 | 29/36 | 30/36 | 31/36 | 32/36 |
|---|---|---|---|---|---|---|
| Voltage deviation | | | 0.63% | 0.21% | 0.25% | 0.62% |
| Phase angle deviation | | | 0.00° | 0.00° | 0.00° | 0.00° |

As described above, in the ninth embodiment, when a winding pitch is 30/36 or 31/36, the balance meeting the standard in the US patent of Rudolph Habermann Jr. is realized with respect to the voltages of parallel circuits, and a circulation current can be decreased.

The embodiment is not limited to the illustrated configuration. The lead-out positions may be different. For example, the coil pieces located at electrically equivalent positions in the parallel circuits 1 and 4 may be replaced.

Embodiment 10

Figure 10:
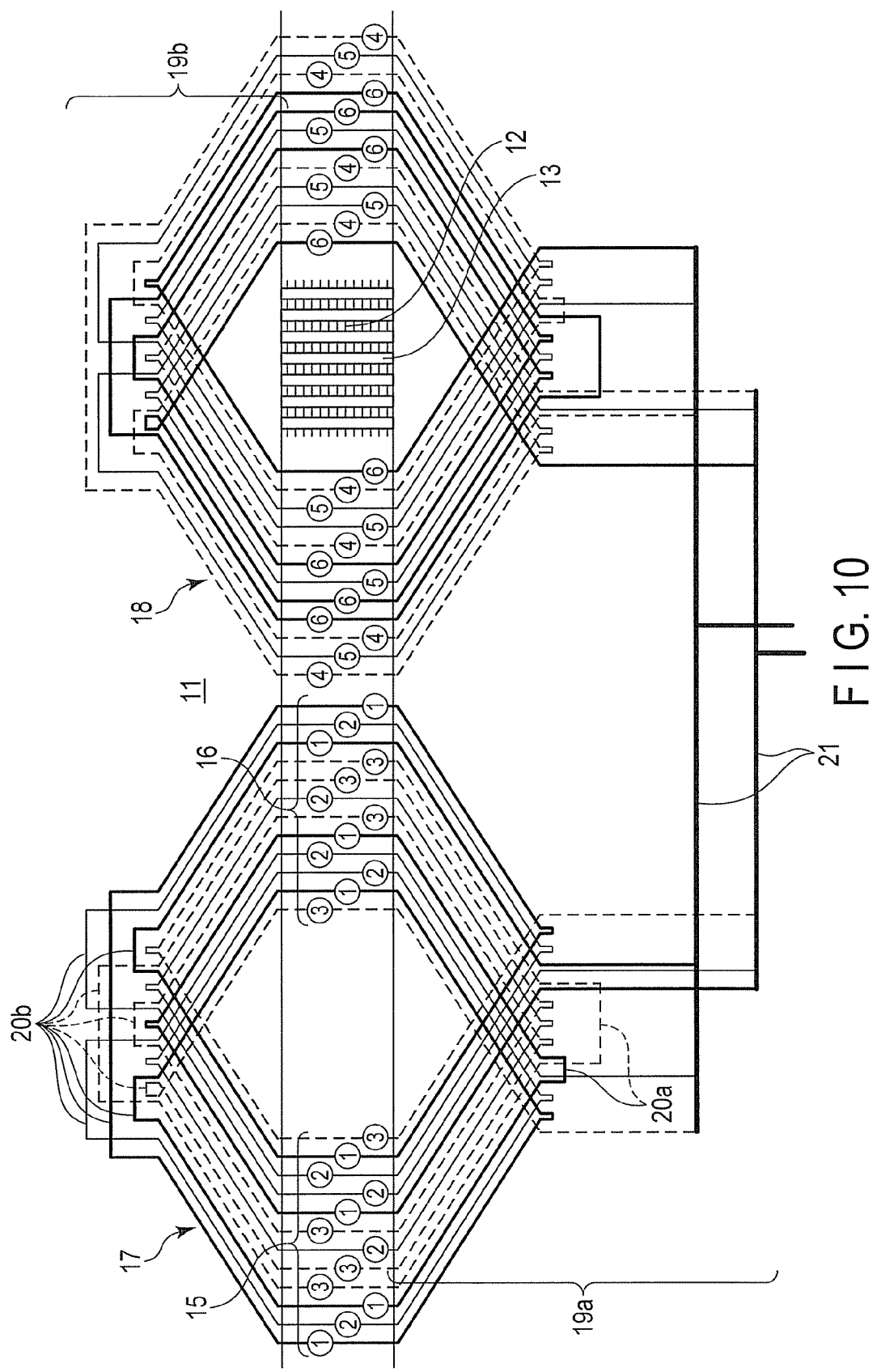
FIG. 10 is a developed perspective view showing one phase of an armature winding of a rotating electrical machine in a tenth embodiment of the present invention.

FIG. 10 is a developed perspective view showing one phase of an armature winding of a rotating electrical machine in a tenth embodiment of the present invention.

As shown in FIG. 10, an armature 11 of a rotating electrical machine is provided with seventy-two slots 13 in an armature core 12 comprising a laminated iron core. In the slots 13, a 2-pole 3-phase 6-parallel-circuit armature winding is housed in two layers.

An armature winding of each phase has an upper coil piece 15 housed in the upper part of the slot, and a lower coil piece 16 housed in the lower part of the slot. The ends of the upper and lower coil pieces 15 and 16 are connected in series at a connection side coil end 19*a* connected to a lead-out portion of the winding, and at a non-connection side coil end 19*b* located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are housed in the twelve slots 13.

The armature winding of each phase has six parallel circuits. The parallel circuits are given numbers ①, ②, ③, ④, ⑤ and ⑥ for identification in the drawing.

In each phase belt 17 and 18, the upper coil piece 15 is connected to the corresponding lower coil piece 16 apart by a fixed pitch, at the connection side coil end 19*a* and non-connection side coil end 19*b*, thereby forming six parallel circuits. The parallel circuits are connected in parallel through the lead-out connection conductor 21 provided at the connection side coil end 19*a*, thereby forming the armature winding.

In FIG. 10, four jumper wires 20*a* per phase are provided at the connection side coil end 19*a* of each phase 17 and 18, and sixteen jumper wires 20*b* per phase belt are provided at the non-connection side coil end 19*b*. When the relative positions of the upper and lower coil pieces 15 and 16 in each phase belt are indicated by positions from the pole center, the upper and lower coil pieces 15 and 16 of each parallel circuit are placed as shown in Table 27.

TABLE 27

| | | Relative positions from the center of pole | | | | | |
|---|---|---|---|---|---|---|---|
| | | 1 | 2 | 3 | 4 | 5 | 6 |
| Parallel circuits 1 and 4 | Upper coil piece | 1 | | | | 1 | |
| | Lower coil piece | 1 | | | | 1 | |
| Parallel circuits 2 and 5 | Upper coil piece | | | 1 | 1 | | |
| | Lower coil piece | | | 1 | 1 | | |
| Parallel circuits 3 and 6 | Upper coil piece | 1 | | | | | 1 |
| | Lower coil piece | 1 | | | | | 1 |

| | | Relative positions from the center of pole | | | | | |
|---|---|---|---|---|---|---|---|
| | | 7 | 8 | 9 | 10 | 11 | 12 |
| Parallel circuits 1 and 4 | Upper coil piece | | | | 1 | | 1 |
| | Lower coil piece | | | | 1 | | 1 |
| Parallel circuits 2 and 5 | Upper coil piece | 1 | | | | 1 | |
| | Lower coil piece | 1 | | | | 1 | |
| Parallel circuits 3 and 6 | Upper coil piece | | 1 | 1 | | | |
| | Lower coil piece | | 1 | 1 | | | |

As shown in Table 27, four upper and lower coil pieces 15 and 16 of the first and fourth parallel circuits are placed at 2nd, 5th, 10th, and 12th positions from the pole center. Four upper and lower coil pieces 15 and 16 of the second and fifth parallel circuits are placed at 3rd, 4th, 7th, and 11th positions from the pole center. Four upper and lower coil pieces 15 and 16 of the third and sixth parallel circuits are placed at 1st, 6th, 8th, and 9th positions from the pole center.

Therefore, the circuits of the upper and lower coil pieces 15 and 16 in the first phase belt 17 are numbered 3, 1, 2, 2, 1, 3, 2, 3, 3, 1, 2, 1 sequentially from the pole center side. The circuits of the upper and lower coil pieces 15 and 16 in the second phase belt 18 are numbered 6, 4, 5, 5, 4, 6, 5, 6, 6, 4, 5, 4 sequentially from the pole center side.

Table 28 shows the balance of the voltage generated in an armature winding in the tenth embodiment. In the embodiment, the balance varies with a coil pitch. Table 28 shows a case where a winding pitch is 30/36 (83.33%).

TABLE 28

| | Parallel circuit | | | | | |
|---|---|---|---|---|---|---|
| | 1 | 2 | 3 | 4 | 5 | 6 |
| Voltage (p.u.) | 1.0005 | 1.0020 | 0.9975 | 1.0005 | 1.0020 | 0.9975 |
| Voltage phase (degree) | 0.000 | 0.000 | 0.000 | 0.000 | 0.000 | 0.000 |

As shown in Table 28, in the armature winding in the tenth embodiment, a voltage deviation (a deviation of a p.u. voltage from 1.0) is 0.25% maximum, and a phase angle deviation is 0.00°. These values meet the standard in the US patent of Rudolph Habermann Jr., 0.4% in voltage deviation and 0.15° in phase angle, and the voltage balance higher than that in the first embodiment is realized.

Table 29 shows a change in maximum voltage deviation and phase angle deviation with a winding pitch in the tenth embodiment. When a winding pitch is 30/36 or 31/36, the balance meets the standard in the US patent of Rudolph Habermann Jr., 0.4% in voltage deviation and 0.15° in phase angle.

TABLE 29

| | \multicolumn{6}{c}{Coil pitch} | | | | | |
|---|---|---|---|---|---|---|
| | 27/36 | 28/36 | 29/36 | 30/36 | 31/36 | 32/36 |
| Voltage deviation | | | 0.45% | 0.25% | 0.31% | 0.55% |
| Phase angle deviation | | | 0.00° | 0.00° | 0.00° | 0.00° |

As described above, in the tenth embodiment, when a winding pitch is 30/36 or 31/36, the balance meeting the standard in the US patent of Rudolph Habermann Jr. is realized with respect to the voltages of parallel circuits, and a circulation current can be decreased.

The embodiment is not limited to the illustrated configuration. The lead-out positions may be different. For example, the coil pieces located at electrically equivalent positions in the parallel circuits 1 and 4 may be replaced.

Embodiment 11

Figure 11:
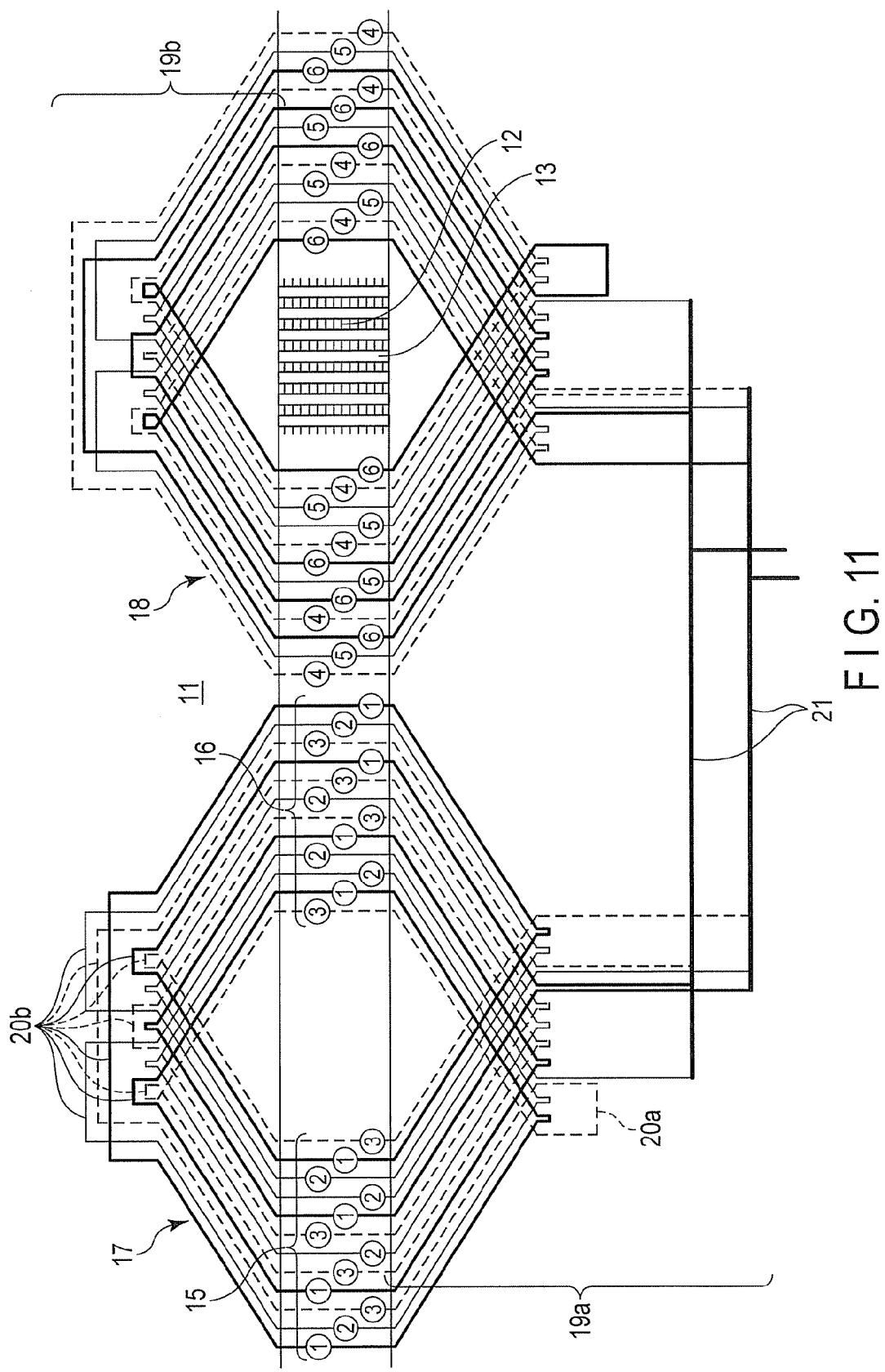
FIG. 11 is a developed perspective view showing one phase of an armature winding of a rotating electrical machine in an eleventh embodiment of the present invention.

FIG. 11 is a developed perspective view showing one phase of an armature winding of a rotating electrical machine in an eleventh embodiment of the present invention.

As shown in FIG. 11, an armature 11 of a rotating electrical machine is provided with seventy-two slots 13 in an armature core 12 comprising a laminated iron core. In the slots 13, a 2-pole 3-phase 6-parallel-circuit armature winding is housed in two layers.

An armature winding of each phase has an upper coil piece 15 housed in the upper part of the slot, and a lower coil piece 16 housed in the lower part of the slot. The ends of the upper and lower coil pieces 15 and 16 are connected in series at a connection side coil end 19a connected to a lead-out portion of the winding, and at a non-connection side coil end 19b located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are housed in the twelve slots 13.

The armature winding of each phase has six numbers ①, ②, ③, ④, ⑤ and ⑥ for identification in the drawing.

In each phase belt 17 and 18, the upper coil piece 15 is connected to the corresponding lower coil piece 16 apart by a fixed pitch, at the connection side coil end 19a and non-connection side coil end 19b, thereby forming six parallel circuits. The parallel circuits are connected in parallel through the lead-out connection conductor 21 provided at the connection side coil end 19a, thereby forming the armature winding.

In FIG. 11, two jumper wires 20a per phase are provided at the connection side coil end 19a of each phase 17 and 18, and eighteen jumper wires 20b per phase belt are provided at the non-connection side coil end 19b. When the relative positions of the upper and lower coil pieces 15 and 16 in each phase belt are indicated by positions from the pole center, the upper and lower coil pieces 15 and 16 of each parallel circuit are placed as shown in Table 30.

TABLE 30

| | | \multicolumn{6}{c}{Relative positions from the center of pole} | | | | | |
|---|---|---|---|---|---|---|---|
| | | 1 | 2 | 3 | 4 | 5 | 6 |
| Parallel circuits 1 and 4 | Upper coil piece | | 1 | | | 1 | |
| | Lower coil piece | | 1 | | | 1 | |
| Parallel circuits 2 and 5 | Upper coil piece | | | 1 | 1 | | |
| | Lower coil piece | | | 1 | 1 | | |
| Parallel circuits 3 and 6 | Upper coil piece | 1 | | | | | 1 |
| | Lower coil piece | 1 | | | | | 1 |

| | | \multicolumn{6}{c}{Relative positions from the center of pole} | | | | | |
|---|---|---|---|---|---|---|---|
| | | 7 | 8 | 9 | 10 | 11 | 12 |
| Parallel circuits 1 and 4 | Upper coil piece | | | 1 | | | 1 |
| | Lower coil piece | | | 1 | | | 1 |
| Parallel circuits 2 and 5 | Upper coil piece | 1 | | | | 1 | |
| | Lower coil piece | 1 | | | | 1 | |
| Parallel circuits 3 and 6 | Upper coil piece | | 1 | | 1 | | |
| | Lower coil piece | | 1 | | 1 | | |

As shown in Table 30, four upper and lower coil pieces 15 and 16 of the first and fourth parallel circuits are placed at 2nd, 5th, 9th, and 12th positions from the pole center. Four upper and lower coil pieces 15 and 16 of the second and fifth parallel circuits are placed at 3rd, 4th, 7th, and 11th positions from the pole center. Four upper and lower coil pieces 15 and 16 of the third and sixth parallel circuits are placed at 1st, 6th, 8th, and 10th positions from the pole center.

Therefore, the circuits of the upper and lower coil pieces 15 and 16 in the first phase belt 17 are numbered 3, 1, 2, 2, 1, 3, 2, 3, 1, 3, 2, 1 sequentially from the pole center side. The circuits of the upper and lower coil pieces 15 and 16 in the second phase belt 18 are numbered 6, 4, 5, 5, 4, 6, 5, 6, 4, 6, 5, 4 sequentially from the pole center side.

Table 31 shows the balance of the voltage generated in an armature winding in the eleventh embodiment. In the embodiment, the balance varies with a coil pitch. Table 28 shows a case where a winding pitch is 30/36 (83.33%).

TABLE 31

| | \multicolumn{6}{c}{Parallel circuit} | | | | | |
|---|---|---|---|---|---|---|
| | 1 | 2 | 3 | 4 | 5 | 6 |
| Voltage (p.u.) | 1.0005 | 1.0020 | 0.9975 | 1.0005 | 1.0020 | 0.9975 |
| Voltage phase (degree) | 0.000 | 0.000 | 0.000 | 0.000 | 0.000 | 0.000 |

As shown in Table 31, in the armature winding in the eleventh embodiment, a voltage deviation (a deviation of a p.u. voltage from 1.0) is 0.25% maximum, and a phase angle deviation is 0.00°. These values meet the standard in the US patent of Rudolph Habermann Jr., 0.4% in voltage deviation and 0.15° in phase angle, and the voltage balance higher than that in the first embodiment is realized.

Table 32 shows a change in maximum voltage deviation and phase angle deviation with a winding pitch in the eleventh embodiment. When a winding pitch is in a range of 29/36 to 31/36, the balance meets the standard in the US patent of Rudolph Habermann Jr., 0.4% in voltage deviation and 0.15° in phase angle.

TABLE 32

| | Coil pitch | | | | | |
|---|---|---|---|---|---|---|
| | 27/36 | 28/36 | 29/36 | 30/36 | 31/36 | 32/36 |
| Voltage deviation | 0.46% | 0.34% | 0.25% | 0.31% | 0.42% | |
| Phase angle deviation | | 0.00° | 0.00° | 0.00° | 0.00° | 0.00° |

As described above, in the eleventh embodiment, when a winding pitch is in a range of 29/36 to 31/36, the balance meeting the standard in the US patent of Rudolph Habermann Jr. is realized with respect to the voltages of parallel circuits, and a circulation current can be decreased.

The embodiment is not limited to the illustrated configuration. The lead-out positions may be different. For example, the coil pieces located at electrically equivalent positions in the parallel circuits 1 and 4 may be replaced.

Embodiment 12

Figure 12:
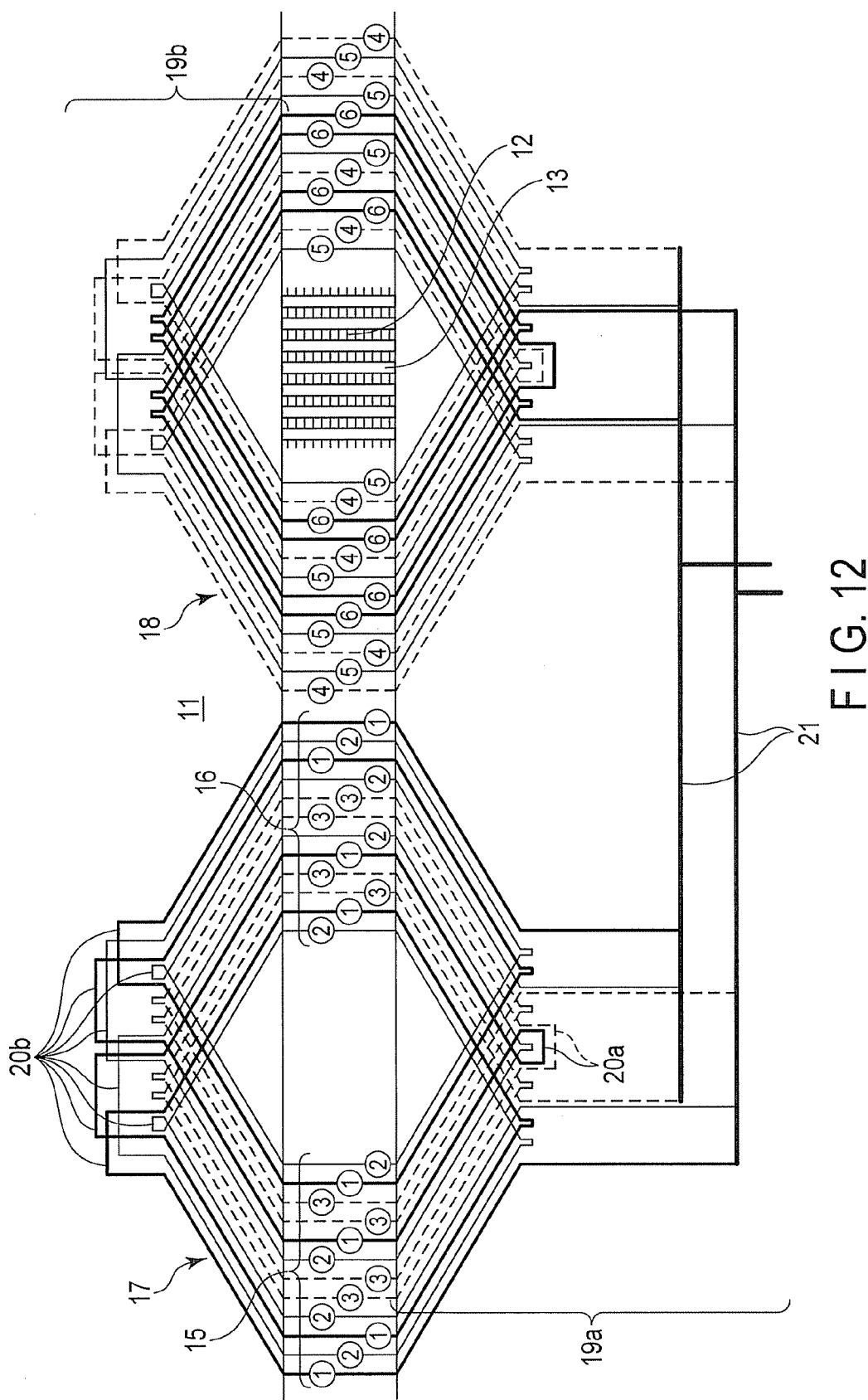
FIG. 12 is a developed perspective view showing one phase of an armature winding of a rotating electrical machine in a twelfth embodiment of the present invention.

FIG. 12 is a developed perspective view showing one phase of an armature winding of a rotating electrical machine in a twelfth embodiment of the present invention.

As shown in FIG. 12, an armature 11 of a rotating electrical machine is provided with seventy-two slots 13 in an armature core 12 comprising a laminated iron core. In the slots 13, a 2-pole 3-phase 6-parallel-circuit armature winding is housed in two layers.

An armature winding of each phase has an upper coil piece 15 housed in the upper part of the slot, and a lower coil piece 16 housed in the lower part of the slot. The ends of the upper and lower coil pieces 15 and 16 are connected in the series at a connection side coil end 19a connected to a lead-out portion of the winding, and at a non-connection side coil end 19b located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are housed in the twelve slots 13.

The armature winding of each phase has six numbers ①, ②, ③, ④, ⑤ and ⑥ for identification in the drawing.

In each phase belt 17 and 18, the upper coil piece 15 is connected to the corresponding lower coil piece 16 apart by a fixed pitch, at the connection side coil end 19a and non-connection side coil end 19b, thereby forming six parallel circuits. The parallel circuits are connected in parallel through the lead-out connection conductor. 21 provided at the connection side coil end 19a, thereby forming the armature winding.

In FIG. 12, four jumper wires 20a per phase are provided at the connection side coil end 19a of each phase 17 and 18, and sixteen jumper wires 20b per phase belt are provided at the non-connection side coil end 19b. When the relative positions of the upper and lower coil pieces 15 and 16 in each phase belt are indicated by positions from the pole center, the upper and lower coil pieces 15 and 16 of each parallel circuit are placed as shown in Table 33.

TABLE 33

| | | Relative positions from the center of pole | | | | | |
|---|---|---|---|---|---|---|---|
| | | 1 | 2 | 3 | 4 | 5 | 6 |
| Parallel circuits 1 and 4 | Upper coil piece | | 1 | | | 1 | |
| | Lower coil piece | | 1 | | | 1 | |
| Parallel circuits 2 and 5 | Upper coil piece | 1 | | | | | 1 |
| | Lower coil piece | 1 | | | | | 1 |
| Parallel circuits 3 and 6 | Upper coil piece | | | 1 | 1 | | |
| | Lower coil piece | | | 1 | 1 | | |

| | | Relative positions from the center of pole | | | | | |
|---|---|---|---|---|---|---|---|
| | | 7 | 8 | 9 | 10 | 11 | 12 |
| Parallel circuits 1 and 4 | Upper coil piece | | | | 1 | | 1 |
| | Lower coil piece | | | | 1 | | 1 |
| Parallel circuits 2 and 5 | Upper coil piece | | | 1 | | 1 | |
| | Lower coil piece | | | 1 | | 1 | |
| Parallel circuits 3 and 6 | Upper coil piece | 1 | 1 | | | | |
| | Lower coil piece | 1 | 1 | | | | |

As shown in Table 33, four upper and lower coil pieces 15 and 16 of the first and fourth parallel circuits are placed at 2nd, 5th, 10th, and 12th positions from the pole center. Four upper and lower coil pieces 15 and 16 of the second and fifth parallel circuits are placed at 1st, 6th, 9th, and 11th positions from the pole center. Four upper and lower coil pieces 15 and 16 of the third and sixth parallel circuits are placed at 3rd, 4th, 7th, and 8th positions from the pole center.

Therefore, the circuits of the upper and lower coil pieces 15 and 16 in the first phase belt 17 are numbered 2, 1, 3, 3, 1, 2, 3, 3, 2, 1, 2, 1 sequentially from the pole center side. The circuits of the upper and lower coil pieces 15 and 16 in the second phase belt 18 are numbered 5, 4, 6, 6, 4, 5, 6, 6, 5, 4, 5, 4 sequentially from the pole center side.

Table 34 shows the balance of the voltage generated in an armature winding in the twelfth embodiment. In the embodiment, the balance varies with a coil pitch. Table 34 shows a case where a winding pitch is 30/36 (83.33%).

TABLE 34

| | Parallel circuit | | | | | |
|---|---|---|---|---|---|---|
| | 1 | 2 | 3 | 4 | 5 | 6 |
| Voltage (p.u.) | 1.0005 | 0.9975 | 1.0020 | 1.0005 | 0.9975 | 1.0020 |
| Voltage phase (degree) | 0.000 | 0.000 | 0.000 | 0.000 | 0.000 | 0.000 |

As shown in Table 34, in the armature winding in the twelfth embodiment, a voltage deviation (a deviation of a p.u. voltage from 1.0) is 0.25% maximum, and a phase angle deviation is 0.00°. These values meet the standard in the US patent of Rudolph Habermann Jr., 0.4% in voltage deviation and 0.15° in phase angle, and the voltage balance higher than that in the first embodiment is realized.

Table 35 shows a change in maximum voltage deviation and phase angle deviation with a winding pitch in the twelfth embodiment. When a winding pitch is 29/36 or 30/36, the balance meets the standard in the US patent of Rudolph Habermann Jr., 0.4% in voltage deviation and 0.15° in phase angle.

TABLE 35

| | Coil pitch | | | | |
|---|---|---|---|---|---|
| | 27/36 | 28/36 | 29/36 | 30/36 | 31/36 | 32/36 |
| Voltage deviation | | 0.67% | 0.36% | 0.25% | 0.62% | |
| Phase angle deviation | | 0.00° | 0.00° | 0.00° | 0.00° | |

As described above, in the twelfth embodiment, when a winding pitch is 29/36 or 30/36, the balance meeting the standard in the US patent of Rudolph Habermann Jr. is realized with respect to the voltages of parallel circuits, and a circulation current can be decreased.

The embodiment is not limited to the illustrated configuration. The lead-out positions may be different. For example, the coil pieces located at electrically equivalent positions in the parallel circuits 1 and 4 may be replaced.

Embodiment 13

Figure 13:
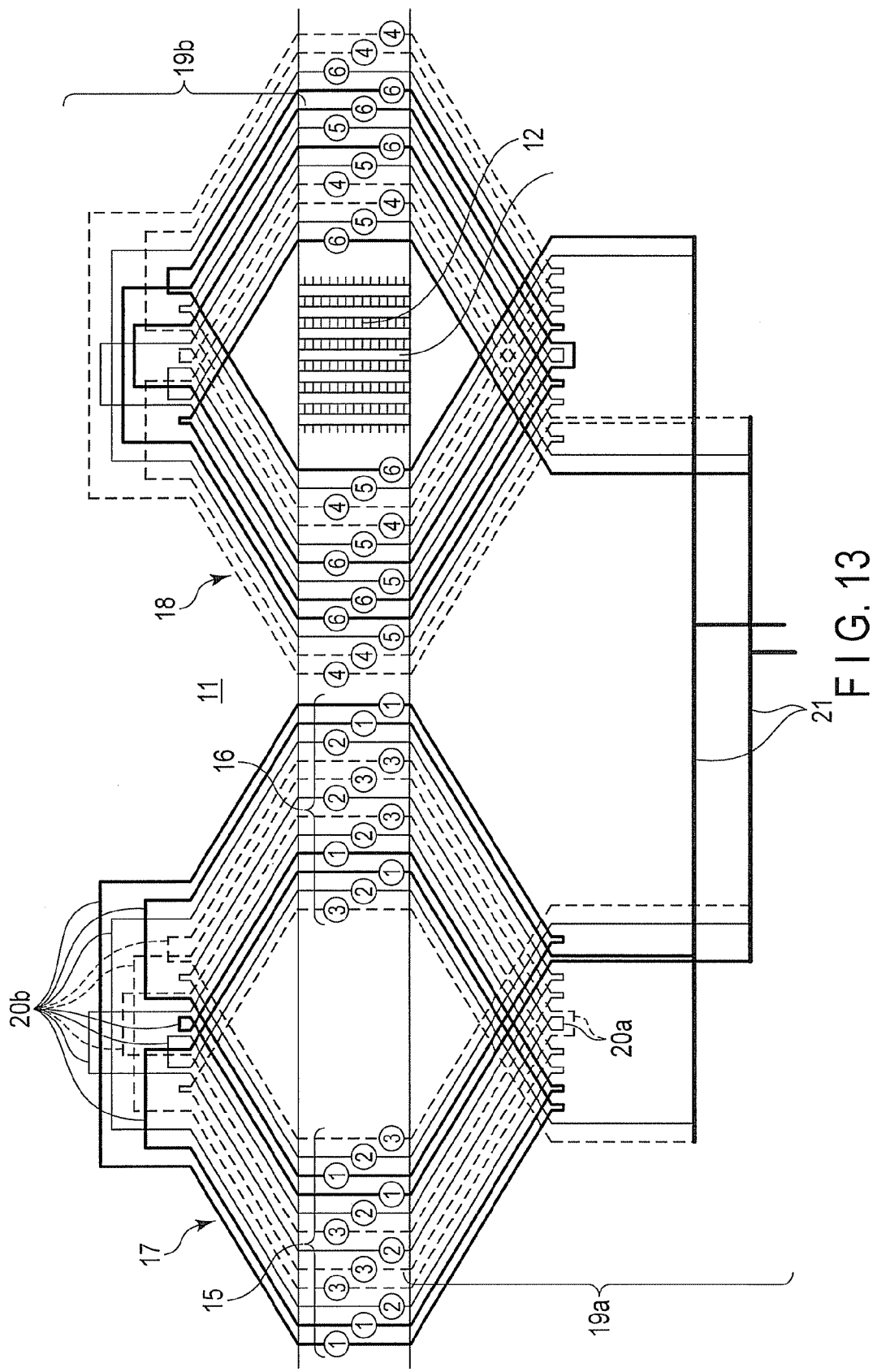
FIG. 13 is a developed perspective view showing one phase of an armature winding of a rotating electrical machine in a thirteenth embodiment of the present invention.

FIG. 13 is a developed perspective view showing one phase of an armature winding of a rotating electrical machine in a thirteenth embodiment of the present invention.

As shown in FIG. 13, an armature 11 of a rotating electrical machine is provided with seventy-two slots 13 in an armature core 12 comprising a laminated iron core. In the slots 13, a 2-pole 3-phase 6-parallel-circuit armature winding is housed in two layers.

An armature winding of each phase has an upper coil piece 15 housed in the upper part of the slot, and a lower coil piece 16 housed in the lower part of the slot. The ends of the upper and lower coil pieces 15 and 16 are connected in series at a connection side coil end 19*a* connected to a lead-out portion of the winding, and at a non-connection side coil end 19*b* located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are housed in the twelve slots 13.

The armature winding of each phase has six parallel circuits. The parallel circuits are given numbers ①, ②, ③, ④, ⑤ and ⑥ for identification in the drawing.

In each phase belt 17 and 18, the upper coil piece 15 is connected to the corresponding lower coil piece 16 apart by a fixed pitch, at the connection side coil end 19*a* and non-connection side coil end 19*b*, thereby forming six parallel circuits. The parallel circuits are connected in parallel through the lead-out connection conductor 21 provided at the connection side coil end 19*a*, thereby forming the armature winding.

In FIG. 13, four jumper wires 20*a* per phase are provided at the connection side coil end 19*a* of each phase 17 and 18, and twenty jumper wires 20*b* per phase belt are provided at the non-connection side coil end 19*b*. When the relative positions of the upper and lower coil pieces 15 and 16 in each phase belt are indicated by positions from the pole center, the upper and lower coil pieces 15 and 16 of each parallel circuit are placed as shown in Table 36.

TABLE 36

| | | Relative positions from the center of pole | | | | | |
|---|---|---|---|---|---|---|---|
| | | 1 | 2 | 3 | 4 | 5 | 6 |
| Parallel circuits 1 and 4 | Upper coil piece | | | 1 | 1 | | |
| | Lower coil piece | | | 1 | 1 | | |
| Parallel circuits 2 and 5 | Upper coil piece | | 1 | | | 1 | |
| | Lower coil piece | | 1 | | | 1 | |
| Parallel circuits 3 and 6 | Upper coil piece | 1 | | | | | 1 |
| | Lower coil piece | 1 | | | | | 1 |

| | | Relative positions from the center of pole | | | | | |
|---|---|---|---|---|---|---|---|
| | | 7 | 8 | 9 | 10 | 11 | 12 |
| Parallel circuits 1 and 4 | Upper coil piece | | | | | 1 | 1 |
| | Lower coil piece | | | | | 1 | 1 |
| Parallel circuits 2 and 5 | Upper coil piece | 1 | | | 1 | | |
| | Lower coil piece | 1 | | | 1 | | |
| Parallel circuits 3 and 6 | Upper coil piece | | 1 | 1 | | | |
| | Lower coil piece | | 1 | 1 | | | |

As shown in Table 36, four upper and lower coil pieces 15 and 16 of the first and fourth parallel circuits are placed at 3rd, 4th 11th, and 12th positions from the pole center. Four upper and lower coil pieces 15 and 16 of the second and fifth parallel circuits are placed at 2nd, 5th, 7th, and 10th positions from the pole center. Four upper and lower coil pieces 15 and 16 of the third and sixth parallel circuits are placed at 3rd, 4th, 8th, and 9th positions from the pole center.

Therefore, the circuits of the upper and lower coil pieces 15 and 16 in the first phase belt 17 are numbered 3, 2, 1, 1, 2, 3, 2, 3, 3, 2, 1, 1 sequentially from the pole center side. The circuits of the upper and lower coil pieces 15 and 16 in the second phase belt 18 are numbered 6, 5, 4, 4, 5, 6, 5, 6, 6, 5, 4, 4 sequentially from the pole center side.

Table 37 shows the balance of the voltage generated in an armature winding in the thirteenth embodiment. In the embodiment, the balance varies with a coil pitch. Table 37 shows a case where a winding pitch is 30/36 (83.33%).

TABLE 37

| | Parallel circuit | | | | | |
|---|---|---|---|---|---|---|
| | 1 | 2 | 3 | 4 | 5 | 6 |
| Voltage (p.u.) | 1.0020 | 1.0005 | 0.9975 | 1.0020 | 1.0005 | 0.9975 |
| Voltage phase (degree) | 0.000 | 0.000 | 0.000 | 0.000 | 0.000 | 0.000 |

As shown in Table 37, in the armature winding in the thirteenth embodiment, a voltage deviation (a deviation of a p.u. voltage from 1.0) is 0.25% maximum, and a phase angle deviation is 0.00°. These values meet the standard in the US patent of Rudolph Habermann Jr., 0.4% in voltage deviation and 0.15° in phase angle, and the voltage balance higher than that in the first embodiment is realized.

Table 38 shows a change in maximum voltage deviation and phase angle deviation with a winding pitch in the thirteenth embodiment. When a winding pitch is 30/36 or 31/36, the balance meets the standard in the US patent of Rudolph Habermann Jr., 0.4% in voltage deviation and 0.15° in phase angle.

TABLE 38

| | Coil pitch | | | | | |
|---|---|---|---|---|---|---|
| | 27/36 | 28/36 | 29/36 | 30/36 | 31/36 | 32/36 |
| Voltage deviation | | | 0.61% | 0.25% | 0.25% | 0.58% |
| Phase angle deviation | | | 0.00° | 0.00° | 0.00° | 0.00° |

As described above, in the thirteenth embodiment, when a winding' pitch is 30/36 or 31/36, the balance meeting the standard in the US patent of Rudolph Habermann Jr. is realized with respect to the voltages of parallel circuits, and a circulation current can be decreased.

The embodiment is not limited to the illustrated configuration. The lead-out positions may be different. For example, the coil pieces located at electrically equivalent positions in the parallel circuits 1 and 4 may be replaced.

Embodiment 14

Figure 14:
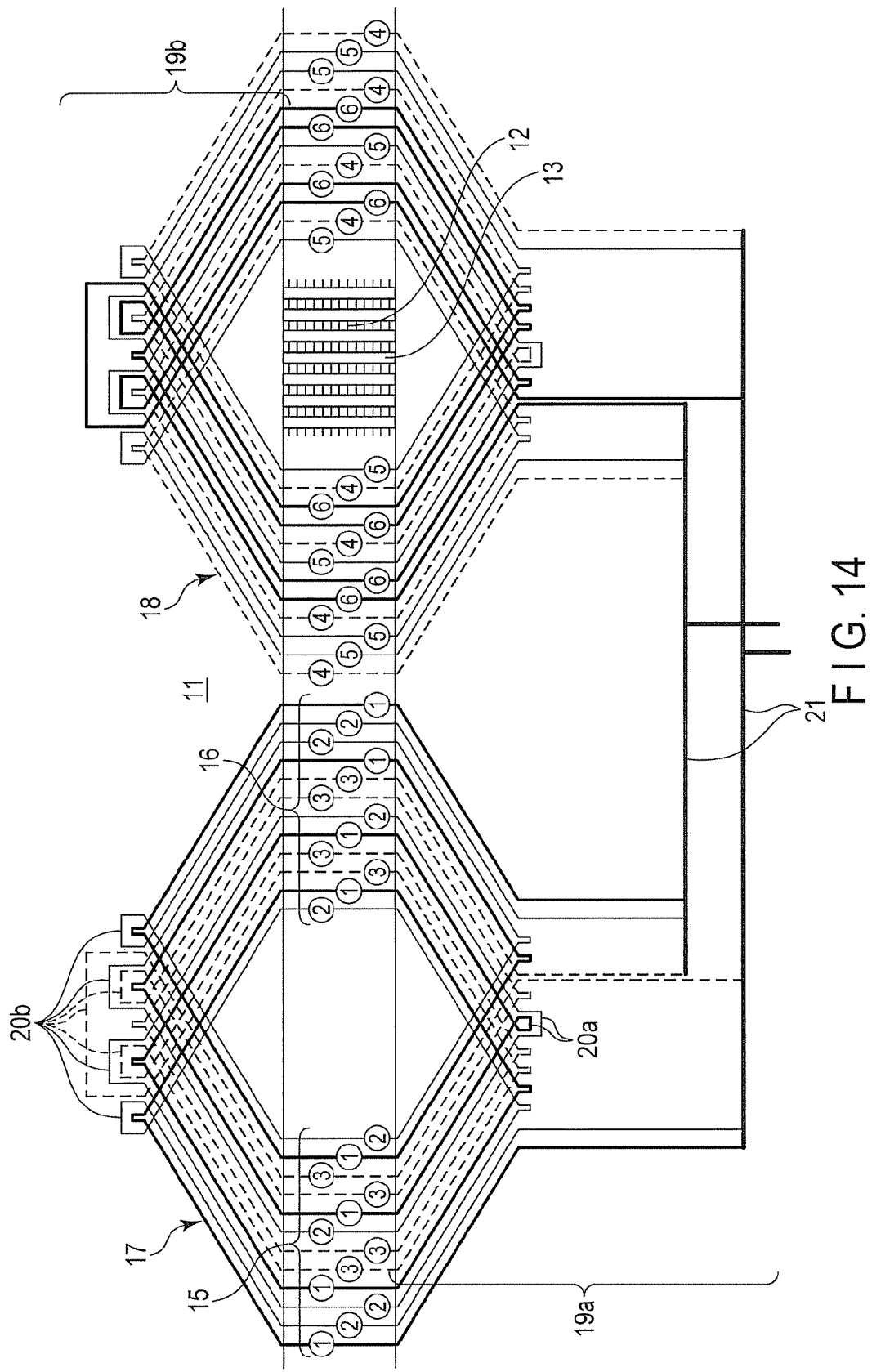
FIG. 14 is a developed perspective view showing one phase of an armature winding of a rotating electrical machine in a fourteenth embodiment of the present invention.

FIG. 14 is a developed perspective view showing one phase of an armature winding of a rotating electrical machine in a fourteenth embodiment of the present invention.

As shown in FIG. 14, an armature 11 of a rotating electrical machine has seventy-two slots 13 in an armature core 12 comprising a laminated iron core. In the slots 13, a 2-pole 3-phase 6-parallel-circuit armature winding is housed in two layers.

An armature winding of each phase has an upper coil piece 15 housed in the upper part of the slot, and a lower coil piece 16 housed in the lower part of the slot. The ends of the upper and lower coil pieces 15 and 16 are connected in series at a connection side coil end 19a connected to a lead-out portion of the winding, and at a non-connection side coil end 19b located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are house in the twelve slots 13.

The armature winding of each phase has six parallel circuits. The parallel circuits are given numbers ①, ②, ③, ④, ⑤ and ⑥ for identification in the drawing.

In each phase belt 17 and 18, the upper coil piece 15 is connected to the corresponding lower coil piece 16 apart by a fixed pitch, at the connection side coil end 19a and non-connection side coil end 19b, thereby forming six parallel circuits. The parallel circuits are connected in parallel through the lead-out connection conductor 21 provided at the connection side coil end 19a, thereby forming the armature winding.

In FIG. 14, four jumper wires 20a per phase are provided at the connection side coil end 19a of each phase 17 and 18, and fourteen jumper wires 20b per phase belt are provided at the non-connection side coil end 19b. When the relative positions of the upper and lower coil pieces 15 and 16 in each phase belt are indicated by positions from the pole center, the upper and lower coil pieces 15 and 16 of each parallel circuit are placed as shown in Table 39.

TABLE 39

| | | Relative positions from the center of pole | | | | | |
|---|---|---|---|---|---|---|---|
| | | 1 | 2 | 3 | 4 | 5 | 6 |
| Parallel circuits 1 and 4 | Upper coil piece | | 1 | | | 1 | |
| | Lower coil piece | | 1 | | | 1 | |
| Parallel circuits 2 and 5 | Upper coil piece | 1 | | | | | 1 |
| | Lower coil piece | 1 | | | | | 1 |
| Parallel circuits 3 and 6 | Upper coil piece | | | 1 | 1 | | |
| | Lower coil piece | | | 1 | 1 | | |
| | | Relative positions from the center of pole | | | | | |
| | | 7 | 8 | 9 | 10 | 11 | 12 |
| Parallel circuits 1 and 4 | Upper coil piece | | | 1 | | | 1 |
| | Lower coil piece | | | 1 | | | 1 |
| Parallel circuits 2 and 5 | Upper coil piece | | | | 1 | 1 | |
| | Lower coil piece | | | | 1 | 1 | |
| Parallel circuits 3 and 6 | Upper coil piece | 1 | 1 | | | | |
| | Lower coil piece | 1 | 1 | | | | |

As shown in Table 39, four upper and lower coil pieces 15 and 16 of the first and fourth parallel circuits are placed at 2nd, 5th, 9th, and 12th positions from the pole center. Four upper and lower coil pieces 15 and 16 of the second and fifth parallel circuits are placed at 1st, 6th, 10th, and 11th positions from the pole center. Four upper and lower coil pieces 15 and 16 of the third and sixth parallel circuits are placed at 3rd, 4th, 7th, and 8th positions from the pole center.

Therefore, the circuits of the upper and lower coil pieces 15 and 16 in the first phase belt 17 are numbered 2, 1, 3, 3, 1, 2, 3, 3, 1, 2, 2, 1 sequentially from the pole center side. The circuits of the upper and lower coil pieces 15 and 16 in the second phase belt 18 are numbered 5, 4, 6, 6, 4, 5, 6, 6, 4, 5, 5, 4 sequentially from the pole center side.

Table 40 shows the balance of the voltage generated in an armature winding in the fourteenth embodiment. In the embodiment, the balance varies with a coil pitch. Table 40 shows a case where a winding pitch is 30/36 (83.33%).

TABLE 40

| | Parallel circuit | | | | | |
|---|---|---|---|---|---|---|
| | 1 | 2 | 3 | 4 | 5 | 6 |
| Voltage (p.u.) | 1.0005 | 0.9975 | 1.0020 | 1.0005 | 0.9975 | 1.0020 |
| Voltage phase (degree) | 0.000 | 0.000 | 0.000 | 0.000 | 0.000 | 0.000 |

As shown in Table 40, in the armature winding in the fourteenth embodiment, a voltage deviation (a deviation of a p.u. voltage from 1.0) is 0.25% maximum, and a phase angle deviation is 0.00°. These values meet the standard in the US patent of Rudolph Habermann Jr., 0.4% in voltage deviation and 0.15° in phase angle, and the voltage balance higher than that in the first embodiment is realized.

Table 41 shows a change in maximum voltage deviation and phase angle deviation with a winding pitch in the fourteenth embodiment. When a winding pitch is 29/36 or 30/36, the balance meets the standard in the US patent of Rudolph Habermann Jr., 0.4% in voltage deviation and 0.15° in phase angle.

TABLE 41

| | Coil pitch | | | | | |
|---|---|---|---|---|---|---|
| | 27/36 | 28/36 | 29/36 | 30/36 | 31/36 | 32/36 |
| Voltage deviation | | 0.66% | 0.25% | 0.25% | 0.62% | |
| Phase angle deviation | | 0.00° | 0.00° | 0.00° | 0.00° | |

As described above, in the fourteenth embodiment, when a winding pitch is 29/36 or 30/36, the balance meeting the standard in the US patent of Rudolph Habermann Jr. is realized with respect to the voltages of parallel circuits, and a circulation current can be decreased.

The embodiment is not limited to the illustrated configuration. The lead-out positions may be different. For example, the coil pieces located at electrically equivalent positions in the parallel circuits 1 and 4 may be replaced.

Embodiment 15

Figure 15:
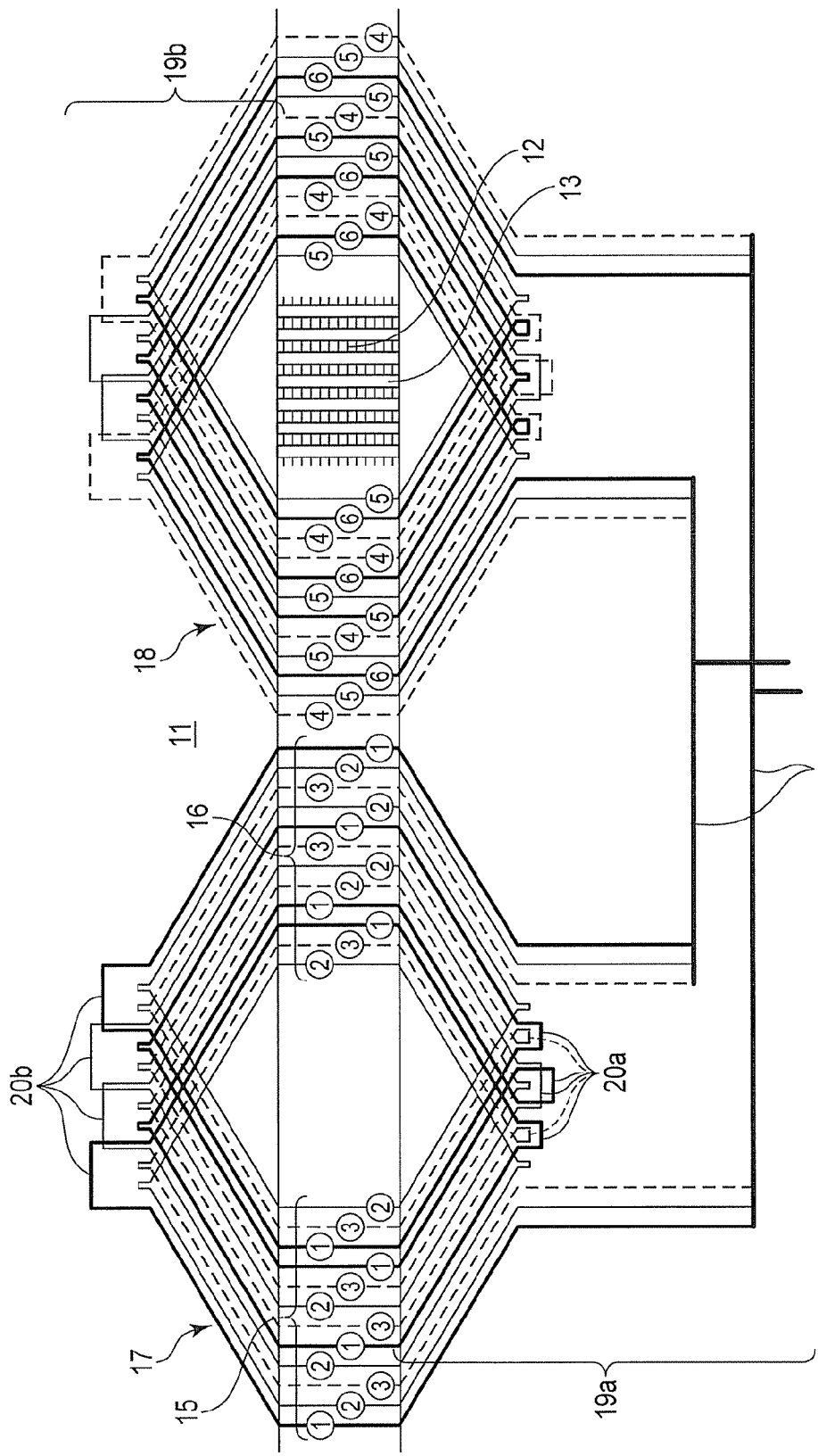
FIG. 15 is a developed perspective view showing one phase of an armature winding of a rotating electrical machine in a fifteenth embodiment of the present invention.

FIG. 15 is a developed perspective view showing one phase of an armature winding of a rotating electrical machine in a fifteenth embodiment of the present invention.

As shown in FIG. 15, an armature 11 of a rotating electrical machine is provided with seventy-two slots 13 in an armature core 12 comprising a laminated iron core. In the slots 13, a 2-pole 3-phase 6-parallel-circuit armature winding is housed in two layers.

An armature winding of each phase has an upper coil piece 15 housed in the upper part of the slot, and a lower coil piece 16 housed in the lower part of the slot. The ends of the upper and lower coil pieces 15 and 16 are connected in series at a connection side coil end 19a connected to a lead-out portion of the winding, and at a non-connection side coil end 19b located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are housed in the twelve slots 13.

The armature winding of each phase has six parallel circuits. The parallel circuits are given numbers ①, ②, ③, ④, ⑤ and ⑥ for identification in the drawing.

In each phase belt 17 and 18, the upper coil piece 15 is connected to the corresponding lower coil piece 16 apart by a fixed pitch, at the connection side coil end 19a and non-connection side coil end 19b, thereby forming six parallel circuits. The parallel circuits are connected in parallel through the lead-out connection conductor 21 provided at the connection side coil end 19a, thereby forming the armature winding.

In FIG. 15, twelve jumper wires 20a per phase are provided at the connection side coil end 19a of each phase 17 and 18, and eight jumper wires 20b per phase belt are provided at the non-connection side coil end 19b. When the relative positions of the upper and lower coil pieces 15 and 16 in each phase belt are indicated by positions from the pole center, the upper and lower coil pieces 15 and 16 of each parallel circuit are placed as shown in Table 42.

TABLE 42

| Relative positions from the center of pole | | 1 | 2 | 3 | 4 | 5 | 6 |
|---|---|---|---|---|---|---|---|
| Parallel circuits 1 and 4 | Upper coil piece | | | 1 | 1 | | |
| | Lower coil piece | | | 1 | 1 | | |
| Parallel circuits 2 and 5 | Upper coil piece | 1 | | | | | 1 |
| | Lower coil piece | 1 | | | | | 1 |
| Parallel circuits 3 and 6 | Upper coil piece | | 1 | | | 1 | |
| | Lower coil piece | | 1 | | | 1 | |
| Relative positions from the center of pole | | 7 | 8 | 9 | 10 | 11 | 12 |
| Parallel circuits 1 and 4 | Upper coil piece | | 1 | | | | 1 |
| | Lower coil piece | | 1 | | | | 1 |
| Parallel circuits 2 and 5 | Upper coil piece | | | 1 | | 1 | |
| | Lower coil piece | | | 1 | | 1 | |
| Parallel circuits 3 and 6 | Upper coil piece | 1 | | | 1 | | |
| | Lower coil piece | 1 | | | 1 | | |

As shown in Table 42, four upper and lower coil pieces 15 and 16 of the first and fourth parallel circuits are placed at 3rd, 4th, 8th, and 12th positions from the pole center. Four upper and lower coil pieces 15 and 16 of the second and fifth parallel circuits are placed at 1st, 6th, 9th, and 11th positions from the pole center. Four upper and lower coil pieces 15 and 16 of the third and sixth parallel circuits are placed at 2nd, 5th, 7th, and 10th positions from the pole center.

Therefore, the circuits of the upper and lower coil pieces 15 and 16 in the first phase belt 17 are numbered 2, 3, 1, 1, 3, 2, 3, 1, 2, 3, 2, 1 sequentially from the pole center side. The circuits of the upper and lower coil pieces 15 and 16 in the second phase belt 18 are numbered 5, 6, 4, 4, 6, 5, 6, 4, 5, 6, 5, 4 sequentially from the pole center side.

Table 43 shows the balance of the voltage generated in an armature winding in the fifteenth embodiment. In the embodiment, the balance varies with a coil pitch. Table 43 shows a case where a winding pitch is 30/36 (83.33%).

TABLE 43

| Parallel circuit | 1 | 2 | 3 | 4 | 5 | 6 |
|---|---|---|---|---|---|---|
| Voltage (p. u.) | 1.0020 | 0.9975 | 1.0005 | 1.0020 | 0.9975 | 1.0005 |
| Voltage phase (degree) | 0.000 | 0.000 | 0.000 | 0.000 | 0.000 | 0.000 |

As shown in Table 43, in the armature winding in the fifteenth embodiment, a voltage deviation (a deviation of a p.u. voltage from 1.0) is 0.25% maximum, and a phase angle deviation is 0.00°. These values meet the standard in the US patent of Rudolph Habermann Jr., 0.4% in voltage deviation and 0.15° in phase angle, and the voltage balance higher than that in the first embodiment is realized.

Table 44 shows a change in maximum voltage deviation and phase angle deviation with a winding pitch in the fifteenth embodiment. When a winding pitch is in a range of 28/36 to 31/36, the balance meets the standard in the US patent of Rudolph Habermann Jr., 0.4% in voltage deviation and 0.15° in phase angle.

TABLE 44

| Coil pitch | 27/36 | 28/36 | 29/36 | 30/36 | 31/36 | 32/36 |
|---|---|---|---|---|---|---|
| Voltage deviation | 0.60% | 0.39% | 0.29% | 0.25% | 0.36% | 0.48% |
| Phase angle deviation | 0.00° | 0.00° | 0.00° | 0.00° | 0.00° | 0.00° |

As described above, in the fifteenth embodiment, when a winding pitch is in a range of 28/36 to 31/36, the balance meeting the standard in the US patent of Rudolph Habermann Jr. is realized with respect to the voltages of parallel circuits, and a circulation current can be decreased.

The embodiment is not limited to the illustrated configuration. The lead-out positions may be different. For example, the coil pieces located at electrically equivalent positions in the parallel circuits 1 and 4 may be replaced.

Embodiment 16

Figure 16:
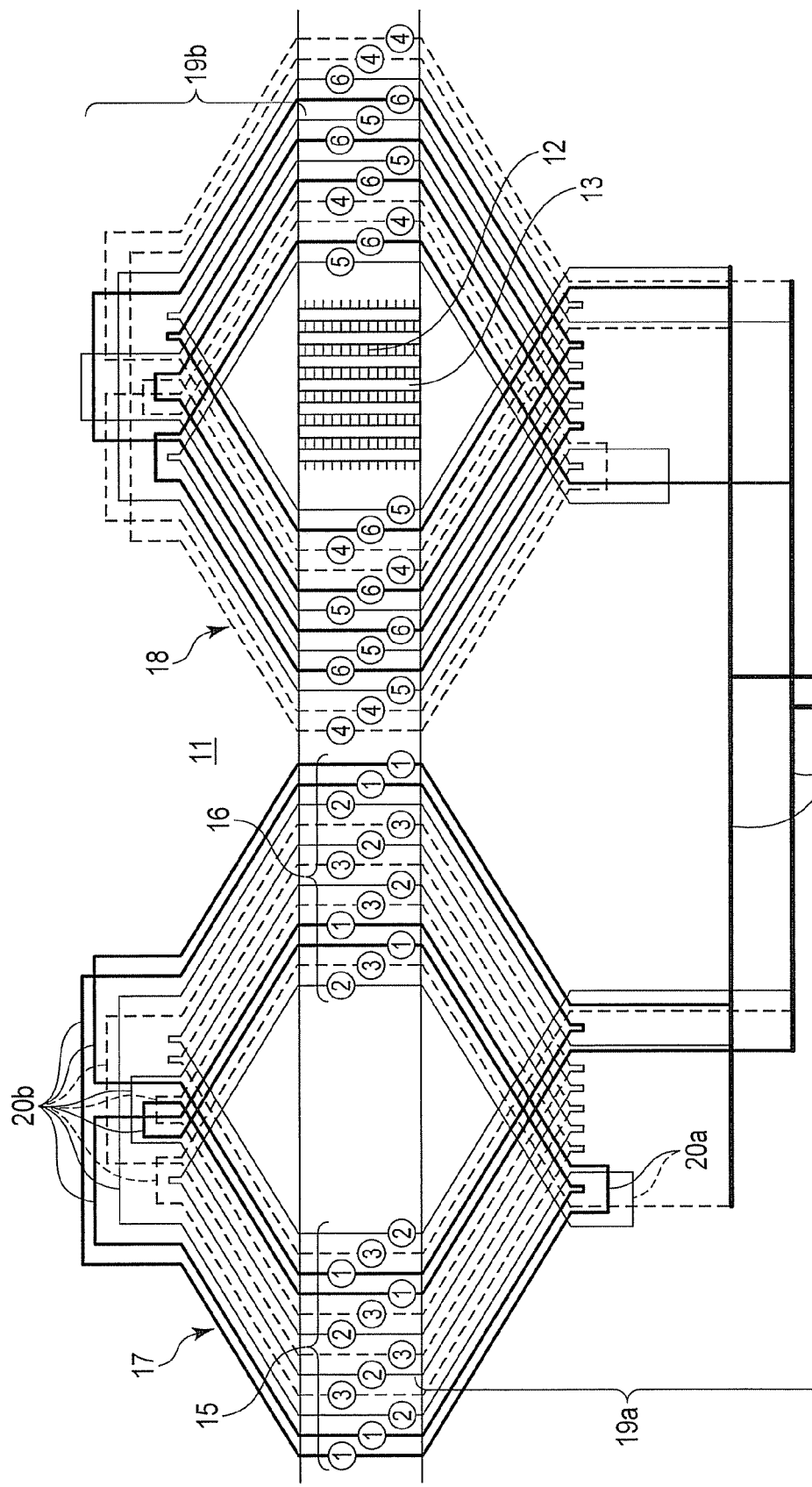
FIG. 16 is a developed perspective view showing one phase of an armature winding of a rotating electrical machine in a sixteenth embodiment of the present invention.

FIG. 16 is a developed perspective view showing one phase of an armature winding of a rotating electrical machine in a sixteenth embodiment of the present invention.

As shown in FIG. 16, an armature 11 of a rotating electrical machine is provided with seventy-two slots 13 in an armature core 12 comprising a laminated iron core. In the slots 13, a 2-pole 3-phase 6-parallel-circuit armature winding is housed in two layers.

An armature winding of each phase has an upper coil piece 15 housed in the upper part of the slot, and a lower coil piece 16 housed in the lower part of the slot. The ends of the upper and lower coil pieces 15 and 16 are connected in series at a connection side coil end 19a connected to a lead-out portion of the winding, and at a non-connection side coil end 19b located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are housed in the twelve slots 13.

The armature winding of each phase has six parallel circuits. The parallel circuits are given numbers ①, ②, ③, ④, ⑤ and ⑥ for identification in the drawing.

In each phase belt 17 and 18, the upper coil piece 15 is connected to the corresponding lower coil piece 16 apart by a fixed pitch, at the connection side coil end 19a and non-connection side coil end 19b, thereby forming six parallel circuits. The parallel circuits are connected in parallel through the lead-out connection conductor 21 provided at the connection side coil end 19a, thereby forming the armature winding.

In FIG. 16, four jumper wires 20a per phase are provided at the connection side coil end 19a of each phase 17 and 18, and eighteen jumper wires 20b per a phase belt are provided at the non-connection side coil end 19b. When the relative positions of the upper and lower coil pieces 15 and 16 in each phase belt are indicated by positions from the pole center, the upper and lower coil pieces 15 and 16 of each parallel circuit are placed as shown in Table 45.

TABLE 45

| Relative positions from the center of pole | | 1 | 2 | 3 | 4 | 5 | 6 |
|---|---|---|---|---|---|---|---|
| Parallel circuits 1 and 4 | Upper coil piece | | | 1 | 1 | | |
| | Lower coil piece | | | 1 | 1 | | |
| Parallel circuits 2 and 5 | Upper coil piece | | | | | | 1 |
| | Lower coil piece | 1 | | | | | 1 |
| Parallel circuits 3 and 6 | Upper coil piece | | 1 | | | 1 | |
| | Lower coil piece | | 1 | | | 1 | |

| Relative positions from the center of pole | | 7 | 8 | 9 | 10 | 11 | 12 |
|---|---|---|---|---|---|---|---|
| Parallel circuits 1 and 4 | Upper coil piece | | | | | 1 | 1 |
| | Lower coil piece | | | | | 1 | 1 |
| Parallel circuits 2 and 5 | Upper coil piece | | 1 | | 1 | | |
| | Lower coil piece | | 1 | | 1 | | |
| Parallel circuits 3 and 6 | Upper coil piece | 1 | | 1 | | | |
| | Lower coil piece | 1 | | 1 | | | |

As shown in Table 45, four upper and lower coil pieces 15 and 16 of the first and fourth parallel circuits are placed at 3rd, 4th, 11th, and 12th positions from the pole center. Four upper and lower coil pieces 15 and 16 of the second and fifth parallel circuits are placed at 1st, 6th, 8th, and 10th positions from the pole center. Four upper and lower coil pieces 15 and 16 of the third and sixth parallel circuits are placed at 2nd, 5th, 7th, and 9th positions from the pole center.

Therefore, the circuits of the upper and lower coil pieces 15 and 16 in the first phase belt 17 are numbered 2, 3, 1, 1, 3, 2, 3, 2, 3, 2, 1, 1 sequentially from the pole center side. The circuits of the upper and lower coil pieces 15 and 16 in the second phase belt 18 are numbered 5, 6, 4, 4, 6, 5, 6, 5, 6, 5, 4, 4 sequentially from the pole center side.

Table 46 shows the balance of the voltage generated in an armature winding in the sixteenth embodiment. In the embodiment, the balance varies with a coil pitch. Table 46 shows a case where a winding pitch is 30/36 (83.33%).

TABLE 46

| Parallel circuit | 1 | 2 | 3 | 4 | 5 | 6 |
|---|---|---|---|---|---|---|
| Voltage (p. u.) | 1.0020 | 0.9975 | 1.0005 | 1.0020 | 0.9975 | 1.0005 |
| Voltage phase (degree) | 0.000 | 0.000 | 0.000 | 0.000 | 0.000 | 0.000 |

As shown in Table 46, in the armature winding in the sixteenth embodiment, a voltage deviation (a deviation of a p.u. voltage from 1.0) is 0.25% maximum, and a phase angle deviation is 0.00°. These values meet the standard in the US patent of Rudolph Habermann Jr., 0.4% in voltage deviation and 0.15° in phase angle, and the voltage balance higher than that in the first embodiment is realized.

Table 47 shows a change in maximum voltage deviation and phase angle deviation with a winding pitch in the sixteenth embodiment. When a winding pitch is 30/36 or 31/36, the balance meets the standard in the US patent of Rudolph Habermann Jr., 0.4% in voltage deviation and 0.15° in phase angle.

TABLE 47

| Coil pitch | 27/36 | 28/36 | 29/36 | 30/36 | 31/36 | 32/36 |
|---|---|---|---|---|---|---|
| Voltage deviation | | | 0.61% | 0.25% | 0.36% | 0.66% |
| Phase angle deviation | | | 0.00° | 0.00° | 0.00° | 0.00° |

As described above, in the sixteenth embodiment, when a winding pitch is 30/36 or 31/36, the balance meeting the standard in the US patent of Rudolph Habermann Jr. is realized with respect to the voltages of parallel circuits, and a circulation current can be decreased.

The embodiment is not limited to the illustrated configuration. The lead-out positions may be different. For example, the coil pieces located at electrically equivalent positions in the parallel circuits 1 and 4 may be replaced.

Embodiment 17

Figure 17:
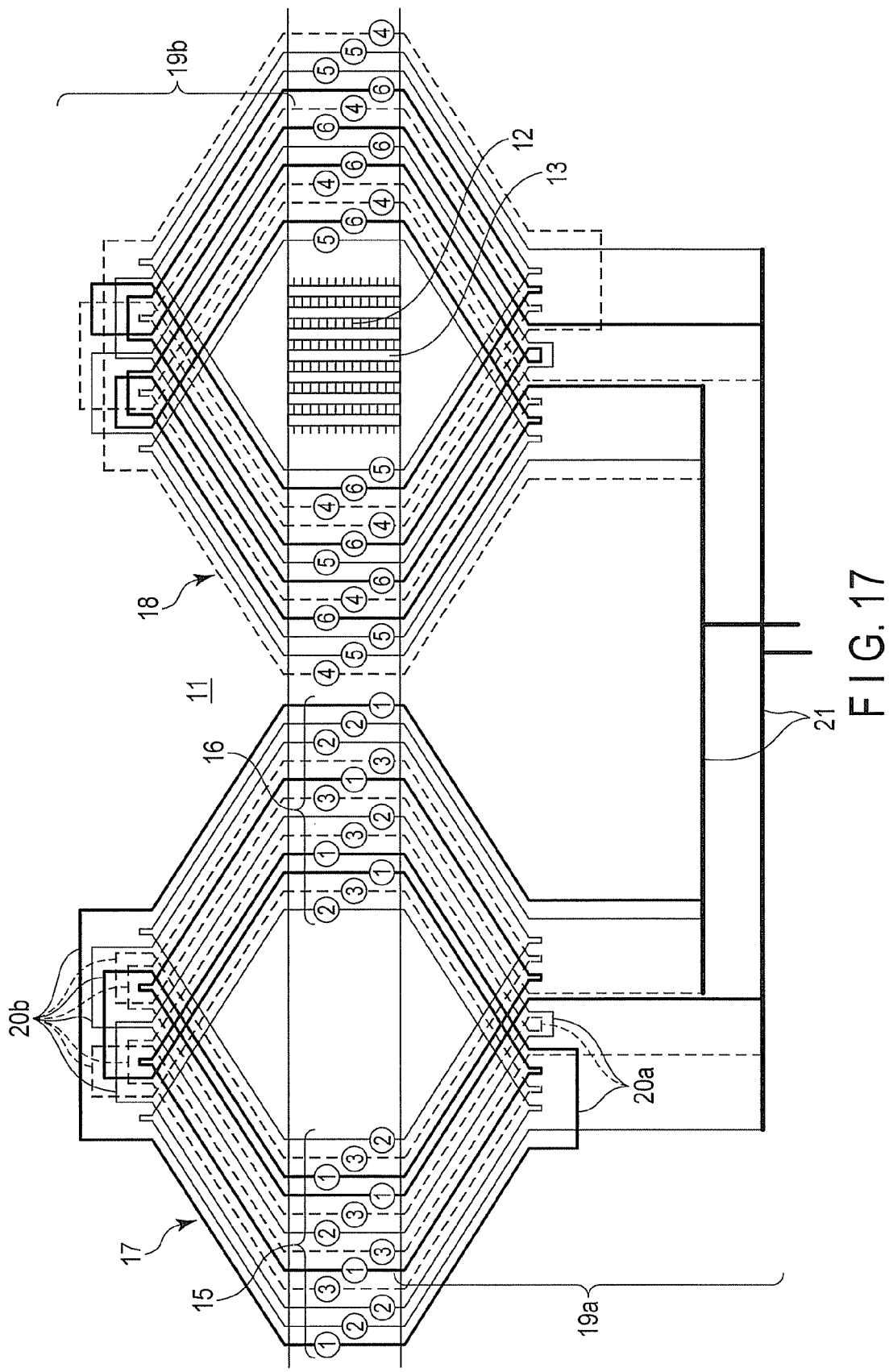
FIG. 17 is a developed perspective view showing one phase of an armature winding of a rotating electrical machine in a seventeenth embodiment of the present invention.

FIG. 17 is a developed perspective view showing one phase of an armature winding of a rotating electrical machine in a seventeenth embodiment of the present invention.

As shown in FIG. 17, an armature 11 of a rotating electrical machine is provided with seventy-two slots 13 in an armature core 12 comprising a laminated iron core. In the slots 13, a 2-pole 3-phase 6-parallel-circuit armature winding is housed in two layers.

An armature winding of each phase has an upper coil piece 15 housed in the upper part of the slot, and a lower coil piece 16 housed in the lower part of the slot. The ends of the upper and lower coil pieces 15 and 16 are connected in series at a connection side coil end 19a connected to a lead-out portion of the winding, and at a non-connection side coil end 19b located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are housed in the twelve slots 13.

The armature winding of each phase has six parallel circuits. The parallel circuits are given numbers ①, ②, ③, ④, ⑤ and ⑥ for identification in the drawing.

In each phase belt 17 and 18, the upper coil piece 15 is connected to the corresponding lower coil piece 16 apart by a fixed pitch, at the connection side coil end 19a and non-connection side coil end 19b, thereby forming six parallel circuits. The parallel circuits are connected in parallel through the lead-out connection conductor 21 provided at the connection side coil end 19a, thereby forming the armature winding.

In FIG. 17, six jumper wires 20a per phase are provided at the connection side coil end 19a of each phase 17 and 18, and sixteen jumper wires 20b per phase belt are provided at the non-connection side coil end 19b. When the relative positions of the upper and lower coil pieces 15 and 16 in each phase belt are indicated by positions from the pole center, the upper and lower coil pieces 15 and 16 of each parallel circuit are placed as shown in Table 48.

TABLE 48

| Relative positions from the center of pole | | 1 | 2 | 3 | 4 | 5 | 6 |
|---|---|---|---|---|---|---|---|
| Parallel circuits 1 and 4 | Upper coil piece | | | | 1 | 1 | |
| | Lower coil piece | | | | 1 | 1 | |
| Parallel circuits 2 and 5 | Upper coil piece | 1 | | | | | 1 |
| | Lower coil piece | 1 | | | | | 1 |
| Parallel circuits 3 and 6 | Upper coil piece | | 1 | | | 1 | |
| | Lower coil piece | | 1 | | | 1 | |
| Relative positions from the center of pole | | 7 | 8 | 9 | 10 | 11 | 12 |
| Parallel circuits 1 and 4 | Upper coil piece | | 1 | | | | 1 |
| | Lower coil piece | | 1 | | | | 1 |
| Parallel circuits 2 and 5 | Upper coil piece | | | | 1 | 1 | |
| | Lower coil piece | | | | 1 | 1 | |
| Parallel circuits 3 and 6 | Upper coil piece | 1 | | 1 | | | |
| | Lower coil piece | 1 | | 1 | | | |

As shown in Table 48, four upper and lower coil pieces 15 and 16 of the first and fourth parallel circuits are placed at 3rd, 4th, 8th, and 12th positions from the pole center. Four upper and lower coil pieces 15 and 16 of the second and fifth parallel circuits are placed at 1st, 6th, 10th, and 11th positions from the pole center. Four upper and lower coil pieces 15 and 16 of the third and sixth parallel circuits are placed at 2nd, 5th, 7th, and 9th positions from the pole center.

Therefore, the circuits of the upper and lower coil pieces 15 and 16 in the first phase belt 17 are numbered 2, 3, 1, 1, 3, 2, 3, 1, 3, 2, 2, 1 sequentially from the pole center side. The circuits of the upper and lower coil pieces 15 and 16 in the second phase belt 18 are numbered 5, 6, 4, 4, 6, 5, 6, 4, 6, 5, 5, 4 sequentially from the pole center side.

Table 49 shows the balance of the voltage generated in an armature winding in the seventeenth embodiment. In the embodiment, the balance varies with a coil pitch. Table 49 shows a case where a winding pitch is 30/36 (83.33%).

TABLE 49

| Parallel circuit | 1 | 2 | 3 | 4 | 5 | 6 |
|---|---|---|---|---|---|---|
| Voltage (p. u.) | 1.0020 | 0.9975 | 1.0005 | 1.0020 | 0.9975 | 1.0005 |
| Voltage phase (degree) | 0.000 | 0.000 | 0.000 | 0.000 | 0.000 | 0.000 |

As shown in Table 49, in the armature winding in the seventeenth embodiment, a voltage deviation (a deviation of a p.u. voltage from 1.0) is 0.25% maximum, and a phase angle deviation is 0.00°. These values meet the standard in the US patent of Rudolph Habermann Jr., 0.4% in voltage deviation and 0.15° in phase angle, and the voltage balance higher than that in the first embodiment is realized.

Table 50 shows a change in maximum voltage deviation and phase angle deviation with a winding pitch in the seventeenth embodiment. When a winding pitch is 29/36 or 30/36, the balance meets the standard in the US patent of Rudolph Habermann Jr., 0.4% in voltage deviation and 0.15° in phase angle.

TABLE 50

| Coil pitch | 27/36 | 28/36 | 29/36 | 30/36 | 31/36 | 32/36 |
|---|---|---|---|---|---|---|
| Voltage deviation |  | 0.59% | 0.29% | 0.25% | 0.47% |  |
| Phase angle deviation |  | 0.00° | 0.00° | 0.00° | 0.00° |  |

As described above, in the seventeenth embodiment, when a winding pitch is 29/36 or 30/36, the balance meeting the standard in the US patent of Rudolph Habermann Jr. is realized with respect to the voltages of parallel circuits, and a circulation current can be decreased.

The embodiment is not limited to the illustrated configuration. The lead-out positions may be different. For example, the coil pieces located at electrically equivalent positions in the parallel circuits 1 and 4 may be replaced.

Embodiment 18

Figure 18:
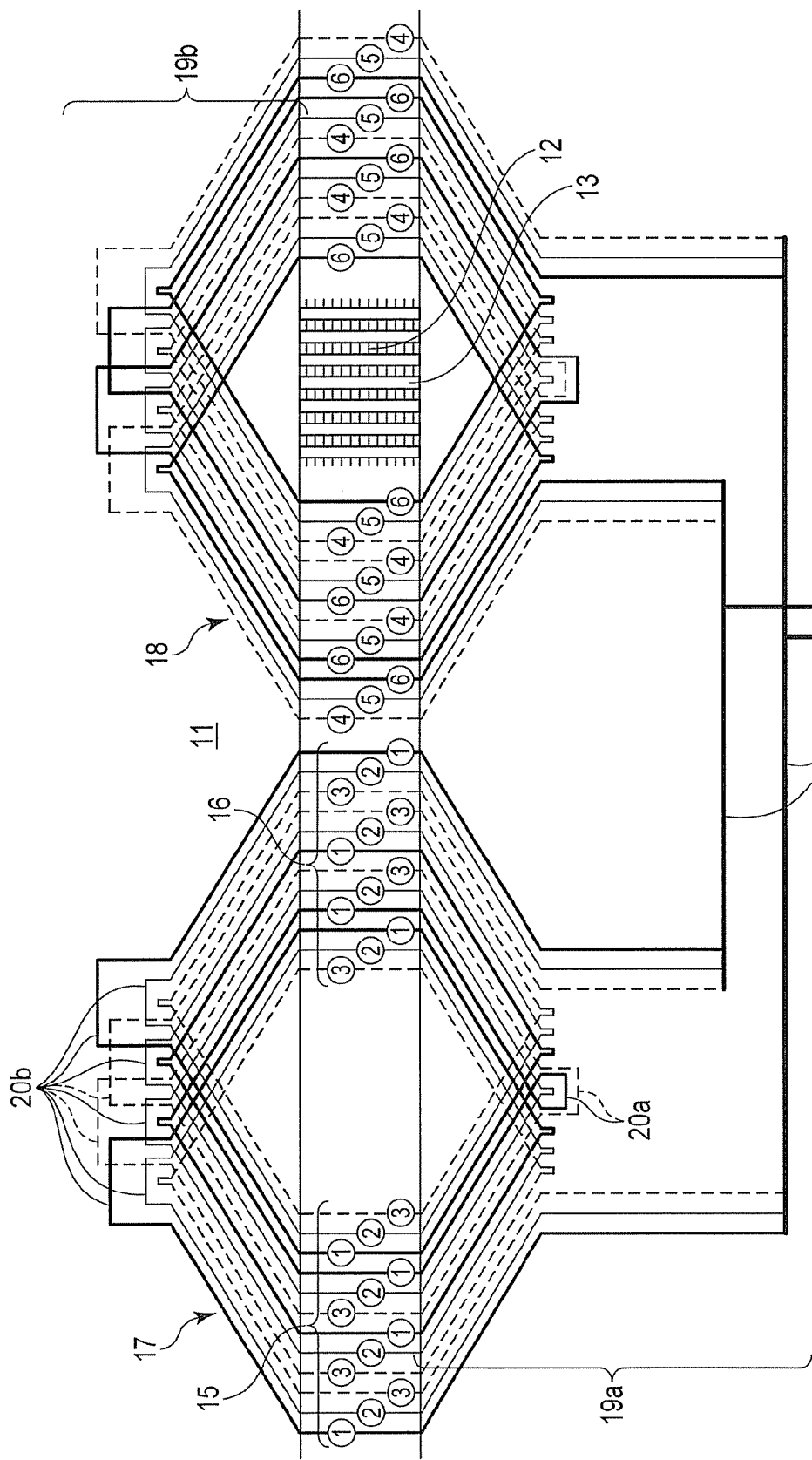
FIG. 18 is a developed perspective view showing one phase of an armature winding of a rotating electrical machine in an eighteenth embodiment of the present invention.

FIG. 18 is a developed perspective view showing one phase of an armature winding of a rotating electrical machine in an eighteenth embodiment of the present invention.

As shown in FIG. 18, an armature 11 of a rotating electrical machine is provided with seventy-two slots 13 in an armature core 12 comprising a laminated iron core. In the slots 13, a 2-pole 3-phase 6-parallel-circuit armature winding is housed in two layers.

An armature winding of each phase has an upper coil piece 15 housed in the upper part of the slot, and a lower coil piece 16 housed in the lower part of the slot. The ends of the upper and lower coil pieces 15 and 16 are connected in series at a connection side coil end 19a connected to a lead-out portion of the winding, and at a non-connection side coil end 19b located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are housed in the twelve slots 13.

The armature winding of each phase has six parallel circuits. The parallel circuits are given numbers ①, ②, ③, ④, ⑤ and ⑥ for identification in the drawing.

In each phase belt 17 and 18, the upper coil piece 15 is connected to the corresponding lower coil piece 16 apart by a fixed pitch, at the connection side coil end 19a and non-connection side coil end 19b, thereby forming six parallel circuits. The parallel circuits are connected in parallel through the lead-out connection conductor 21 provided at the connection side coil end 19a, thereby forming the armature winding.

In FIG. 18, four jumper wires 20a per phase are provided at the connection side coil end 19a of each phase 17 and 18, and sixteen jumper wires 20b per phase belt are provided at the non-connection side coil end 19b. When the relative positions of the upper and lower coil pieces 15 and 16 in each phase belt are indicated by positions from the pole center, the upper and lower coil pieces 15 and 16 of each parallel circuit are placed as shown in Table 51.

TABLE 51

| Relative positions from the center of pole | | 1 | 2 | 3 | 4 | 5 | 6 |
|---|---|---|---|---|---|---|---|
| Parallel circuits 1 and 4 | Upper coil piece |  |  | 1 | 1 |  |  |
| | Lower coil piece |  |  | 1 | 1 |  |  |
| Parallel circuits 2 and 5 | Upper coil piece |  | 1 |  |  | 1 |  |
| | Lower coil piece |  | 1 |  |  | 1 |  |
| Parallel circuits 3 and 6 | Upper coil piece | 1 |  |  |  |  | 1 |
| | Lower coil piece | 1 |  |  |  |  | 1 |
| Relative positions from the center of pole | | 7 | 8 | 9 | 10 | 11 | 12 |
| Parallel circuits 1 and 4 | Upper coil piece | 1 |  |  |  |  | 1 |
| | Lower coil piece | 1 |  |  |  |  | 1 |
| Parallel circuits 2 and 5 | Upper coil piece |  | 1 |  |  | 1 |  |
| | Lower coil piece |  | 1 |  |  | 1 |  |
| Parallel circuits 3 and 6 | Upper coil piece |  |  | 1 | 1 |  |  |
| | Lower coil piece |  |  | 1 | 1 |  |  |

As shown in Table 51, four upper and lower coil pieces 15 and 16 of the first and fourth parallel circuits are placed at 3rd, 4th, 7th, and 12th positions from the pole center. Four upper and lower coil pieces 15 and 16 of the second and fifth parallel circuits are placed at 2nd, 5th, 8th, and 11th positions from the pole center. Four upper and lower coil pieces 15 and 16 of the third and sixth parallel circuits are placed at 1st, 6th, 9th, and 10th positions from the pole center.

Therefore, the circuits of the upper and lower coil pieces 15 and 16 in the first phase belt 17 are numbered 3, 2, 1, 1, 2, 3, 1, 2, 3, 3, 2, 1 sequentially from the pole center side. The circuits of the upper and lower coil pieces 15 and 16 in the second phase belt 18 are numbered 6, 5, 4, 4, 5, 6, 4, 5, 6, 6, 5, 4 sequentially from the pole center side.

Table 52 shows the balance of the voltage generated in an armature winding in the eighteenth embodiment. In the embodiment, the balance varies with a coil pitch. Table 52 shows a case where a winding pitch is 30/36 (83.33%).

TABLE 52

| Parallel circuit | 1 | 2 | 3 | 4 | 5 | 6 |
|---|---|---|---|---|---|---|
| Voltage (p. u.) | 0.9979 | 1.0025 | 0.9996 | 0.9979 | 1.0025 | 0.9996 |
| Voltage phase (degree) | 0.000 | 0.000 | 0.000 | 0.000 | 0.000 | 0.000 |

As shown in Table 52, in the armature winding in the eighteenth embodiment, a voltage deviation (a deviation of a p.u. voltage from 1.0) is 0.25% maximum, and a phase angle deviation is 0.00°. These values meet the standard in the US patent of Rudolph Habermann Jr., 0.4% in voltage deviation and 0.15° in phase angle, and the voltage balance higher than that in the first embodiment is realized.

Table 53 shows a change in maximum voltage deviation and phase angle deviation with a winding pitch in the eighteenth embodiment. In a practical winding pitch range including those not shown in the table, the balance meets the standard in the US patent of Rudolph Habermann Jr., 0.4% in voltage deviation and 0.15° in phase angle.

TABLE 53

| Coil pitch | 25/36 | 28/36 | 30/36 | 31/36 | 32/36 | 35/36 |
|---|---|---|---|---|---|---|
| Voltage deviation | 0.29% | 0.25% | 0.25% | 0.25% | 0.25% | 0.25% |
| Phase angle deviation | 0.00° | 0.00° | 0.00° | 0.00° | 0.00° | 0.00° |

As described above, in the eighteenth embodiment, in the practical winding pitch range, the balance meeting the standard in the US patent of Rudolph Habermann Jr. is realized with respect to the voltages of parallel circuits, and a circulation current can be decreased.

The embodiment is not limited to the illustrated configuration. The lead-out positions may be different. For example, the coil pieces located at electrically equivalent positions in the parallel circuits 1 and 4 may be replaced.

Embodiment 19

Figure 19:
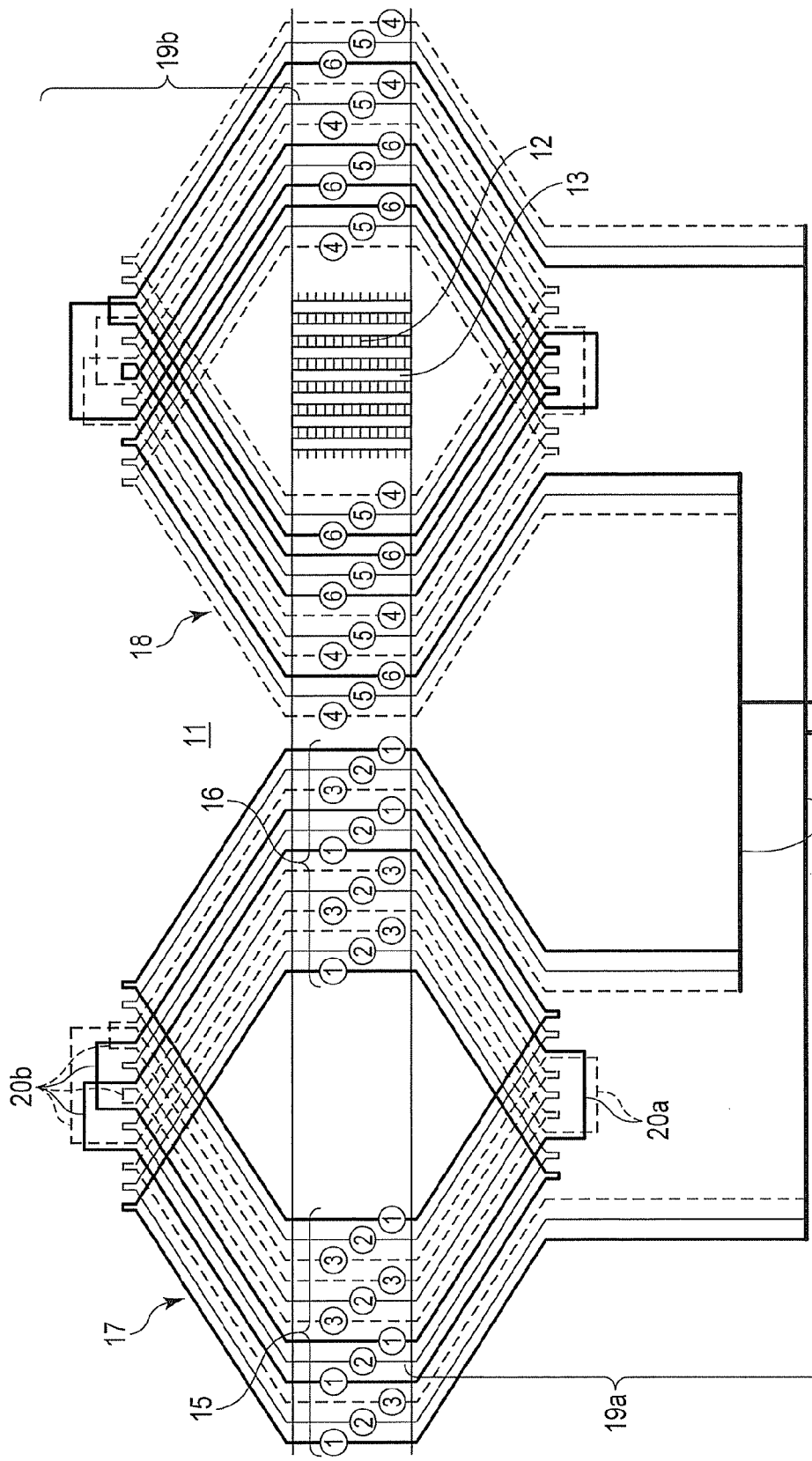
FIG. 19 is a developed perspective view showing one phase of an armature winding of a rotating electrical machine in a nineteenth embodiment of the present invention.

FIG. 19 is a developed perspective view showing one phase of an armature winding of a rotating electrical machine in a nineteenth embodiment of the present invention.

As shown in FIG. 19, an armature 11 of a rotating electrical machine is provided with seventy-two slots 13 in an armature core 12 comprising a laminated iron core. In the slots 13, a 2-pole 3-phase 6-parallel-circuit armature winding is housed in two layers.

An armature winding of each phase has an upper coil piece 15 housed in the upper part of the slot, and a lower coil piece 16 housed in the lower part of the slot. The ends of the upper and lower coil pieces 15 and 16 are connected in series at a connection side coil end 19a connected to a lead-out portion of the winding, and at a non-connection side coil end 19b located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are housed in the twelve slots 13.

The armature winding of each phase has six parallel circuits. The parallel circuits are given numbers ①, ②, ③, ④, ⑤ and ⑥ for identification in the drawing.

In each phase belt 17 and 18, the upper coil piece 15 is connected to the corresponding lower coil piece 16 apart by a fixed pitch, at the connection side coil end 19a and non-connection side coil end 19b, thereby forming six parallel circuits. The parallel circuits are connected in parallel through the lead-out connection conductor 21 provided at the connection side coil end 19a, thereby forming the armature winding.

In FIG. 19, four jumper wires 20a per phase are provided at the connection side coil end 19a of each phase 17 and 18, and ten jumper wires 20b per phase belt are provided at the non-connection side coil end 19b. When the relative positions of the upper and lower coil pieces 15 and 16 in each phase belt are indicated by positions from the pole center, the upper and lower coil pieces 15 and 16 of each parallel circuit are placed as shown in Table 54.

TABLE 54

| Relative positions from the center of pole | | 1 | 2 | 3 | 4 | 5 | 6 |
|---|---|---|---|---|---|---|---|
| Parallel circuits 1 and 4 | Upper coil piece | 1 | | | | | |
| | Lower coil piece | | 1 | | | | |
| Parallel circuits 2 and 5 | Upper coil piece | | 1 | | | 1 | |
| | Lower coil piece | | 1 | | | 1 | |
| Parallel circuits 3 and 6 | Upper coil piece | | | 1 | 1 | | 1 |
| | Lower coil piece | | | 1 | 1 | | 1 |

| Relative positions from the center of pole | | 7 | 8 | 9 | 10 | 11 | 12 |
|---|---|---|---|---|---|---|---|
| Parallel circuits 1 and 4 | Upper coil piece | 1 | 1 | | | | 1 |
| | Lower coil piece | 1 | 1 | | | | 1 |
| Parallel circuits 2 and 5 | Upper coil piece | | | 1 | | 1 | |
| | Lower coil piece | | | 1 | | 1 | |

TABLE 54-continued

| Parallel circuits 3 and 6 | Upper coil piece | 1 |
|---|---|---|
| | Lower coil piece | 1 |

As shown in Table 54, four upper and lower coil pieces 15 and 16 of the first and fourth parallel circuits are placed at 1st, 7th, 9th, and 12th positions from the pole center. Four upper and lower coil pieces 15 and 16 of the second and fifth parallel circuits are placed at 2nd, 5th, 8th, and 11th positions from the pole center. Four upper and lower coil pieces 15 and 16 of the third and sixth parallel circuits are placed at 3rd, 4th, 6th, and 10th positions from the pole center.

Therefore, the circuits of the upper and lower coil pieces 15 and 16 in the first phase belt 17 are numbered 1, 2, 3, 3, 2, 3, 1, 2, 1, 3, 2, 1 sequentially from the pole center side. The circuits of the upper and lower coil pieces 15 and 16 in the second phase belt 18 are numbered 4, 5, 6, 6, 5, 6, 4, 5, 4, 6, 5, 4 sequentially from the pole center side.

Table 55 shows the balance of the voltage generated in an armature winding in the nineteenth embodiment. In the embodiment, the balance varies with a coil pitch. Table 55 shows a case where a winding pitch is 30/36 (83.33%).

TABLE 55

| Parallel circuit | 1 | 2 | 3 | 4 | 5 | 6 |
|---|---|---|---|---|---|---|
| Voltage (p. u.) | 0.9995 | 1.0025 | 0.9979 | 0.9995 | 1.0025 | 0.9979 |
| Voltage phase (degree) | 0.000 | 0.000 | 0.000 | 0.000 | 0.000 | 0.000 |

As shown in Table 55, in the armature winding in the nineteenth embodiment, a voltage deviation (a deviation of a p.u. voltage from 1.0) is 0.25% maximum, and a phase angle deviation is 0.00°. These values meet the standard in the US patent of Rudolph Habermann Jr., 0.4% in voltage deviation and 0.15° in phase angle, and the voltage balance higher than that in the first embodiment is realized.

Table 56 shows a change in maximum voltage deviation and phase angle deviation with a winding pitch in the nineteenth embodiment. When a winding pitch is 30/36 or 31/36, the balance meets the standard in the US patent of Rudolph Habermann Jr., 0.4% in voltage deviation and 0.15° in phase angle.

TABLE 56

| Coil pitch | 27/36 | 28/36 | 29/36 | 30/36 | 31/36 | 32/36 |
|---|---|---|---|---|---|---|
| Voltage deviation | | | 0.53% | 0.25% | 0.36% | 0.42% |
| Phase angle deviation | | | 0.00° | 0.00° | 0.00° | 0.00° |

As described above, in the nineteenth embodiment, when a winding pitch is 30/36 or 31/36, the balance meeting the standard in the US patent of Rudolph Habermann Jr. is realized with respect to the voltages of parallel circuits, and a circulation current can be decreased.

The embodiment is not limited to the illustrated configuration. The lead-out positions may be different. For example, the coil pieces located at electrically equivalent positions in the parallel circuits 1 and 4 may be replaced.

Embodiment 20

Figure 20:
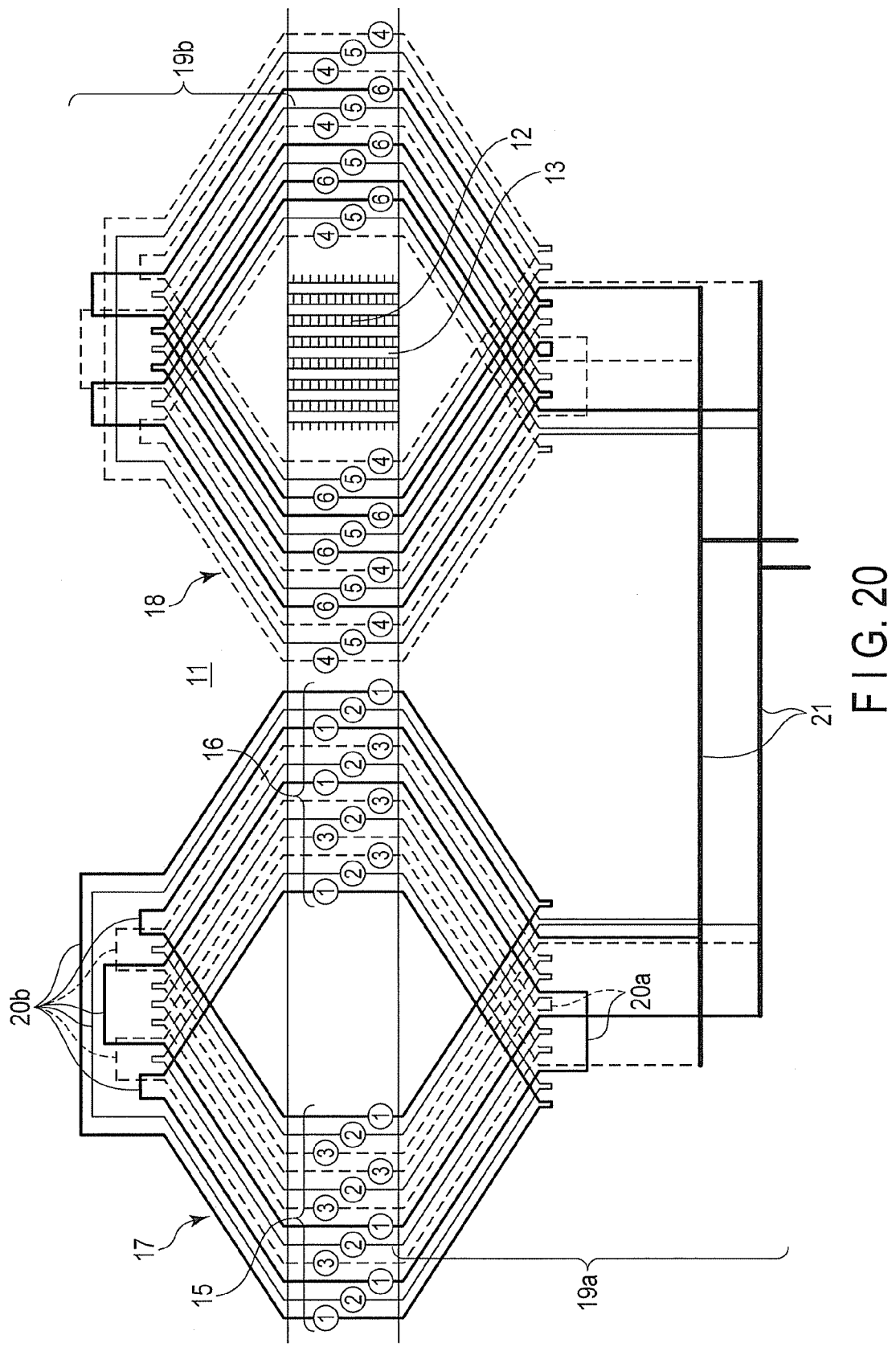
FIG. 20 is a developed perspective view showing one phase of an armature winding of a rotating electrical machine in a twentieth embodiment of the present invention.

FIG. 20 is a developed perspective view showing one phase of an armature winding of a rotating electrical machine in a twentieth embodiment of the present invention.

As shown in FIG. 20, an armature 11 of a rotating electrical machine is provided with seventy-two slots 13 in an armature core 12 comprising a laminated iron core. In the slots 13, a 2-pole 3-phase 6-parallel-circuit armature winding is housed in two layers.

An armature winding of each phase has an upper coil piece 15 housed in the upper part of the slot, and a lower coil piece 16 housed in the lower part of the slot. The ends of the upper and lower coil pieces 15 and 16 are connected in series at a connection side coil end 19a connected to a lead-out portion of the winding, and at a non-connection side coil end 19b located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are housed in the twelve slots 13.

The armature winding of each phase has six parallel circuits. The parallel circuits are given numbers ①, ②, ③, ④, ⑤ and ⑥ for identification in the drawing.

In each phase belt 17 and 18, the upper coil piece 15 is connected to the corresponding lower coil piece 16 apart by a fixed pitch, at the connection side coil end 19a and non-connection side coil end 19b, thereby forming six parallel circuits. The parallel circuits are connected in parallel through the lead-out connection conductor 21 provided at the connection side coil end 19a, thereby forming the armature winding.

In FIG. 20, four jumper wires 20a per phase are provided at the connection side coil end 19a of each phase 17 and 18, and fourteen jumper wires 20b per phase belt are provided at the non-connection side coil end 19b. When the relative positions of the upper and lower coil pieces 15 and 16 in each phase belt are indicated by positions from the pole center, the upper and lower coil pieces 15 and 16 of each parallel circuit are placed as shown in Table 57.

TABLE 57

|  |  | Relative positions from the center of pole |  |  |  |  |  |
|---|---|---|---|---|---|---|---|
|  |  | 1 | 2 | 3 | 4 | 5 | 6 |
| Parallel circuits 1 and 4 | Upper coil piece | 1 |  |  |  |  |  |
|  | Lower coil piece | 1 |  |  |  |  |  |
| Parallel circuits 2 and 5 | Upper coil piece |  |  | 1 |  | 1 |  |
|  | Lower coil piece |  |  | 1 |  | 1 |  |
| Parallel circuits 3 and 6 | Upper coil piece |  |  |  | 1 |  | 1 |
|  | Lower coil piece |  |  |  | 1 |  | 1 |
|  |  | Relative positions from the center of pole |  |  |  |  |  |
|  |  | 7 | 8 | 9 | 10 | 11 | 12 |
| Parallel circuits 1 and 4 | Upper coil piece | 1 |  |  | 1 |  | 1 |
|  | Lower coil piece | 1 |  |  | 1 |  | 1 |
| Parallel circuits 2 and 5 | Upper coil piece |  |  | 1 |  | 1 |  |
|  | Lower coil piece |  |  | 1 |  | 1 |  |
| Parallel circuits 3 and 6 | Upper coil piece |  |  | 1 |  |  |  |
|  | Lower coil piece |  |  | 1 |  |  |  |

As shown in Table 57, four upper and lower coil pieces 15 and 16 of the first and fourth parallel circuits are placed at 1st, 7th, 10th, and 12th positions from the pole center. Four upper and lower coil pieces 15 and 16 of the second and fifth parallel circuits are placed at 2nd, 5th, 8th, and 11th positions from the pole center. Four upper and lower coil pieces 15 and 16 of the third and sixth parallel circuits are placed at 3rd, 4th, 6th, and 9th positions from the pole center.

Therefore, the circuits of the upper and lower coil pieces 15 and 16 in the first phase belt 17 are numbered 1, 2, 3, 3, 2, 3, 1, 2, 3, 1, 2, 1 sequentially from the pole center side. The circuits of the upper and lower coil pieces 15 and 16 in the second phase belt 18 are numbered 4, 5, 6, 6, 5, 6, 4, 5, 6, 4, 5, 4 sequentially from the pole center side.

Table 58 shows the balance of the voltage generated in an armature winding in the twentieth embodiment. In the embodiment, the balance varies with a coil pitch. Table 55 shows a case where a winding pitch is 30/36 (83.33%).

TABLE 58

|  | Parallel circuit |  |  |  |  |  |
|---|---|---|---|---|---|---|
|  | 1 | 2 | 3 | 4 | 5 | 6 |
| Voltage (p.u.) | 0.9995 | 1.0025 | 0.9979 | 0.9995 | 1.0025 | 0.9979 |
| Voltage phase (degree) | 0.000 | 0.000 | 0.000 | 0.000 | 0.000 | 0.000 |

As shown in Table 58, in the armature winding in the twentieth embodiment, a voltage deviation (a deviation of a p.u. voltage from 1.0) is 0.25% maximum, and a phase angle deviation is 0.00°. These values meet the standard in the US patent of Rudolph Habermann Jr., 0.4% in voltage deviation and 0.15° in phase angle, and the voltage balance higher than that in the first embodiment is realized.

Table 59 shows a change in maximum voltage deviation and phase angle deviation with a winding pitch in the twentieth embodiment. Only when a winding pitch is 30/36 does the balance meet the standard in the US patent of Rudolph Habermann Jr., 0.4% in voltage deviation and 0.15° in phase angle.

TABLE 59

|  | Coil pitch |  |  |  |  |  |
|---|---|---|---|---|---|---|
|  | 27/36 | 28/36 | 29/36 | 30/36 | 31/36 | 32/36 |
| Voltage deviation |  |  | 0.63% | 0.25% | 0.47% |  |
| Phase angle deviation |  |  | 0.00° | 0.00° | 0.00° |  |

As described above, in the twentieth embodiment, only when a winding pitch is 30/36 is the balance meeting the standard in the US patent of Rudolph Habermann Jr. is realized with respect to the voltages of parallel circuits, and a circulation current can be decreased.

The embodiment is not limited to the illustrated configuration. The lead-out positions may be different. For example, the coil pieces located at electrically equivalent positions in the parallel circuits 1 and 4 may be replaced.

Embodiment 21

Figure 21:
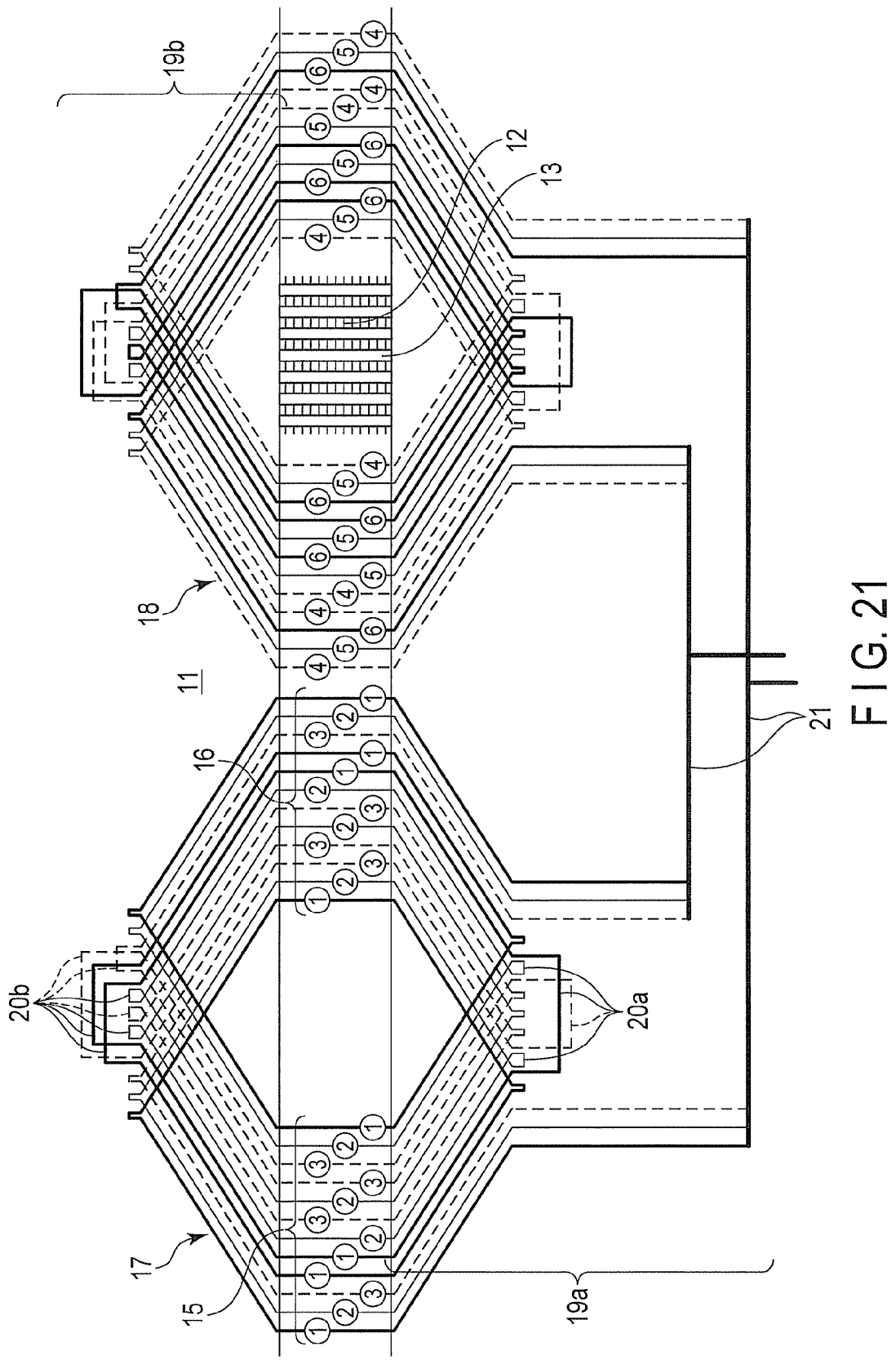
FIG. 21 is a developed perspective view showing one phase of an armature winding of a rotating electrical machine in a twenty-first embodiment of the present invention.

FIG. 21 is a developed perspective view showing one phase of an armature winding of a rotating electrical machine in a twenty-first embodiment of the present invention.

As shown in FIG. 21, an armature 11 of a rotating electrical machine is provided with seventy-two slots 13 in an armature core 12 comprising a laminated iron core. In the slots 13, a 2-pole 3-phase 6-parallel-circuit armature winding is housed in two layers.

An armature winding of each phase has an upper coil piece 15 housed in the upper part of the slot, and a lower coil piece 16 housed in the lower part of the slot. The ends of the upper and lower coil pieces 15 and 16 are connected in series at a connection side coil end 19a connected to a lead-out portion of the winding, and at a non-connection side coil end 19b located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are housed in the twelve slots 13.

The armature winding of each phase has six parallel circuits. The parallel circuits are given numbers ①, ②, ③, ④, ⑤ and ⑥ for identification in the drawing.

In each phase belt 17 and 18, the upper coil piece 15 is connected to the corresponding lower coil piece 16 apart by a fixed pitch, at the connection side coil end 19a and non-connection side coil end 19b, thereby forming six parallel circuits. The parallel circuits are connected in parallel through the lead-out connection conductor 21 provided at the connection side coil end 19a, thereby forming the armature winding.

In FIG. 21, eight jumper wires 20a per phase are provided at the connection side coil end 19a of each phase 17 and 18, and fourteen jumper wires 20b per phase belt are provided at the non-connection side coil end 19b. When the relative positions of the upper and lower coil pieces 15 and 16 in each phase belt are indicated by positions from the pole center, the upper and lower coil pieces 15 and 16 of each parallel circuit are placed as shown in Table 60.

TABLE 60

| | | Relative positions from the center of pole | | | | | |
|---|---|---|---|---|---|---|---|
| | | 1 | 2 | 3 | 4 | 5 | 6 |
| Parallel circuits 1 and 4 | Upper coil piece | 1 | | | | | |
| | Lower coil piece | 1 | | | | | |
| Parallel circuits 2 and 5 | Upper coil piece | | 1 | | | 1 | |
| | Lower coil piece | | 1 | | | 1 | |
| Parallel circuits 3 and 6 | Upper coil piece | | | 1 | 1 | | 1 |
| | Lower coil piece | | | 1 | 1 | | 1 |

| | | Relative positions from the center of pole | | | | | |
|---|---|---|---|---|---|---|---|
| | | 7 | 8 | 9 | 10 | 11 | 12 |
| Parallel circuits 1 and 4 | Upper coil piece | | 1 | 1 | | | 1 |
| | Lower coil piece | | 1 | 1 | | | 1 |
| Parallel circuits 2 and 5 | Upper coil piece | 1 | | | | 1 | |
| | Lower coil piece | 1 | | | | 1 | |
| Parallel circuits 3 and 6 | Upper coil piece | | | | 1 | | |
| | Lower coil piece | | | | 1 | | |

As shown in Table 60, four upper and lower coil pieces 15 and 16 of the first and fourth parallel circuits are placed at 1st, 8th, 9th, and 12th positions from the pole center. Four upper and lower coil pieces 15 and 16 of the second and fifth parallel circuits are placed at 2nd, 5th, 7th, and 11th positions from the pole center. Four upper and lower coil pieces 15 and 16 of the third and sixth parallel circuits are placed at 3rd, 4th, 6th, and 10th positions from the pole center.

Therefore, the circuits of the upper and lower coil pieces 15 and 16 in the first phase belt 17 are numbered 1, 2, 3, 3, 2, 3, 2, 1, 1, 3, 2, 1 sequentially from the pole center side. The circuits of the upper and lower coil pieces 15 and 16 in the second phase belt 18 are numbered 4, 5, 6, 6, 5, 6, 5, 4, 4, 6, 5, 4 sequentially from the pole center side.

Table 61 shows the balance of the voltage generated in an armature winding in the twenty-first embodiment. In the embodiment, the balance varies with a coil pitch. Table 55 shows a case where a winding pitch is 30/36 (83.33%).

TABLE 61

| | Parallel circuit | | | | | |
|---|---|---|---|---|---|---|
| | 1 | 2 | 3 | 4 | 5 | 6 |
| Voltage (p.u.) | 1.0036 | 0.9984 | 0.9979 | 1.0036 | 0.9984 | 0.9979 |
| Voltage phase (degree) | 0.000 | 0.000 | 0.000 | 0.000 | 0.000 | 0.000 |

As shown in Table 61, in the armature winding in the twenty-first embodiment, a voltage deviation (a deviation of a p.u. voltage from 1.0) is 0.36% maximum, and a phase angle deviation is 0.00°. These values meet the standard in the US patent of Rudolph Habermann Jr., 0.4% in voltage deviation and 0.15° in phase angle, and the voltage balance higher than that in the first embodiment is realized.

Table 62 shows a change in maximum voltage deviation and phase angle deviation with a winding pitch in the twenty-first embodiment. When a winding pitch is 30/36 or 31/36, the balance meets the standard in the US patent of Rudolph Habermann Jr., 0.4% in voltage deviation and 0.15° in phase angle.

TABLE 62

| | Coil pitch | | | | | |
|---|---|---|---|---|---|---|
| | 27/36 | 28/36 | 29/36 | 30/36 | 31/36 | 32/36 |
| Voltage deviation | | | 0.79% | 0.36% | 0.11% | 0.47% |
| Phase angle deviation | | | 0.00° | 0.00° | 0.00° | 0.00° |

As described above, in the twenty-first embodiment, when a winding pitch is 30/36 or 31/36, the balance meeting the standard in the US patent of Rudolph Habermann Jr. is realized with respect to the voltages of parallel circuits, and a circulation current can be decreased.

The embodiment is not limited to the illustrated configuration. The lead-out positions may be different. For example, the coil pieces located at electrically equivalent positions in the parallel circuits 1 and 4 may be replaced.

Embodiment 22

Figure 22:
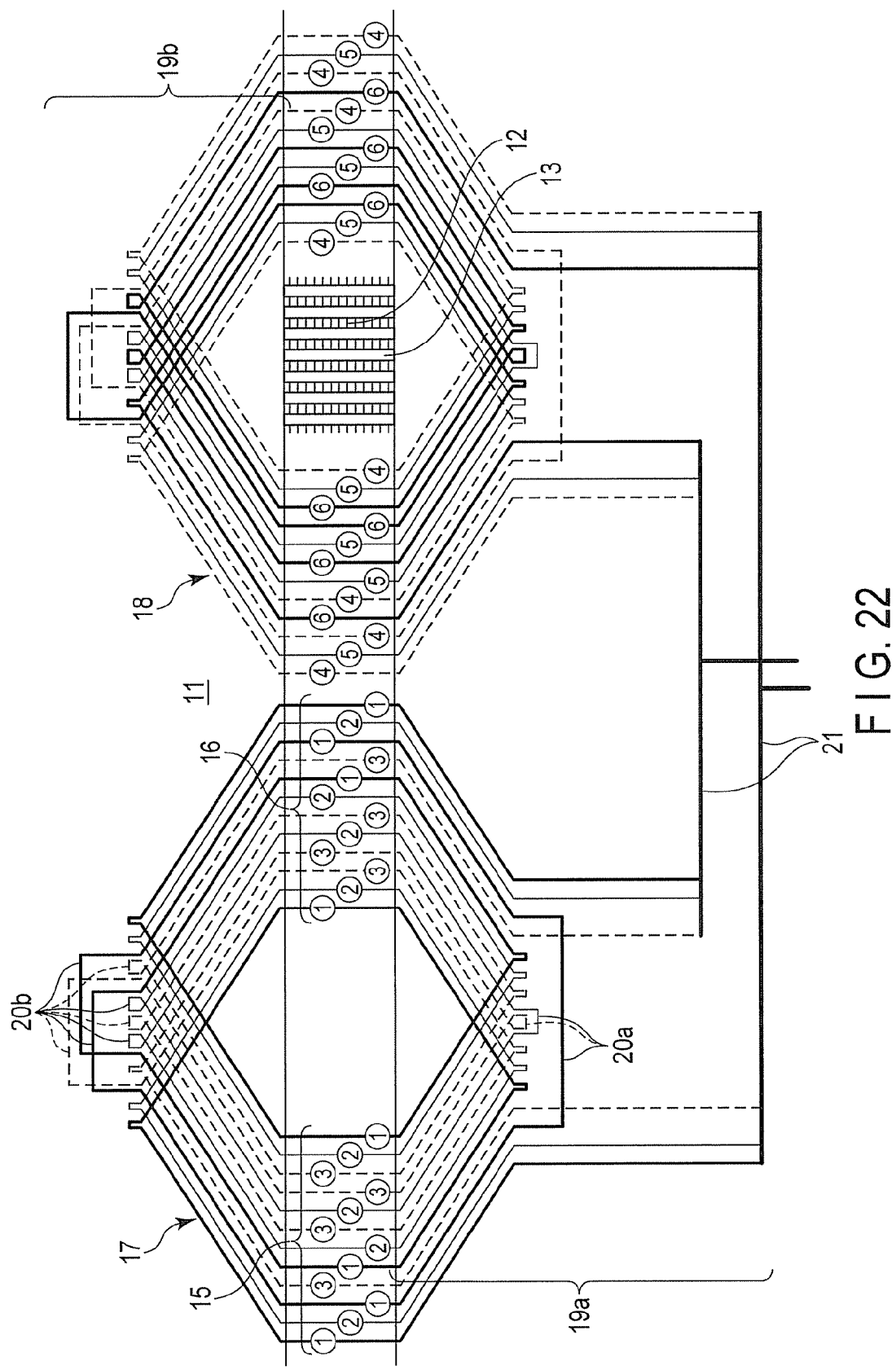
FIG. 22 is a developed perspective view showing one phase of an armature winding of a rotating electrical machine in a twenty-second embodiment of the present invention.

FIG. 22 is a developed perspective view showing one phase of an armature winding of a rotating electrical machine in a twenty-second embodiment of the present invention.

As shown in FIG. 22, an armature 11 of a rotating electrical machine is provided with seventy-two slots 13 in an armature core 12 comprising a laminated iron core. In the slots 13, a 2-pole 3-phase 6-parallel-circuit armature winding is housed in two layers.

An armature winding of each phase has an upper coil piece 15 housed in the upper part of the slot, and a lower coil piece 16 housed in the lower part of the slot. The ends of the upper and lower coil pieces 15 and 16 are connected in series at a connection side coil end 19a connected to a lead-out portion of the winding, and at a non-connection side coil end 19b located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are housed in the twelve slots 13.

The armature winding of each phase has six parallel circuits. The parallel circuits are given numbers ①, ②, ③, ④, ⑤ and ⑥ for identification in the drawing.

In each phase belt 17 and 18, the upper coil piece 15 is connected to the corresponding lower coil piece 16 apart by a fixed pitch, at the connection side coil end 19a and non-connection side coil end 19b, thereby forming six parallel circuits. The parallel circuits are connected in parallel through the lead-out connection conductor 21 provided at the connection side coil end 19a, thereby forming the armature winding.

In FIG. 22, six jumper wires 20a per phase are provided at the connection side coil end 19a of each phase 17 and 18, and fourteen jumper wires 20b per phase belt are provided at the non-connection side coil end 19b. When the relative positions of the upper and lower coil pieces 15 and 16 in each phase belt are indicated by positions from the pole center, the upper and lower coil pieces 15 and 16 of each parallel circuit are placed as shown in Table 63.

TABLE 63

|  |  | \multicolumn{6}{c}{Relative positions from the center of pole} |
|---|---|---|---|---|---|---|---|
|  |  | 1 | 2 | 3 | 4 | 5 | 6 |
| Parallel circuits 1 and 4 | Upper coil piece | 1 |  |  |  |  |  |
|  | Lower coil piece | 1 |  |  |  |  |  |
| Parallel circuits 2 and 5 | Upper coil piece |  | 1 |  |  | 1 |  |
|  | Lower coil piece |  | 1 |  |  | 1 |  |
| Parallel circuits 3 and 6 | Upper coil piece |  |  | 1 | 1 |  | 1 |
|  | Lower coil piece |  |  | 1 | 1 |  | 1 |

|  |  | \multicolumn{6}{c}{Relative positions from the center of pole} |
|---|---|---|---|---|---|---|---|
|  |  | 7 | 8 | 9 | 10 | 11 | 12 |
| Parallel circuits 1 and 4 | Upper coil piece |  | 1 |  | 1 |  | 1 |
|  | Lower coil piece |  | 1 |  | 1 |  | 1 |
| Parallel circuits 2 and 5 | Upper coil piece | 1 |  |  |  | 1 |  |
|  | Lower coil piece | 1 |  |  |  | 1 |  |
| Parallel circuits 3 and 6 | Upper coil piece |  |  | 1 |  |  |  |
|  | Lower coil piece |  |  | 1 |  |  |  |

As shown in Table 63, four upper and lower coil pieces 15 and 16 of the first and fourth parallel circuits are placed at 1st, 8th, 10th, and 12th positions from the pole center. Four upper and lower coil pieces 15 and 16 of the second and fifth parallel circuits are placed at 2nd, 5th, 7th, and 11th positions from the pole center. Four upper and lower coil pieces 15 and 16 of the third and sixth parallel circuits are placed at 3rd, 4th, 6th, and 9th positions from the pole center.

Therefore, the circuits of the upper and lower coil pieces 15 and 16 in the first phase belt 17 are numbered 1, 2, 3, 3, 2, 3, 2, 1, 3, 1, 2, 1 sequentially from the pole center side. The circuits of the upper and lower coil pieces 15 and 16 in the second phase belt 18 are numbered 4, 5, 6, 6, 5, 6, 5, 4, 6, 4, 5, 4 sequentially from the pole center side.

Table 64 shows the balance of the voltage generated in an armature winding in the twenty-second embodiment. In the embodiment, the balance varies with a coil pitch. Table 64 shows a case where a winding pitch is 30/36 (83.33%).

TABLE 64

|  | \multicolumn{6}{c}{Parallel circuit} |
|---|---|---|---|---|---|---|
|  | 1 | 2 | 3 | 4 | 5 | 6 |
| Voltage (p.u.) | 1.0036 | 0.9984 | 0.9979 | 1.0036 | 0.9984 | 0.9979 |
| Voltage phase (degree) | 0.000 | 0.000 | 0.000 | 0.000 | 0.000 | 0.000 |

As shown in Table 64, in the armature winding in the twenty-second embodiment, a voltage deviation (a deviation of a p.u. voltage from 1.0) is 0.36% maximum, and a phase angle deviation is 0.00°. These values meet the standard in the US patent of Rudolph Habermann Jr., 0.4% in voltage deviation and 0.15° in phase angle, and the voltage balance higher than that in the first embodiment is realized.

Table 65 shows a change in maximum voltage deviation and phase angle deviation with a winding pitch in the twenty-second embodiment. When a winding pitch is 30/36 or 31/36, the balance meets the standard in the US patent of Rudolph Habermann Jr., 0.4% in voltage deviation and 0.15° in phase angle.

TABLE 65

|  | \multicolumn{6}{c}{Coil pitch} |
|---|---|---|---|---|---|---|
|  | 27/36 | 28/36 | 29/36 | 30/36 | 31/36 | 32/36 |
| Voltage deviation |  |  | 0.90% | 0.36% | 0.21% | 0.67% |
| Phase angle deviation |  |  | 0.00° | 0.00° | 0.00° | 0.00° |

As described above, in the twenty-second embodiment, when the winding pitch is 30/36 or 31/36, the balance meeting the standard in the US patent of Rudolph Habermann Jr. is realized with respect to the voltages of parallel circuits, and a circulation current can be decreased.

The embodiment is not limited to the illustrated configuration. The lead-out positions may be different. For example, the coil pieces located at electrically equivalent positions in the parallel circuits 1 and 4 may be replaced.

Embodiment 23

Figure 23:
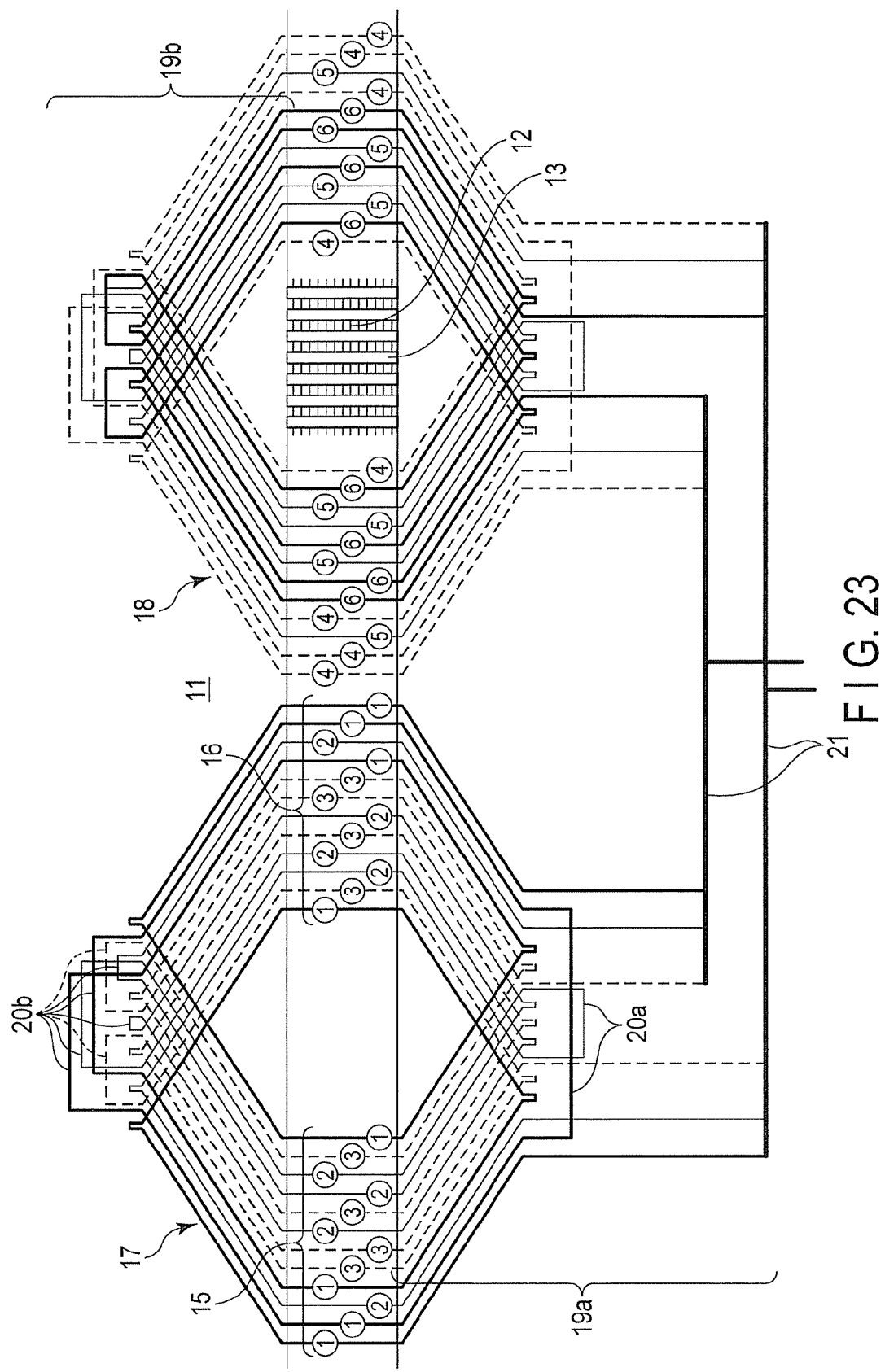
FIG. 23 is a developed perspective view showing one phase of an armature winding of a rotating electrical machine in a twenty-third embodiment of the present invention.

FIG. 23 is a developed perspective view showing one phase of an armature winding of a rotating electrical machine in a twenty-third embodiment of the present invention.

As shown in FIG. 23, an armature 11 of a rotating electrical machine is provided with seventy-two slots 13 in an armature core 12 comprising a laminated iron core. In the slots 13, a 2-pole 3-phase 6-parallel-circuit armature winding is housed in two layers.

An armature winding of each phase has an upper coil piece 15 housed in the upper part of the slot, and a lower coil piece 16 housed in the lower part of the slot. The ends of the upper and lower coil pieces 15 and 16 are connected in series at a connection side coil end 19a connected to a lead-out portion of the winding, and at a non-connection side coil end 19b located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are housed in the twelve slots 13.

The armature winding of each phase has six parallel circuits. The parallel circuits are given numbers ①, ②, ③, ④, ⑤ and ⑥ for identification in the drawing.

In each phase belt 17 and 18, the upper coil piece 15 is connected to the corresponding lower coil piece 16 apart by a fixed pitch, at the connection side coil end 19a and non-connection side coil end 19b, thereby forming six parallel circuits. The parallel circuits are connected in parallel through the lead-out connection conductor 21 provided at the connection side coil end 19a, thereby forming the armature winding.

In FIG. 23, four jumper wires 20a per phase are provided at the connection side coil end 19a of each phase 17 and 18, and fourteen jumper wires 20b per phase belt are provided at the non-connection side coil end 19b. When the relative positions of the upper and lower coil pieces 15 and 16 in each phase belt are indicated by positions from the pole center, the upper and lower coil pieces 15 and 16 of each parallel circuit are placed as shown in Table 66.

TABLE 66

| | | Relative positions from the center of pole | | | | | |
|---|---|---|---|---|---|---|---|
| | | 1 | 2 | 3 | 4 | 5 | 6 |
| Parallel circuits 1 and 4 | Upper coil piece | 1 | | | | | |
| | Lower coil piece | 1 | | | | | |
| Parallel circuits 2 and 5 | Upper coil piece | | | 1 | 1 | | 1 |
| | Lower coil piece | | | 1 | 1 | | 1 |
| Parallel circuits 3 and 6 | Upper coil piece | | 1 | | | 1 | |
| | Lower coil piece | | 1 | | | 1 | |

| | | Relative positions from the center of pole | | | | | |
|---|---|---|---|---|---|---|---|
| | | 7 | 8 | 9 | 10 | 11 | 12 |
| Parallel circuits 1 and 4 | Upper coil piece | | | 1 | | 1 | 1 |
| | Lower coil piece | | | 1 | | 1 | 1 |
| Parallel circuits 2 and 5 | Upper coil piece | | | | 1 | | |
| | Lower coil piece | | | | 1 | | |
| Parallel circuits 3 and 6 | Upper coil piece | 1 | 1 | | | | |
| | Lower coil piece | 1 | 1 | | | | |

As shown in Table 66, four upper and lower coil pieces 15 and 16 of the first and fourth parallel circuits are placed at 1st, 9th, 11th, and 12th positions from the pole center. Four upper and lower coil pieces 15 and 16 of the second and fifth parallel circuits are placed at 3rd, 4th, 6th, and 10th positions from the pole center. Four upper and lower coil pieces 15 and 16 of the third and sixth parallel circuits are placed at 2nd, 5th, 7th, and 8th positions from the pole center.

Therefore, the circuits of the upper and lower coil pieces 15 and 16 in the first phase belt 17 are numbered 1, 3, 2, 2, 3, 2, 3, 3, 1, 2, 1, 1 sequentially from the pole center side. The circuits of the upper and lower coil pieces 15 and 16 in the second phase belt 18 are numbered 4, 6, 5, 5, 6, 5, 6, 6, 4, 5, 4, 4 sequentially from the pole center side.

Table 67 shows the balance of the voltage generated in an armature winding in the twenty-third embodiment. In the embodiment, the balance varies with a coil pitch. Table 67 shows a case where a winding pitch is 30/36 (83.33%).

TABLE 67

| | Parallel circuit | | | | | |
|---|---|---|---|---|---|---|
| | 1 | 2 | 3 | 4 | 5 | 6 |
| Voltage (p.u.) | 1.0036 | 0.9979 | 0.9984 | 1.0036 | 0.9979 | 0.9984 |
| Voltage phase (degree) | 0.000 | 0.000 | 0.000 | 0.000 | 0.000 | 0.000 |

As shown in Table 67, in the armature winding in the twenty-third embodiment, a voltage deviation (a deviation of a p.u. voltage from 1.0) is 0.36% maximum, and a phase angle deviation is 0.00°. These values meet the standard in the US patent of Rudolph Habermann Jr., 0.4% in voltage deviation and 0.15° in phase angle, and the voltage balance higher than that in the first embodiment is realized.

Table 68 shows a change in maximum voltage deviation and phase angle deviation with a winding pitch in the twenty-third embodiment. When a winding pitch is 30/36 or 31/36, the balance meets the standard in the US patent of Rudolph Habermann Jr., 0.4% in voltage deviation and 0.15° in phase angle.

TABLE 68

| | Coil pitch | | | | | |
|---|---|---|---|---|---|---|
| | 27/36 | 28/36 | 29/36 | 30/36 | 31/36 | 32/36 |
| Voltage deviation | | | 1.10% | 0.36% | 0.36% | 1.10% |
| Phase angle deviation | | | 0.00° | 0.00° | 0.00° | 0.00° |

As described above, in the twenty-third embodiment, when a winding pitch is 30/36 or 31/36, the balance meeting the standard in the US patent of Rudolph Habermann Jr. is realized with respect to the voltages of parallel circuits, and a circulation current can be decreased.

The embodiment is not limited to the illustrated configuration. The lead-out positions may be different. For example, the coil pieces located at electrically equivalent positions in the parallel circuits 1 and 4 may be replaced.

Embodiment 24

Figure 24:
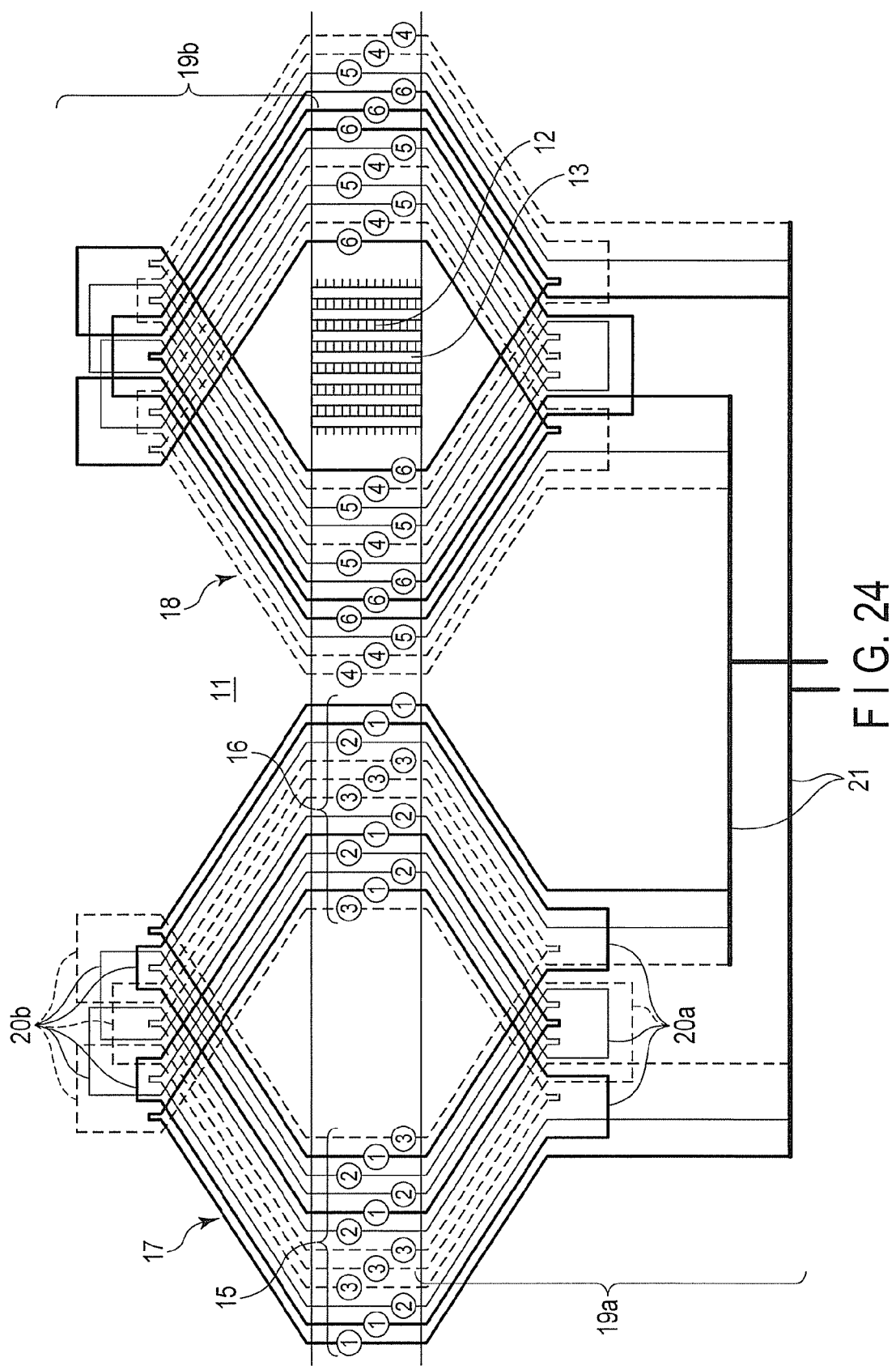
FIG. 24 is a developed perspective view showing one phase of an armature winding of a rotating electrical machine in a twenty-fourth embodiment of the present invention.

FIG. 24 is a developed perspective view showing one phase of an armature winding of a rotating electrical machine in a twenty-fourth embodiment of the present invention.

As shown in FIG. 24, an armature 11 of a rotating electrical machine is provided with seventy-two slots 13 in an armature core 12 comprising a laminated iron core. In the slots 13, a 2-pole 3-phase 6-parallel-circuit armature winding is housed in two layers.

An armature winding of each phase has an upper coil piece 15 housed in the upper part of the slot, and a lower coil piece 16 housed in the lower part of the slot. The ends of the upper and lower coil pieces 15 and 16 are connected in series at a connection side coil end 19a connected to a lead-out portion of the winding, and at a non-connection side coil end 19b located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are housed in the twelve slots 13.

The armature winding of each phase has six parallel circuits. The parallel circuits are given numbers ①, ②, ③, ④, ⑤ and ⑥ for identification in the drawing.

In each phase belt 17 and 18, the upper coil piece 15 is connected to the corresponding lower coil piece 16 apart by a fixed pitch, at the connection side coil end 19a and non-connection side coil end 19b, thereby forming six parallel circuits. The parallel circuits are connected in parallel through the lead-out connection conductor 21 provided at the connection side coil end 19a, thereby forming the armature winding.

In FIG. 24, eight jumper wires 20a per phase are provided at the connection side coil end 19a of each phase 17 and 18, and fourteen jumper wires 20b per phase belt are provided at the non-connection side coil end 19b. When the relative positions of the upper and lower coil pieces 15 and 16 in each phase belt are indicated by positions from the pole center, the upper and lower coil pieces 15 and 16 of each parallel circuit are placed as shown in Table 69.

TABLE 69

| | | \multicolumn{6}{c}{Relative positions from the center of pole} |
|---|---|---|---|---|---|---|---|
| | | 1 | 2 | 3 | 4 | 5 | 6 |
| Parallel circuits 1 and 4 | Upper coil piece | | 1 | | | 1 | |
| | Lower coil piece | | 1 | | | 1 | |
| Parallel circuits 2 and 5 | Upper coil piece | | | 1 | 1 | | 1 |
| | Lower coil piece | | | 1 | 1 | | 1 |
| Parallel circuits 3 and 6 | Upper coil piece | 1 | | | | | |
| | Lower coil piece | 1 | | | | | |

| | | \multicolumn{6}{c}{Relative positions from the center of pole} |
|---|---|---|---|---|---|---|---|
| | | 7 | 8 | 9 | 10 | 11 | 12 |
| Parallel circuits 1 and 4 | Upper coil piece | | | | | 1 | 1 |
| | Lower coil piece | | | | | 1 | 1 |
| Parallel circuits 2 and 5 | Upper coil piece | | | | 1 | | |
| | Lower coil piece | | | | 1 | | |
| Parallel circuits 3 and 6 | Upper coil piece | 1 | 1 | 1 | | | |
| | Lower coil piece | 1 | 1 | 1 | | | |

As shown in Table 69, four upper and lower coil pieces 15 and 16 of the first and fourth parallel circuits are placed at 2nd, 5th, 11th, and 12th positions from the pole center. Four upper and lower coil pieces 15 and 16 of the second and fifth parallel circuits are placed at 3rd, 4th, 6th, and 10th positions from the pole center. Four upper and lower coil pieces 15 and 16 of the third and sixth parallel circuits are placed at 1st, 7th, 8th and 9th positions from the pole center.

Therefore, the circuits of the upper and lower coil pieces 15 and 16 in the first phase belt 17 are numbered 3, 1, 2, 2, 1, 2, 3, 3, 3, 2, 1, 1 sequentially from the pole center side. The circuits of the upper and lower coil pieces 15 and 16 in the second phase belt 18 are numbered 6, 4, 5, 5, 4, 5, 6, 6, 6, 5, 4, 4 sequentially from the pole center side.

Table 70 shows the balance of the voltage generated in an armature winding in the twenty-fourth embodiment. In the embodiment, the balance varies with a coil pitch. Table 70 shows a case where a winding pitch is 30/36 (83.33%).

TABLE 70

| | \multicolumn{6}{c}{Parallel circuit} |
|---|---|---|---|---|---|---|
| | 1 | 2 | 3 | 4 | 5 | 6 |
| Voltage (p.u.) | 0.9984 | 0.9979 | 1.0036 | 0.9984 | 0.9979 | 1.0036 |
| Voltage phase (degree) | 0.000 | 0.000 | 0.000 | 0.000 | 0.000 | 0.000 |

As shown in Table 70, in the armature winding in the twenty-fourth embodiment, a voltage deviation (a deviation of a p.u. voltage from 1.0) is 0.36% maximum, and a phase angle deviation is 0.00°. These values meet the standard in the US patent of Rudolph Habermann Jr., 0.4% in voltage deviation and 0.15° in phase angle, and the voltage balance higher than that in the first embodiment is realized.

Table 71 shows a change in maximum voltage deviation and phase angle deviation with a winding pitch in the twenty-fourth embodiment. Only when a winding pitch is 30/36 does the balance meet the standard in the US patent of Rudolph Habermann Jr., 0.4% in voltage deviation and 0.15° in phase angle.

TABLE 71

| | \multicolumn{6}{c}{Coil pitch} |
|---|---|---|---|---|---|---|
| | 27/36 | 28/36 | 29/36 | 30/36 | 31/36 | 32/36 |
| Voltage deviation | | | 0.53% | 0.36% | 0.56% | |
| Phase angle deviation | | | 0.00° | 0.00° | 0.00° | |

As described above, in the twenty-fourth embodiment, only when a winding pitch is 30/36 is the balance meeting the standard in the US patent of Rudolph Habermann Jr. realized with respect to the voltages of parallel circuits, and a circulation current can be decreased.

The embodiment is not limited to the illustrated configuration. The lead-out positions may be different. For example, the coil pieces located at electrically equivalent positions in the parallel circuits 1 and 4 may be replaced.

Embodiment 25

Figure 25:
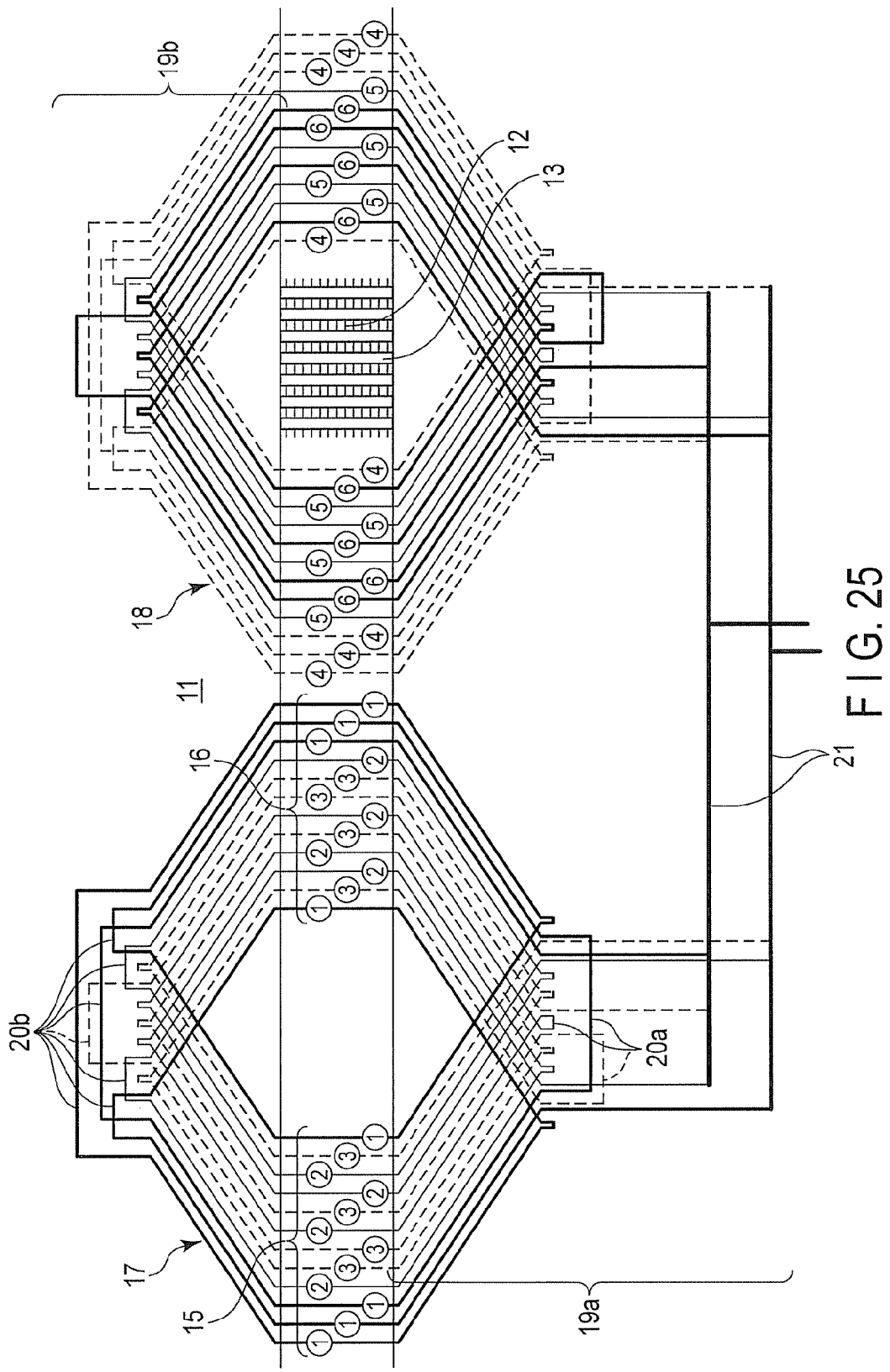
FIG. 25 is a developed perspective view showing one phase of an armature winding of a rotating electrical machine in a twenty-fifth embodiment of the present invention.

FIG. 25 is a developed perspective view showing one phase of an armature winding of a rotating electrical machine in a twenty-fifth embodiment of the present invention.

As shown in FIG. 25, an armature 11 of a rotating electrical machine is provided with seventy-two slots 13 in an armature core 12 comprising a laminated iron core. In the slots 13, a 2-pole 3-phase 6-parallel-circuit armature winding is housed in two layers.

An armature winding of each phase has an upper coil piece 15 housed in the upper part of the slot, and a lower coil piece 16 housed in the lower part of the slot. The ends of the upper and lower coil pieces 15 and 16 are connected in series at a connection side coil end 19a connected to a lead-out portion of the winding, and at a non-connection side coil end 19b located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are housed in the twelve slots 13.

The armature winding of each phase has six parallel circuits. The parallel circuits are given numbers ①, ②, ③, ④, ⑤ and ⑥ for identification in the drawing.

In each phase belt 17 and 18, the upper coil piece 15 is connected to the corresponding lower coil piece 16 apart by a fixed pitch, at the connection side coil end 19a and non-connection side coil end 19b, thereby forming six parallel circuits. The parallel circuits are connected in parallel through the lead-out connection conductor 21 provided at the connection side coil end 19a, thereby forming the armature winding.

In FIG. 25, six jumper wires 20a per phase are provided at the connection side coil end 19a of each phase 17 and 18, and fourteen jumper wires 20b per phase belt are provided at the non-connection side coil end 19b. When the relative positions of the upper and lower coil pieces 15 and 16 in each phase belt are indicated by positions from the pole center, the upper and lower coil pieces 15 and 16 of each parallel circuit are placed as shown in Table 72.

TABLE 72

|  |  | \multicolumn{6}{c}{Relative positions from the center of pole} |
|---|---|---|---|---|---|---|---|
|  |  | 1 | 2 | 3 | 4 | 5 | 6 |
| Parallel circuits 1 and 4 | Upper coil piece | 1 |  |  |  |  |  |
|  | Lower coil piece | 1 |  |  |  |  |  |
| Parallel circuits 2 and 5 | Upper coil piece |  |  | 1 | 1 |  | 1 |
|  | Lower coil piece |  |  | 1 | 1 |  | 1 |
| Parallel circuits 3 and 6 | Upper coil piece |  | 1 |  |  | 1 |  |
|  | Lower coil piece |  | 1 |  |  | 1 |  |

|  |  | \multicolumn{6}{c}{Relative positions from the center of pole} |
|---|---|---|---|---|---|---|---|
|  |  | 7 | 8 | 9 | 10 | 11 | 12 |
| Parallel circuits 1 and 4 | Upper coil piece |  |  |  | 1 | 1 | 1 |
|  | Lower coil piece |  |  |  | 1 | 1 | 1 |
| Parallel circuits 2 and 5 | Upper coil piece |  |  | 1 |  |  |  |
|  | Lower coil piece |  |  | 1 |  |  |  |
| Parallel circuits 3 and 6 | Upper coil piece | 1 | 1 |  |  |  |  |
|  | Lower coil piece | 1 | 1 |  |  |  |  |

As shown in Table 72, four upper and lower coil pieces 15 and 16 of the first and fourth parallel circuits are placed at 1st, 10th, 11th, and 12th positions from the pole center. Four upper and lower coil pieces 15 and 16 of the second and fifth parallel circuits are placed at 3rd, 4th, 6th, and 9th positions from the pole center. Four upper and lower coil pieces 15 and 16 of the third and sixth parallel circuits are placed at 2nd, 5th, 7th, and 8th positions from the pole center.

Therefore, the circuits of the upper and lower coil pieces 15 and 16 in the first phase belt 17 are numbered 1, 3, 2, 2, 3, 2, 3, 3, 2, 1, 1, 1 sequentially from the pole center side. The circuits of the upper and lower coil pieces 15 and 16 in the second phase belt 18 are numbered 4, 6, 5, 5, 6, 5, 6, 6, 5, 4, 4, 4 sequentially from the pole center side.

Table 73 shows the balance of the voltage generated in an armature winding in the twenty-fifth embodiment. In the embodiment, the balance varies with a coil pitch. Table 73 shows a case where a winding pitch is 30/36 (83.33%).

TABLE 73

|  | \multicolumn{6}{c}{Parallel circuit} |
|---|---|---|---|---|---|---|
|  | 1 | 2 | 3 | 4 | 5 | 6 |
| Voltage (p.u.) | 1.0036 | 0.9979 | 0.9984 | 1.0036 | 0.9979 | 0.9984 |
| Voltage phase (degree) | 0.000 | 0.000 | 0.000 | 0.000 | 0.000 | 0.000 |

As shown in Table 73, in the armature winding in the twenty-fifth embodiment, a voltage deviation (a deviation of a p.u. voltage from 1.0) is 0.36% maximum, and a phase angle deviation is 0.00°. These values meet the standard in the US patent of Rudolph Habermann Jr., 0.4% in voltage deviation and 0.15° in phase angle, and the voltage balance higher than that in the first embodiment is realized.

Table 74 shows a change in maximum voltage deviation and phase angle deviation with a winding pitch in the twenty-fifth embodiment. Only when a winding pitch is 30/36 does the balance meet the standard in the US patent of Rudolph Habermann Jr., 0.4% in voltage deviation and 0.15° in phase angle.

TABLE 74

|  | \multicolumn{6}{c}{Coil pitch} |
|---|---|---|---|---|---|---|
|  | 27/36 | 28/36 | 29/36 | 30/36 | 31/36 | 32/36 |
| Voltage deviation |  |  | 1.21% | 0.36% | 0.47% |  |
| Phase angle deviation |  |  | 0.00° | 0.00° | 0.00° |  |

As described above, in the twenty-fifth embodiment, only when a winding pitch is 30/36 is the balance meeting the standard in the US patent of Rudolph Habermann Jr. realized with respect to the voltages of parallel circuits, and a circulation current can be decreased.

The embodiment is not limited to the illustrated configuration. The lead-out positions may be different. For example, the coil pieces located at electrically equivalent positions in the parallel circuits 1 and 4 may be replaced.

Embodiment 26

Figure 26:
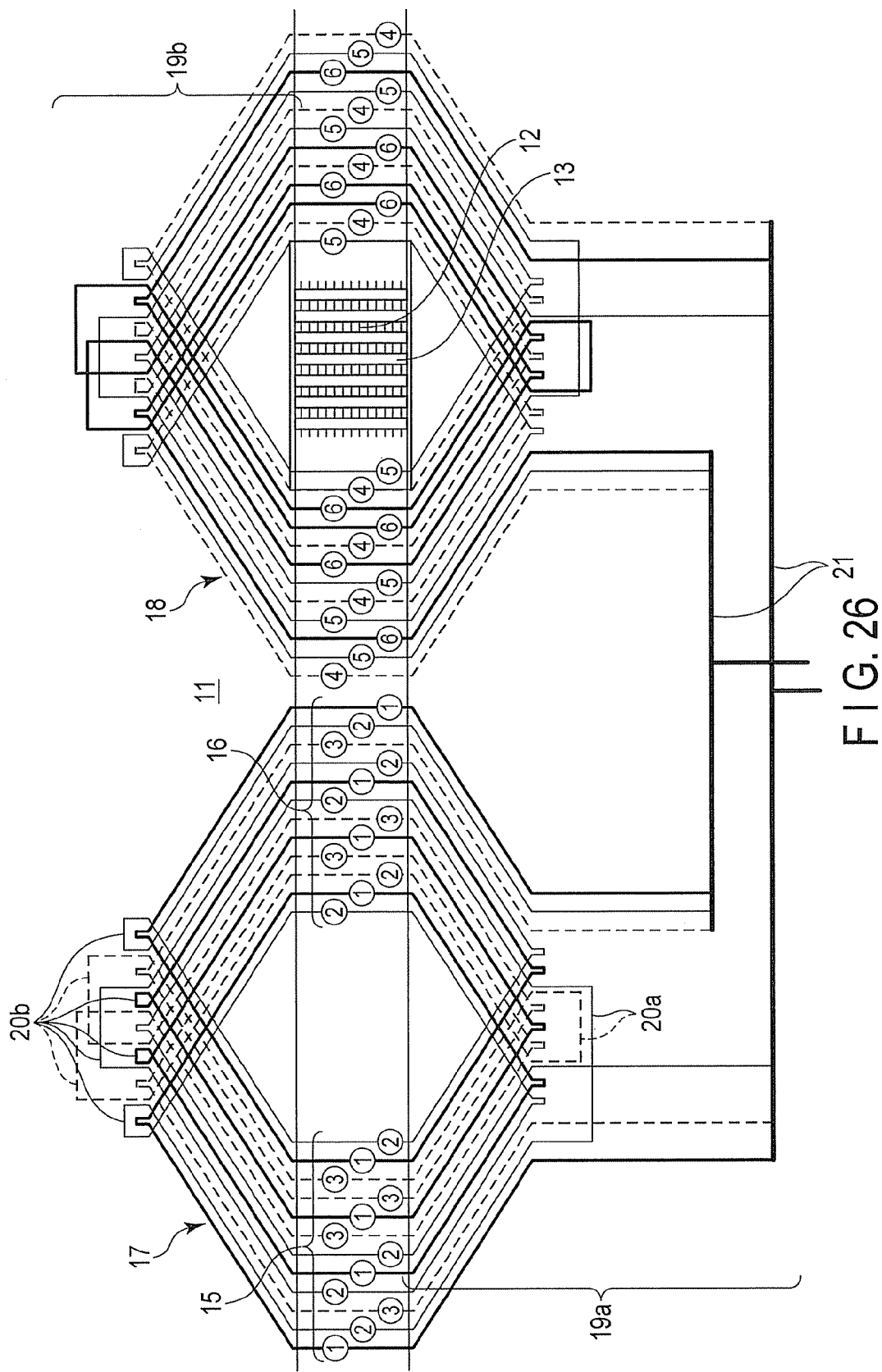
FIG. 26 is a developed perspective view showing one phase of an armature winding of a rotating electrical machine in a twenty-sixth embodiment of the present invention.

FIG. 26 is a developed perspective view showing one phase of an armature winding of a rotating electrical machine in a twenty-sixth embodiment of the present invention.

As shown in FIG. 26, an armature 11 of a rotating electrical machine is provided with seventy-two slots 13 in an armature core 12 comprising a laminated iron core. In the slots 13, a 2-pole 3-phase 6-parallel-circuit armature winding is housed in two layers.

An armature winding of each phase has an upper coil piece 15 housed in the upper part of the slot, and a lower coil piece 16 housed in the lower part of the slot. The ends of the upper and lower coil pieces 15 and 16 are connected in series at a connection side coil end 19a connected to a lead-out portion of the winding, and at a non-connection side coil end 19b located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are housed in the twelve slots 13.

The armature winding of each phase has six parallel circuits. The parallel circuits are given numbers ①, ②, ③, ④, ⑤ and ⑥ for identification in the drawing.

In each phase belt 17 and 18, the upper coil piece 15 is connected to the corresponding lower coil piece 16 apart by a fixed pitch, at the connection side coil end 19a and non-connection side coil end 19b, thereby forming six parallel circuits. The parallel circuits are connected in parallel through the lead-out connection conductor 21 provided at the connection side coil end 19a, thereby forming the armature winding.

In FIG. 26, four jumper wires 20a per phase are provided at the connection side coil end 19a of each phase 17 and 18, and fourteen jumper wires 20b per phase belt are provided at the non-connection side coil end 19b. When the relative positions of the upper and lower coil pieces 15 and 16 in each phase belt are indicated by positions from the pole center, the upper and lower coil pieces 15 and 16 of each parallel circuit are placed as shown in Table 75.

TABLE 75

| | | Relative positions from the center of pole | | | | | |
|---|---|---|---|---|---|---|---|
| | | 1 | 2 | 3 | 4 | 5 | 6 |
| Parallel circuits 1 and 4 | Upper coil piece | | 1 | | | 1 | |
| | Lower coil piece | | 1 | | | 1 | |
| Parallel circuits 2 and 5 | Upper coil piece | 1 | | | | | |
| | Lower coil piece | 1 | | | | | |
| Parallel circuits 3 and 6 | Upper coil piece | | | 1 | 1 | | 1 |
| | Lower coil piece | | | 1 | 1 | | 1 |

| | | Relative positions from the center of pole | | | | | |
|---|---|---|---|---|---|---|---|
| | | 7 | 8 | 9 | 10 | 11 | 12 |
| Parallel circuits 1 and 4 | Upper coil piece | | 1 | | | | 1 |
| | Lower coil piece | | 1 | | | | 1 |
| Parallel circuits 2 and 5 | Upper coil piece | 1 | | 1 | | 1 | |
| | Lower coil piece | 1 | | 1 | | 1 | |
| Parallel circuits 3 and 6 | Upper coil piece | | | | 1 | | |
| | Lower coil piece | | | | 1 | | |

As shown in Table 75, four upper and lower coil pieces 15 and 16 of the first and fourth parallel circuits are placed at 2nd, 5th, 8th, and 12th positions from the pole center. Four upper and lower coil pieces 15 and 16 of the second and fifth parallel circuits are placed at 1st, 7th, 9th, and 11th positions from the pole center. Four upper and lower coil pieces 15 and 16 of the third and sixth parallel circuits are placed at 3rd, 4th, 6th, and 10th positions from the pole center.

Therefore, the circuits of the upper and lower coil pieces 15 and 16 in the first phase belt 17 are numbered 2, 1, 3, 3, 1, 3, 2, 1, 2, 3, 2, 1 sequentially from the pole center side. The circuits of the upper and lower coil pieces 15 and 16 in the second phase belt 18 are numbered 5, 4, 6, 6, 4, 6, 5, 4, 5, 6, 5, 4 sequentially from the pole center side.

Table 76 shows the balance of the voltage generated in an armature winding in the twenty-sixth embodiment. In the embodiment, the balance varies with a coil pitch. Table 76 shows a case where a winding pitch is 30/36 (83.33%).

TABLE 76

| | Parallel circuit | | | | | |
|---|---|---|---|---|---|---|
| | 1 | 2 | 3 | 4 | 5 | 6 |
| Voltage (p.u.) | 0.9984 | 1.0036 | 0.9979 | 0.9984 | 1.0036 | 0.9979 |
| Voltage phase (degree) | 0.000 | 0.000 | 0.000 | 0.000 | 0.000 | 0.000 |

As shown in Table 76, in the armature winding in the twenty-sixth embodiment, a voltage deviation (a deviation of a p.u. voltage from 1.0) is 0.36% maximum, and a phase angle deviation is 0.00°. These values meet the standard in the US patent of Rudolph Habermann Jr., 0.4% in voltage deviation and 0.15° in phase angle, and the voltage balance higher than that in the first embodiment is realized.

Table 77 shows a change in maximum voltage deviation and phase angle deviation with a winding pitch in the twenty-sixth embodiment. When a winding pitch is 30/36 or 31/36, the balance meets the standard in the US patent of Rudolph Habermann Jr., 0.4% in voltage deviation and 0.15° in phase angle.

TABLE 77

| | Coil pitch | | | | | |
|---|---|---|---|---|---|---|
| | 27/36 | 28/36 | 29/36 | 30/36 | 31/36 | 32/36 |
| Voltage deviation | | | 0.59% | 0.36% | 0.25% | 0.42% |
| Phase angle deviation | | | 0.00° | 0.00° | 0.00° | 0.00° |

As described above, in the twenty-sixth embodiment, when a winding pitch is 30/36 or 31/36, the balance meeting the standard in the US patent of Rudolph Habermann Jr. is realized with respect to the voltages of parallel circuits, and a circulation current can be decreased.

The embodiment is not limited to the illustrated configuration. The lead-out positions may be different. For example, the coil pieces located at electrically equivalent positions in the parallel circuits 1 and 4 may be replaced.

Embodiment 27

Figure 27:
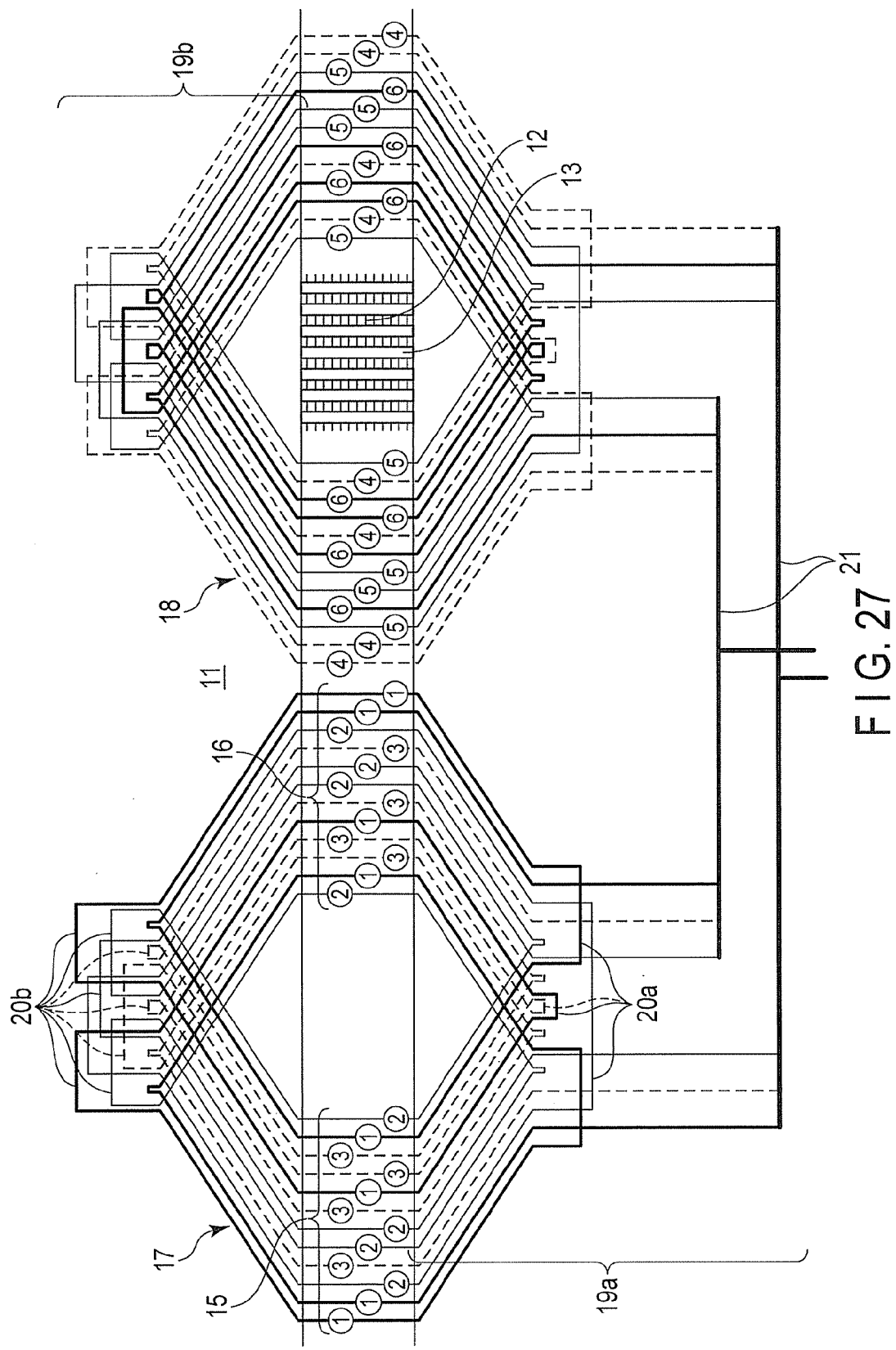
FIG. 27 is a developed perspective view showing one phase of an armature winding of a rotating electrical machine in a twenty-seventh embodiment of the present invention.

FIG. 27 is a developed perspective view showing one phase of an armature winding of a rotating electrical machine in a twenty-seventh embodiment of the present invention.

As shown in FIG. 27, an armature 11 of a rotating electrical machine is provided with seventy-two slots 13 in an armature core 12 comprising a laminated iron core. In the slots 13, a 2-pole 3-phase 6-parallel-circuit armature winding is housed in two layers.

An armature winding of each phase has an upper coil piece 15 housed in the upper part of the slot, and a lower coil piece 16 housed in the lower part of the slot. The ends of the upper and lower coil pieces 15 and 16 are connected in series at a connection side coil end 19a connected to a lead-out portion of the winding, and at a non-connection side coil end 19b located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are housed in the twelve slots 13.

The armature winding of each phase has six parallel circuits. The parallel circuits are given numbers ①, ②, ③, ④, ⑤ and ⑥ for identification in the drawing.

In each phase belt 17 and 18, the upper coil piece 15 is connected to the corresponding lower coil piece 16 apart by a fixed pitch, at the connection side coil end 19a and non-connection side coil end 19b, thereby forming six parallel circuits. The parallel circuits are connected in parallel through the lead-out connection conductor 21 provided at the connection side coil end 19a, thereby forming the armature winding.

In FIG. 27, ten jumper wires 20a per phase are provided at the connection side coil end 19a of each phase 17 and 18, and eighteen jumper wires 20b per phase belt are provided at the non-connection side coil end 19b. When the relative positions of the upper and lower coil pieces 15 and 16 in each phase belt are indicated by positions from the pole center, the upper and lower coil pieces 15 and 16 of each parallel circuit are placed as shown in Table 78.

TABLE 78

|  |  | Relative positions from the center of pole |  |  |  |  |  |
|---|---|---|---|---|---|---|---|
|  |  | 1 | 2 | 3 | 4 | 5 | 6 |
| Parallel circuits 1 and 4 | Upper coil piece |  | 1 |  |  | 1 |  |
|  | Lower coil piece |  | 1 |  |  | 1 |  |
| Parallel circuits 2 and 5 | Upper coil piece | 1 |  |  |  |  |  |
|  | Lower coil piece | 1 |  |  |  |  |  |
| Parallel circuits 3 and 6 | Upper coil piece |  |  | 1 | 1 |  | 1 |
|  | Lower coil piece |  |  | 1 | 1 |  | 1 |

|  |  | Relative positions from the center of pole |  |  |  |  |  |
|---|---|---|---|---|---|---|---|
|  |  | 7 | 8 | 9 | 10 | 11 | 12 |
| Parallel circuits 1 and 4 | Upper coil piece |  |  |  |  | 1 | 1 |
|  | Lower coil piece |  |  |  |  | 1 | 1 |
| Parallel circuits 2 and 5 | Upper coil piece | 1 | 1 |  | 1 |  |  |
|  | Lower coil piece | 1 | 1 |  | 1 |  |  |
| Parallel circuits 3 and 6 | Upper coil piece |  |  | 1 |  |  |  |
|  | Lower coil piece |  |  | 1 |  |  |  |

As shown in Table 78, four upper and lower coil pieces 15 and 16 of the first and fourth parallel circuits are placed at 2nd, 5th, 11th and 12th positions from the pole center. Four upper and lower coil pieces 15 and 16 of the second and fifth parallel circuits are placed at 1st, 7th, 8th, and 10th positions from the pole center. Four upper and lower coil pieces 15 and 16 of the third and sixth parallel circuits are placed at 3rd, 4th, 6th, and 9th positions from the pole center.

Therefore, the circuits of the upper and lower coil pieces 15 and 16 in the first phase belt 17 are numbered 2, 1, 3, 3, 1, 3, 2, 2, 3, 2, 1, 1 sequentially from the pole center side. The circuits of the upper and lower coil pieces 15 and 16 in the second phase belt 18 are numbered 5, 4, 6, 6, 4, 6, 5, 5, 6, 5, 4, 4 sequentially from the pole center side.

Table 79 shows the balance of the voltage generated in an armature winding in the twenty-seventh embodiment. In the embodiment, the balance varies with a coil pitch. Table 73 shows a case where a winding pitch is 30/36 (83.33%).

TABLE 79

|  | Parallel circuit |  |  |  |  |  |
|---|---|---|---|---|---|---|
|  | 1 | 2 | 3 | 4 | 5 | 6 |
| Voltage (p.u.) | 0.9984 | 1.0036 | 0.9979 | 0.9984 | 1.0036 | 0.9979 |
| Voltage phase (degree) | 0.000 | 0.000 | 0.000 | 0.000 | 0.000 | 0.000 |

As shown in Table 79, in the armature winding in the twenty-seventh embodiment, a voltage deviation (a deviation of a p.u. voltage from 1.0) is 0.36% maximum, and a phase angle deviation is 0.00°. These values meet the standard in the US patent of Rudolph Habermann Jr., 0.4% in voltage deviation and 0.15° in phase angle, and the voltage balance higher than that in the first embodiment is realized.

Table 80 shows a change in maximum voltage deviation and phase angle deviation with a winding pitch in the twenty-seventh embodiment. Only when a winding pitch is 30/36 does the balance meet the standard in the US patent of Rudolph Habermann Jr., 0.4% in voltage deviation and 0.15° in phase angle.

TABLE 80

|  | Coil pitch |  |  |  |  |  |
|---|---|---|---|---|---|---|
|  | 27/36 | 28/36 | 29/36 | 30/36 | 31/36 | 32/36 |
| Voltage deviation |  |  | 0.63% | 0.36% | 0.56% |  |
| Phase angle deviation |  |  | 0.00° | 0.00° | 0.00° |  |

As described above, in the twenty-seventh embodiment, only when the winding pitch is 30/36 is the balance meeting the standard in the US patent of Rudolph Habermann Jr. realized with respect to the voltages of parallel circuits, and a circulation current can be decreased.

The embodiment is not limited to the illustrated configuration. The lead-out positions may be different. For example, the coil pieces located at electrically equivalent positions in the parallel circuits 1 and 4 may be replaced.

Embodiment 28

Figure 28:
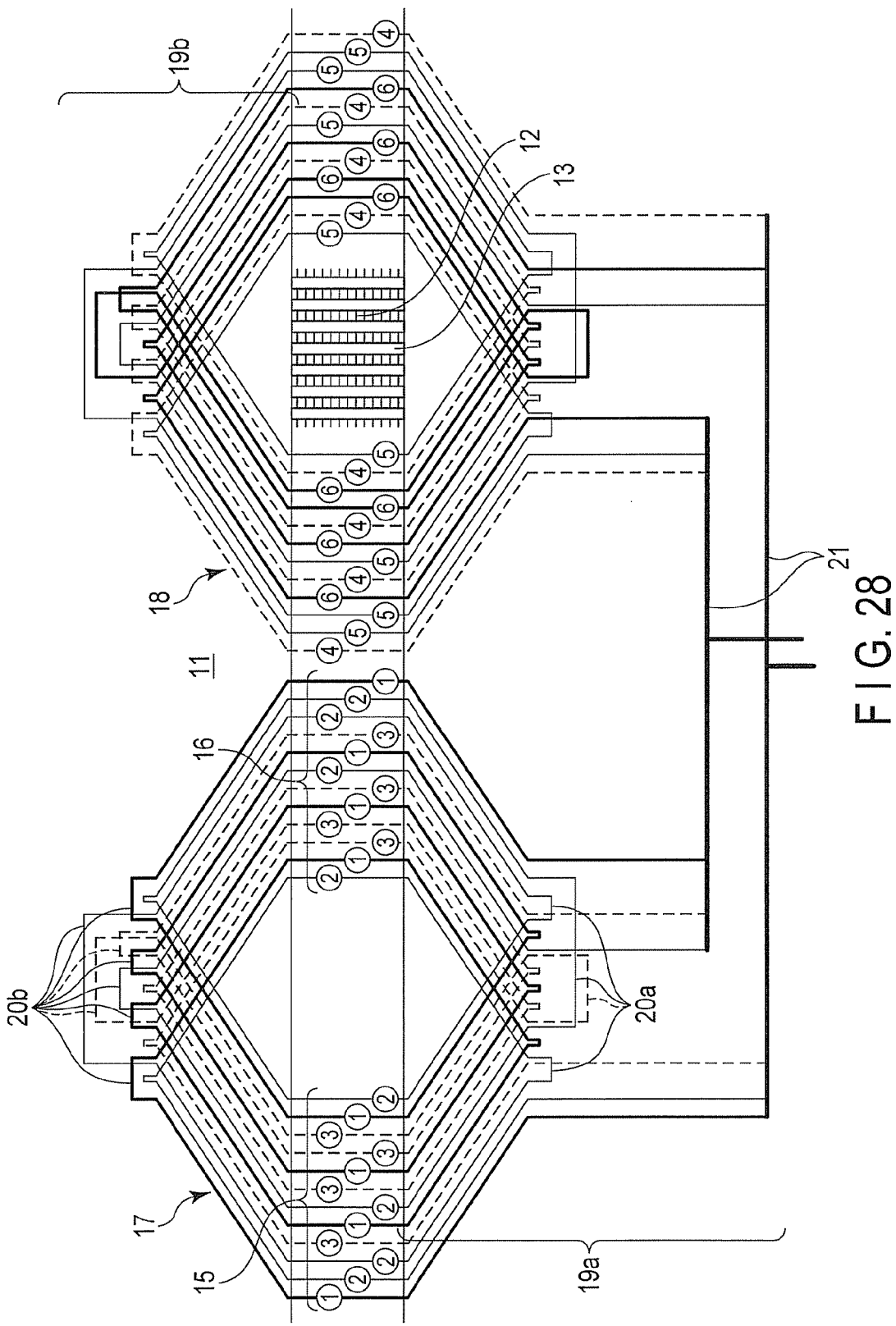
FIG. 28 is a developed perspective view showing one phase of an armature winding of a rotating electrical machine in a twenty-eighth embodiment of the present invention.

FIG. 28 is a developed perspective view showing one phase of an armature winding of a rotating electrical machine in a twenty-eighth embodiment of the present invention.

As shown in FIG. 28, an armature 11 of a rotating electrical machine is provided with seventy-two slots 13 in an armature core 12 comprising a laminated iron core. In the slots 13, a 2-pole 3-phase 6-parallel-circuit armature winding is housed in two layers.

An armature winding of each phase has an upper coil piece 15 housed in the upper part of the slot, and a lower coil piece 16 housed in the lower part of the slot. The ends of the upper and lower coil pieces 15 and 16 are connected in series at a connection side coil end 19a connected to a lead-out portion of the winding, and at a non-connection side coil end 19b located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are housed in the twelve slots 13.

The armature winding of each phase has six parallel circuits. The parallel circuits are given numbers ①, ②, ③, ④, ⑤ and ⑥ for identification in the drawing.

In each phase belt 17 and 18, the upper coil piece 15 is connected to the corresponding lower coil piece 16 apart by a fixed pitch, at the connection side coil end 19a and non-connection side coil end 19b, thereby forming six parallel circuits. The parallel circuits are connected in parallel through the lead-out connection conductor 21 provided at the connection side coil end 19a, thereby forming the armature winding.

In FIG. 28, eight jumper wires 20a per phase are provided at the connection side coil end 19a of each phase 17 and 18, and sixteen jumper wires 20b per phase belt are provided at the non-connection side coil end 19b. When the relative positions of the upper and lower coil pieces 15 and 16 in each phase belt are indicated by positions from the pole center, the upper and lower coil pieces 15 and 16 of each parallel circuit are placed as shown in Table 81.

TABLE 81

| | | Relative positions from the center of pole | | | | | |
|---|---|---|---|---|---|---|---|
| | | 1 | 2 | 3 | 4 | 5 | 6 |
| Parallel circuits 1 and 4 | Upper coil piece | | 1 | | | 1 | |
| | Lower coil piece | | 1 | | | 1 | |
| Parallel circuits 2 and 5 | Upper coil piece | 1 | | | | | |
| | Lower coil piece | 1 | | | | | |
| Parallel circuits 3 and 6 | Upper coil piece | | | 1 | 1 | | 1 |
| | Lower coil piece | | | 1 | 1 | | 1 |

| | | Relative positions from the center of pole | | | | | |
|---|---|---|---|---|---|---|---|
| | | 7 | 8 | 9 | 10 | 11 | 12 |
| Parallel circuits 1 and 4 | Upper coil piece | | 1 | | | | 1 |
| | Lower coil piece | | 1 | | | | 1 |
| Parallel circuits 2 and 5 | Upper coil piece | 1 | | | 1 | 1 | |
| | Lower coil piece | 1 | | | 1 | 1 | |
| Parallel circuits 3 and 6 | Upper coil piece | | | 1 | | | |
| | Lower coil piece | | | 1 | | | |

As shown in Table 81, four upper and lower coil pieces 15 and 16 of the first and fourth parallel circuits are placed at 2nd, 5th, 8th and 12th positions from the pole center. Four upper and lower coil pieces 15 and 16 of the second and fifth parallel circuits are placed at 1st, 7th, 10th, and 11th positions from the pole center. Four upper and lower coil pieces 15 and 16 of the third and sixth parallel circuits are placed at 3rd, 4th, 6th, and 9th positions from the pole center.

Therefore, the circuits of the upper and lower coil pieces 15 and 16 in the first phase belt 17 are numbered 2, 1, 3, 3, 1, 3, 2, 1, 3, 2, 2, 1 sequentially from the pole center side. The circuits of the upper and lower coil pieces 15 and 16 in the second phase belt 18 are numbered 5, 4, 6, 6, 4, 6, 5, 4, 6, 5, 5, 4 sequentially from the pole center side.

Table 82 shows the balance of the voltage generated in an armature winding in the twenty-eighth embodiment. In the embodiment, the balance varies with a coil pitch. Table 73 shows a case where a winding pitch is 30/36 (83.33%).

TABLE 82

| | Parallel circuit | | | | | |
|---|---|---|---|---|---|---|
| | 1 | 2 | 3 | 4 | 5 | 6 |
| Voltage (p.u.) | 0.9984 | 1.0036 | 0.9979 | 0.9984 | 1.0036 | 0.9979 |
| Voltage phase (degree) | 0.000 | 0.000 | 0.000 | 0.000 | 0.000 | 0.000 |

As shown in Table 82, in the armature winding in the twenty-eighth embodiment, a voltage deviation (a deviation of a p.u. voltage from 1.0) is 0.36% maximum, and a phase angle deviation is 0.00°. These values meet the standard in the US patent of Rudolph Habermann Jr., 0.4% in voltage deviation and 0.15° in phase angle, and the voltage balance higher than that in the first embodiment is realized.

Table 83 shows a change in maximum voltage deviation and phase angle deviation with a winding pitch in the twenty-eighth embodiment. When a winding pitch is 30/36 or 31/36, the balance meets the standard in the US patent of Rudolph Habermann Jr., 0.4% in voltage deviation and 0.15° in phase angle.

TABLE 83

| | Coil pitch | | | | | |
|---|---|---|---|---|---|---|
| | 27/36 | 28/36 | 29/36 | 30/36 | 31/36 | 32/36 |
| Voltage deviation | | | 0.69% | 0.36% | 0.25% | 0.62% |
| Phase angle deviation | | | 0.00° | 0.00° | 0.00° | 0.00° |

As described above, in the twenty-eighth embodiment, when a winding pitch is 30/36 or 31/36, the balance meeting the standard in the US patent of Rudolph Habermann Jr. is realized with respect to the voltages of parallel circuits, and a circulation current can be decreased.

The embodiment is not limited to the illustrated configuration. The lead-out positions may be different. For example, the coil pieces located at electrically equivalent positions in the parallel circuits 1 and 4 may be replaced.

Embodiment 29

Figure 29:
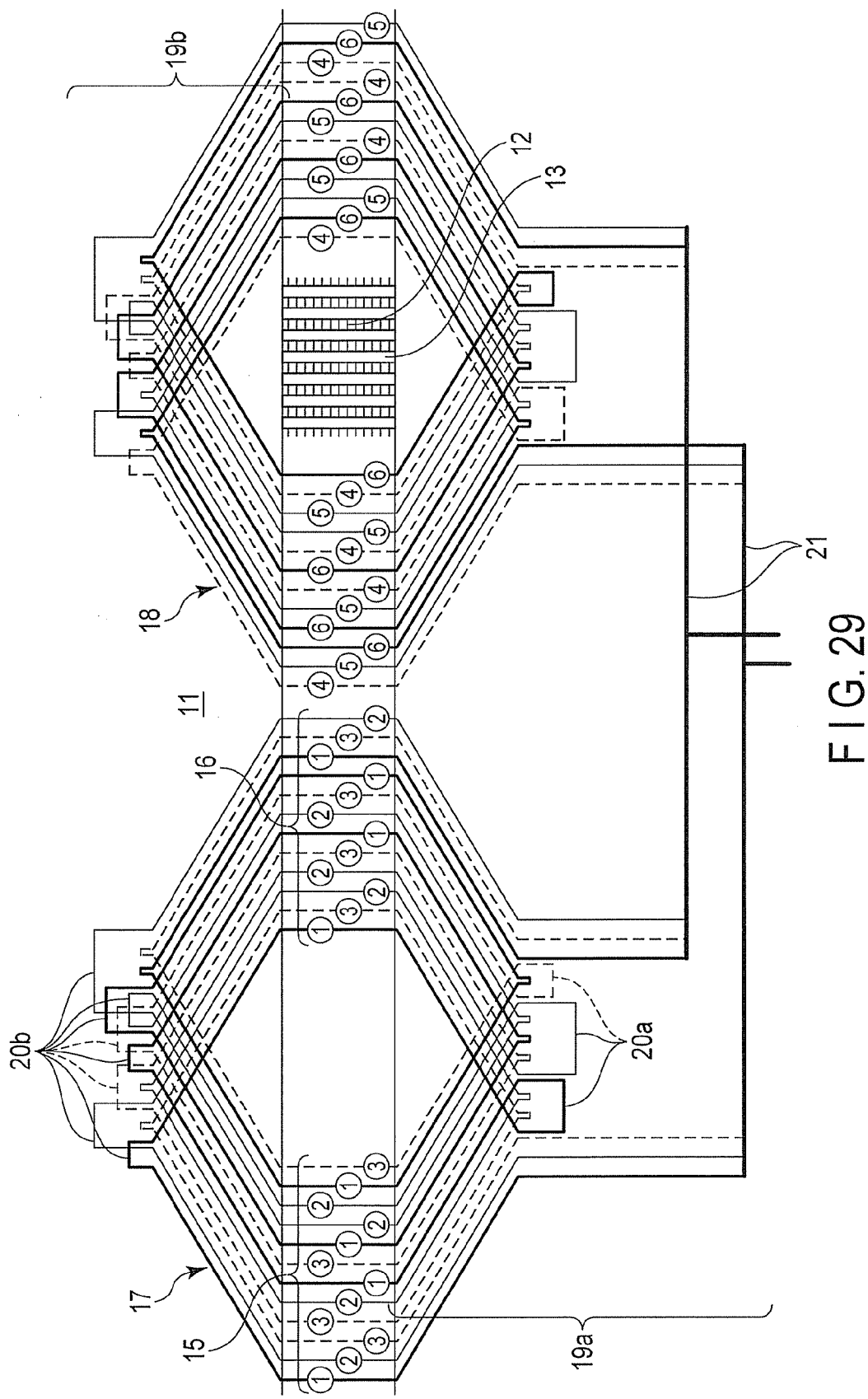
FIG. 29 is a developed perspective view showing one phase of an armature winding of a rotating electrical machine in a twenty-ninth embodiment of the present invention.

FIG. 29 is a developed perspective view showing one phase of an armature winding of a rotating electrical machine in a twenty-ninth embodiment of the present invention.

As shown in FIG. 29, an armature 11 of a rotating electrical machine has seventy-two slots 13 in an armature core 12 comprising a laminated iron core. In the slots 13, a 2-pole 3-phase 6-parallel-circuit armature winding is housed in two layers.

An armature winding of each phase has an upper coil piece 15 housed in the upper part of the slot, and a lower coil piece 16 housed in the lower part of the slot. The ends of the upper and lower coil pieces 15 and 16 are connected in series at a connection side coil end 19a connected to a lead-out portion of the winding, and at a non-connection side coil end 19b located axially opposite to the connection side coil end and not connected to a lead-out portion of the winding.

Further, the armature winding has a first phase belt 17 in which the upper and lower coil pieces 15 and 16 are housed in twelve slots 13 provided in the armature core 12, and a second phase belt 18 in which the upper and lower coil pieces 15 and 16 are housed in the twelve slots 13.

The armature winding of each phase has six parallel circuits. The parallel circuits are given numbers ①, ②, ③, ④, ⑤ and ⑥ for identification in the drawing.

In each phase belt 17 and 18, the upper coil piece 15 is connected to the corresponding lower coil piece 16 apart by a fixed pitch, at the connection side coil end 19a and non-connection side coil end 19b, thereby forming six parallel circuits. The parallel circuits are connected in parallel through the lead-out connection conductor 21 provided at the connection side coil end 19a, thereby forming the armature winding.

In FIG. 29, six jumper wires 20a per phase are provided at the connection side coil end 19a of each phase 17 and 18, and sixteen jumper wires 20b per phase belt are provided at the non-connection side coil end 19b. When the relative positions of the upper and lower coil pieces 15 and 16 in each phase belt are indicated by positions from the pole center, the upper and lower coil pieces 15 and 16 of each parallel circuit are placed as shown in Table 84.

TABLE 84

|  |  | Relative positions from the center of pole | | | | | |
|---|---|---|---|---|---|---|---|
|  |  | 1 | 2 | 3 | 4 | 5 | 6 |
| Parallel circuits 1 and 4 | Upper coil piece |  | 1 |  |  | 1 |  |
|  | Lower coil piece | 1 |  |  |  |  | 1 |
| Parallel circuits 2 and 5 | Upper coil piece |  |  | 1 | 1 |  |  |
|  | Lower coil piece |  |  | 1 | 1 |  |  |
| Parallel circuits 3 and 6 | Upper coil piece | 1 |  |  |  |  | 1 |
|  | Lower coil piece |  | 1 |  |  | 1 |  |

|  |  | Relative positions from the center of pole | | | | | |
|---|---|---|---|---|---|---|---|
|  |  | 7 | 8 | 9 | 10 | 11 | 12 |
| Parallel circuits 1 and 4 | Upper coil piece | 1 |  |  |  |  | 1 |
|  | Lower coil piece |  |  | 1 | 1 |  |  |
| Parallel circuits 2 and 5 | Upper coil piece |  |  | 1 |  |  | 1 |
|  | Lower coil piece | 1 |  |  |  |  | 1 |
| Parallel circuits 3 and 6 | Upper coil piece |  |  | 1 | 1 |  |  |
|  | Lower coil piece |  | 1 |  |  | 1 |  |

As shown in Table 84, four upper coil pieces 15 of the first and fourth parallel circuits are placed at 2nd, 5th, 7th and 12th positions from the pole center, and four lower coil pieces 16 of the first and fourth parallel circuits are placed at 1st, 6th, 9th, and 10th positions from the pole center. Four upper coil pieces 15 of the second and fifth parallel circuits are placed at 3rd, 4th, 8th, and 11th positions from the pole center, and four lower coil pieces 16 of the second and fifth parallel circuits are placed at 3rd, 4th, 7th, and 12th positions from the pole center. Four upper coil pieces 15 of the third and sixth parallel circuits are placed at 1st, 6th, 9th, and 10th positions from the pole center, and four lower coil pieces 16 of the third and sixth parallel circuits are placed at 2nd, 5th, 8th, and 11th positions from the pole center.

Therefore, the circuits of the upper coil piece 15 in the first phase belt 17 are numbered 3, 1, 2, 2, 1, 3, 1, 2, 3, 3, 2, 1 sequentially from the pole center side, and the circuits of the lower coil piece 16 are numbered 1, 3, 2, 2, 3, 1, 2, 3, 1, 1, 3, 2. The circuits of the upper coil piece 15 in the second phase belt 18 are numbered 6, 4, 5, 5, 4, 6, 6, 4, 5, 6, 5, 4 sequentially from the pole center side, and the circuits of the lower coil piece 16 are numbered 4, 6, 5, 5, 6, 4, 5, 6, 4, 4, 6, 5 sequentially from the pole center side.

Table 85 shows the balance of the voltage generated in an armature winding in the twenty-ninth embodiment. In the embodiment, the balance varies with a coil pitch. Table 85 shows a case where a winding pitch is 30/36 (83.33%).

TABLE 85

|  | Parallel circuit | | | | | |
|---|---|---|---|---|---|---|
|  | 1 | 2 | 3 | 4 | 5 | 6 |
| Voltage (p.u.) | 0.9969 | 1.0020 | 1.0010 | 0.9969 | 1.0020 | 1.0010 |
| Voltage phase (degree) | 0.118 | 0.000 | −0.118 | 0.118 | 0.000 | −0.118 |

As shown in Table 85, in the armature winding in the twenty-ninth embodiment, a voltage deviation (a deviation of a p.u. voltage from 1.0) is 0.31% maximum, and a phase angle deviation is 0.12°. These values meet the standard in the US patent of Rudolph Habermann Jr., 0.4% in voltage deviation and 0.15° in phase angle, and the voltage balance higher than that in the first embodiment is realized.

Table 86 shows a change in maximum voltage deviation and phase angle deviation with a winding pitch in the twenty-ninth embodiment. In a practical winding pitch range including those not shown in the table, the balance meets the standard in the US patent of Rudolph Habermann Jr., 0.4% in voltage deviation and 0.15° in phase angle.

TABLE 86

|  | Coil pitch | | | | | |
|---|---|---|---|---|---|---|
|  | 27/36 | 28/36 | 30/36 | 31/36 | 33/36 | 35/36 |
| Voltage deviation | 0.30% | 0.30% | 0.31% | 0.31% | 0.31% | 0.32% |
| Phase angle deviation | 0.14° | 0.13° | 0.12° | 0.12° | 0.13° | 0.14° |

As described above, in the twenty-ninth embodiment, in the practical winding pitch range, the balance meeting the standard in the US patent of Rudolph Habermann Jr. is realized with respect to the voltages of parallel circuits, and a circulation current can be decreased.

The embodiment is not limited to the illustrated configuration. The lead-out positions may be different. For example, the coil pieces located at electrically equivalent positions in the parallel circuits 1 and 4 may be replaced.

The invention is not limited to the embodiments described herein and shown in the drawings. The invention may be embodied in other various forms without departing from the essential characteristics in practical phases. The invention may be embodied in various forms by appropriately combining the constituent elements disclosed in the embodiments.

For example, some constituent elements may be eliminated from those disclosed in the embodiments. Constituent elements of different embodiments may be combined.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A 3-phase 2-pole 2-layer armature winding of a rotating electrical machine, housed in 72 slots provided in a laminated iron core, the winding for each phase comprising:

six parallel circuits separated into two phase belts comprising first and second phase belts, each parallel circuit comprising two coil pieces, an upper coil piece and a lower coil piece connected in series with each other at a connection side coil end and at a non-connection side coil end; and the parallel circuits being connected such that upper and lower coil pieces of first and fourth parallel circuits are placed at 1st, 7th, 9th, and 12th positions from the center of a pole; upper and lower coil pieces of second and fifth parallel circuits are placed at 2nd, 5th, 8th, and 11th positions from the center of a pole; and upper and lower coil pieces of third and six parallel circuits are placed at 3rd, 4th, 6th, and 10th positions from the center of a pole, when relative positions of the upper and lower coil pieces in one phase belt are indicated by positions counted sequentially from the center of a pole.

2. The armature winding of the rotating electrical machine according to claim 1, wherein the parallel circuits of the upper and lower coil pieces of the first phase belt are numbered 1, 2, 3, 3, 2, 3, 1, 2, 1, 3, 2, 1 sequentially from the center of a pole; and the parallel circuits of the upper and lower coil pieces of the second phase belt are numbered 4, 5, 6, 6, 5, 6, 4, 5, 4, 6, 5, 4 sequentially from the center of a pole.

* * * * *